US008871359B2

(12) United States Patent
Uetani et al.

(10) Patent No.: US 8,871,359 B2
(45) Date of Patent: *Oct. 28, 2014

(54) ORGANIC ELECTROLUMINESCENCE DEVICE

(75) Inventors: Yasunori Uetani, Tsukuba (JP); Jun Oguma, Tsukuba (JP); Makoto Anryu, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1070 days.

This patent is subject to a terminal disclaimer.

(21) Appl. No.: 10/585,938

(22) PCT Filed: Jan. 31, 2005

(86) PCT No.: PCT/JP2005/001730
§ 371 (c)(1),
(2), (4) Date: Jul. 13, 2006

(87) PCT Pub. No.: WO2005/074329
PCT Pub. Date: Aug. 11, 2005

(65) Prior Publication Data
US 2009/0015139 A1    Jan. 15, 2009

(30) Foreign Application Priority Data
Feb. 2, 2004    (JP) ................... 2004-025330

(51) Int. Cl.
| H01L 51/54 | (2006.01) |
| H05B 33/14 | (2006.01) |
| C08G 61/12 | (2006.01) |
| C08G 73/02 | (2006.01) |
| C09K 11/06 | (2006.01) |

(52) U.S. Cl.
CPC ........ *H05B 33/14* (2013.01); *C09K 2211/1433* (2013.01); *C08G 61/12* (2013.01); *C08G 73/02* (2013.01); *C09K 11/06* (2013.01); *Y10S 428/917* (2013.01)
USPC ........... 428/690; 428/917; 313/504; 313/506; 257/E51.036; 528/422

(58) Field of Classification Search
None
See application file for complete search history.

(56) References Cited

U.S. PATENT DOCUMENTS

| 5,728,801 | A |   | 3/1998 | Wu et al. |
| 5,814,244 | A | * | 9/1998 | Kreuder et al. ......... 252/301.16 |
| 6,034,206 | A | * | 3/2000 | Yamamoto et al. ........... 528/397 |
| 6,630,566 | B1 | * | 10/2003 | Allen et al. ................... 528/422 |
| 7,772,360 | B2 | * | 8/2010 | Kitano et al. .................. 528/422 |
| 8,263,735 | B2 | * | 9/2012 | Kitano et al. .................. 528/422 |
| 8,519,092 | B2 | * | 8/2013 | Kitano et al. .................. 528/422 |
| 2004/0075381 | A1 |   | 4/2004 | Burroughes et al. |
| 2004/0109955 | A1 | * | 6/2004 | Kitano et al. .................. 428/1.1 |

FOREIGN PATENT DOCUMENTS

| DE | 19532574 A1 | 3/1997 |
| EP | 1394188 A1 | 3/2004 |
| JP | 06-314594 A | 11/1994 |
| JP | 2001-503074 A | 3/2001 |
| JP | 2001-527102 A | 12/2001 |
| JP | 2002-507825 A | 3/2002 |
| JP | 2003-336043 A | 11/2003 |

OTHER PUBLICATIONS

Thomas Braig et al., "Crosslinkable hole-transporting polymers by palladium-catalyzed C—N-coupling reaction", Macromol. Rapid Commun., vol. 21, No. 9, (2000), pp. 583-589.
Monthly Display, 2003, September, p10 (2003).
Korean Office Action dated Oct. 20, 2011 in Korean Application No. 10-2006-7017299.
Japanese Patent Office, "Notification of Reasons for Rejection," issued in connection with Japanese Patent Application No. 2005-020962, dated Oct. 4, 2011.
Office Action issued Feb. 5, 2014 in corresponding German Patent Application No. 11 2005 000 266.7 with English translation.
Office Action issued Jun. 11, 2007 in corresponding British Patent Application No. GB0617194.6.
First Office Action issued Jun. 6, 2008 in corresponding Chinese Patent Application No. 200580003593.6 with English translation.

* cited by examiner

*Primary Examiner* — Marie R. Yamnitzky
(74) *Attorney, Agent, or Firm* — Sughrue Mion, PLLC

(57) ABSTRACT

An organic electroluminescence device wherein a light emitting layer exists between electrodes composed of an anode and a cathode, a layer (L) containing a polymer compound exists between the light emitting layer and the anode and the polymer compound contains a repeating unit of formula (1):

$$-Ar_1-N\underset{\underset{E_2-N}{\overset{Ar_4}{|}}\underset{E_3}{\overset{|}{|}}}{\overset{|}{|}}(Ar_2-N)_a-Ar_3- \quad (1)$$

wherein, $Ar_1$, $Ar_2$, $Ar_3$ and $Ar_4$ represent each independently an arylene group or divalent heterocyclic group; $E_1$, $E_2$ and $E_3$ represent each independently aryl group (A) or heterocyclic group (B); a and b represent each independently 0 or 1, and $0 \leq a+b \leq 1$; aryl group (A) is an aryl group having three or more substituents; and heterocyclic group (B) is a monovalent heterocyclic group having one or more substituents in which the sum of the number of the substituents and the number of hetero atoms of the heterocycle is 3 or more.

11 Claims, No Drawings

ORGANIC ELECTROLUMINESCENCE DEVICE

TECHNICAL FIELD

The present invention relates to an organic electroluminescence device.

BACKGROUND ART

The organic electroluminescence device (organic EL device) is a general term for light emitting devices using an organic compound as a light emitting material of a light emitting layer, and for example, devices are known using a polymer light emitting material as a light emitting material of a light emitting layer.

Though there is no specific suggestion, there is proposed a polyamine layer provided between a light emitting layer and an anode as a means for elongating the life of the device (monthly Display, '03, September, p. 10 (2003)).

However, when a layer of a polymer compound composed of the following repeating unit is used as a polyamine layer, device performances such as device life and the like are not necessarily satisfactory.

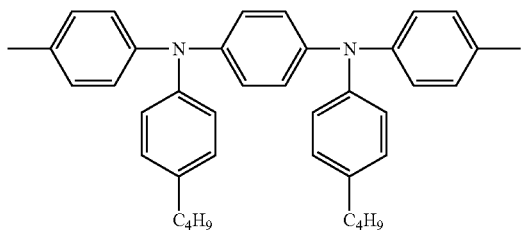

DISCLOSURE OF THE INVENTION

The present invention has an object of providing an organic EL device excellent in device performances.

The present inventors have intensively studied to solve the above problem and the resultantly found that by providing a layer containing a polymer compound having a specific structure as represented by the following formula (1) as a repeating unit between a light emitting layer and an anode of an organic EL element, the organic EL element is excellent in device performances, leading to completion of the present invention.

That is, the present invention provides an organic electroluminescence device wherein a light emitting layer exists between electrodes composed of an anode and a cathode, a layer (L) containing a polymer compound exists between the light emitting layer and the anode and the polymer compound contains a repeating unit of the following formula (1):

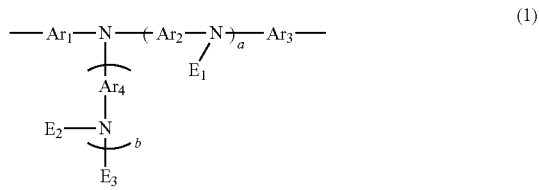

wherein, $Ar_1$, $Ar_2$, $Ar_3$ and $Ar_4$ represent each independently an arylene group or divalent heterocyclic group. $E_1$, $E_2$ and $E_3$ represent each independently the following aryl group (A) or heterocyclic group (B). a and b represent each independently 0 or 1, and $0 \leq a+b \leq 1$.

Aryl group (A): aryl group having three or more substituents selected from alkyl groups, alkoxy groups, alkylthio groups, aryl groups, aryloxy groups, arylthio groups, arylalkyl groups, arylalkoxy groups, arylalkylthio groups, arylalkenyl groups, arylalkynyl groups, amino group, substituted amino groups, silyl group, substituted silyl groups, silyloxy group, substituted silyloxy groups, monovalent heterocyclic groups and halogen atoms, Heterocyclic group (B): monovalent heterocyclic group having one or more substituents selected from alkyl groups, alkoxy groups, alkylthio groups, aryl groups, aryloxy groups, arylthio groups, arylalkyl groups, arylalkoxy groups, arylalkylthio groups, arylalkenyl groups, arylalkynyl groups, amino group, substituted amino groups, silyl group, substituted silyl groups, silyloxy group, substituted silyloxy groups, monovalent heterocyclic groups and halogen atoms and in which the sum of the number of the substituents and the number of hetero atoms of the heterocycle is 3 or more.

BEST MODES FOR CARRYING OUT THE INVENTION

The organic EL device of the present invention is characterized in that a light emitting layer exists between electrodes composed of an anode and a cathode, a layer (L) containing a polymer compound exists between the light emitting layer and the anode and the polymer compound comprises a repeating unit of the following formula (1).

In the above repeating unit of the formula (1), $Ar_1$, $Ar_2$, $Ar_3$ and $Ar_4$ represent each independently an arylene group or divalent heterocyclic group.

Here, the arylene group is an atomic group obtained by removing two hydrogen atoms from an aromatic hydrocarbon, and includes those having a benzene ring or condensed ring, and those having two or more independent benzene rings or condensed rings bonded through a group such as a direct bond, a vinylene group or the like. The arylene group may have a substituent. Examples of the substituent include alkyl groups, alkoxy groups, alkylthio groups, aryl groups, aryloxy groups, arylthio groups, arylalkyl groups, arylalkoxy groups, arylalkylthio groups, arylalkenyl groups, arylalkynyl groups, amino group, substituted amino groups, silyl group, substituted silyl groups, silyloxy group, substituted silyloxy groups, halogen atoms, acyl group, acyloxy group, imine residue, amide group, acid imide group, monovalent heterocyclic groups, carboxyl group, substituted carboxyl groups, cyano group, polymerizable substituents and the like, and preferable are alkyl groups, alkoxy groups, alkylthio groups, aryl groups, aryloxy groups, arylthio groups, substituted amino groups, substituted silyl groups, substituted silyloxy groups and monovalent heterocyclic groups.

The carbon number of an arylene group excepting substituents is usually about 6 to 60, and preferably 6 to 20. The total carbon number including substituents of an arylene group is usually about 6 to 100.

Examples of the arylene group include phenylene groups (e.g., following formulae 1 to 3), naphthalene-diyl groups (following formulae 4 to 13), anthracene-diyl groups (following formulae 14 to 19), biphenyl-diyl groups (following formulae 20 to 25), terphenyl-diyl groups (following formulae 26 to 28), condensed ring compound groups (following formulae 29 to 35), fluorene-diyl groups (following formulae 36 to 38), indenofluorene-diyl groups (following formulae 38A to 38B), stilbene-diyl groups (following formulae A to D), distilbene-diyl groups (following formulae E and F), and the like. Of them, phenylene groups, biphenyl-diyl groups, fluorene-diyl groups, indenonaphthalene-diyl groups and stilbene-diyl groups are preferable.
1
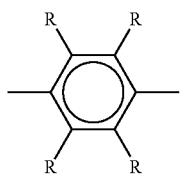
2
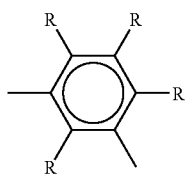
3
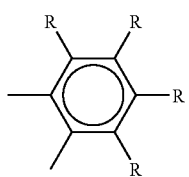
4
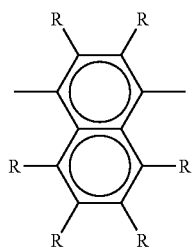
5
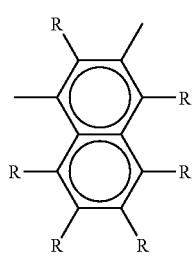
6
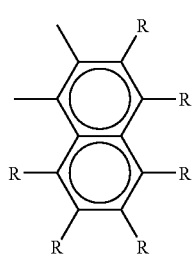
-continued
7
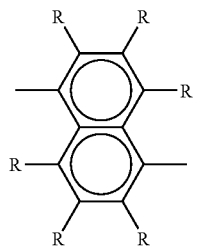
8
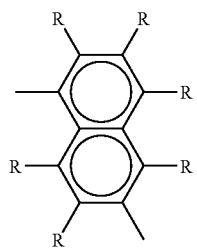
9
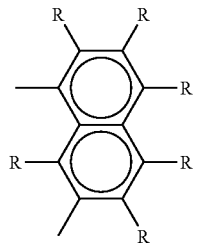
10
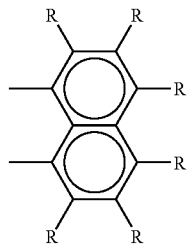
11
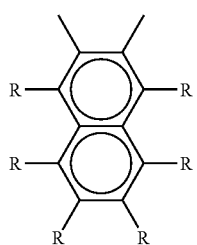
12
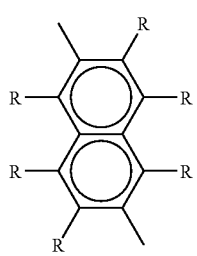

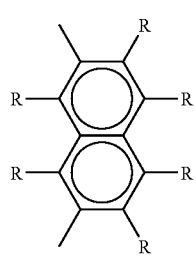
13
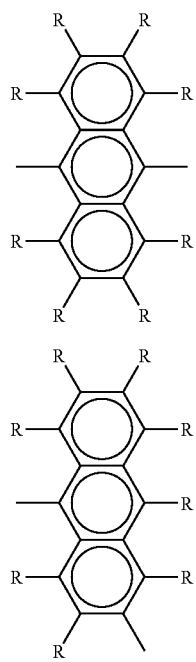
14
15
16
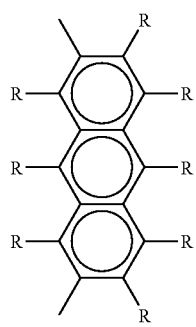
17
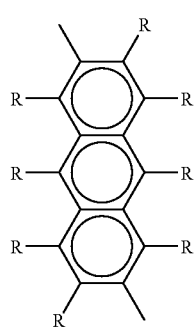
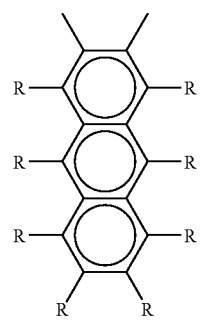
18
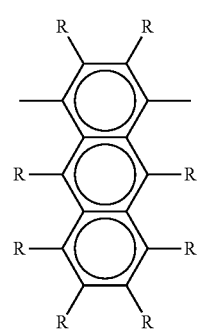
19
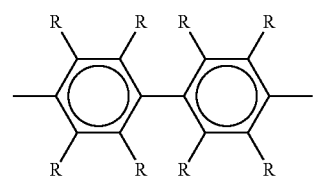
20
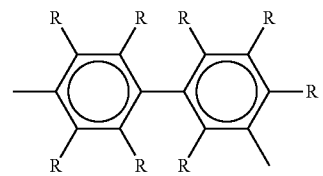
21
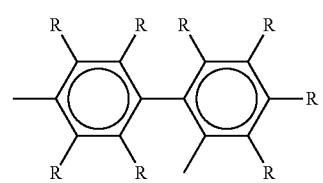
22
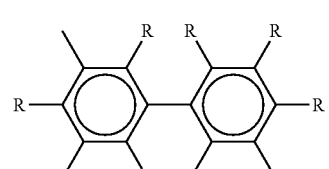
23
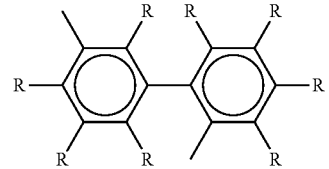
24

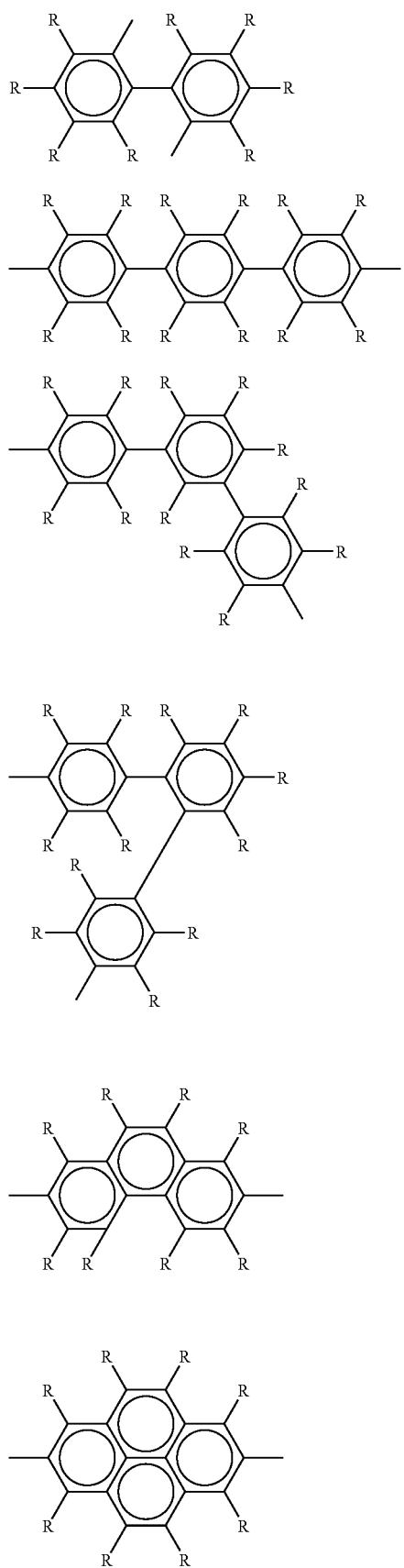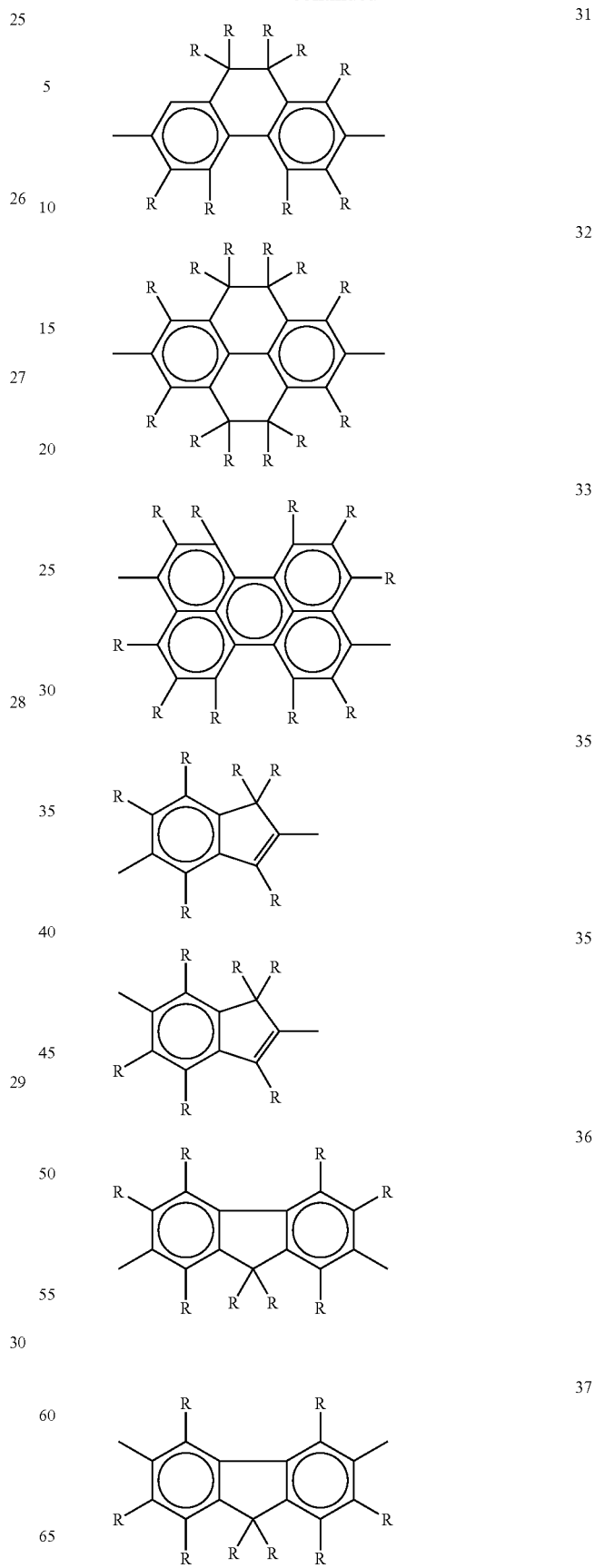

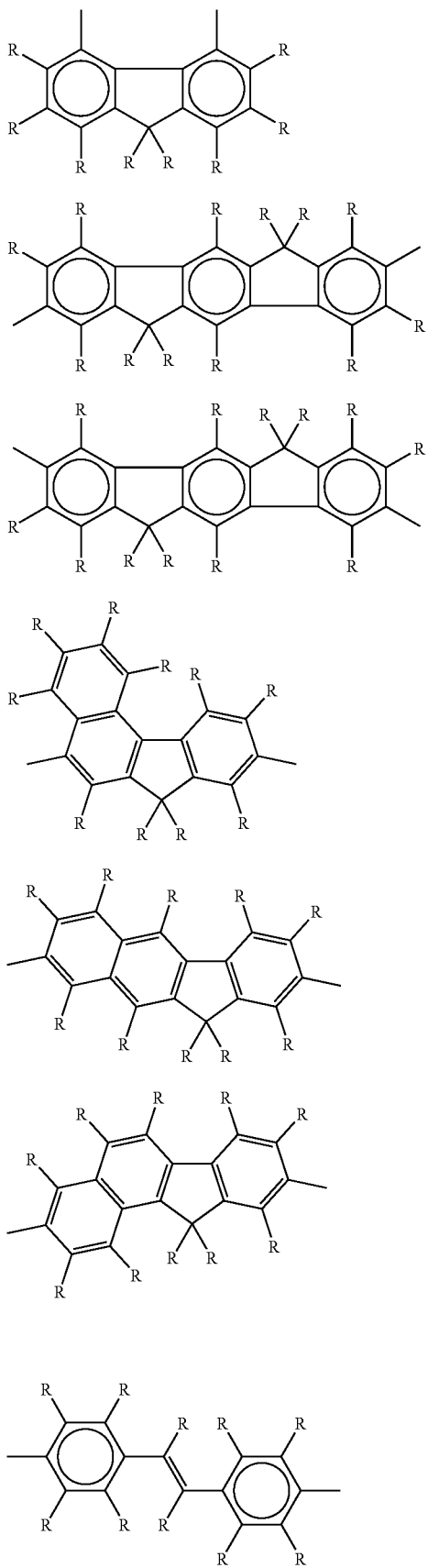
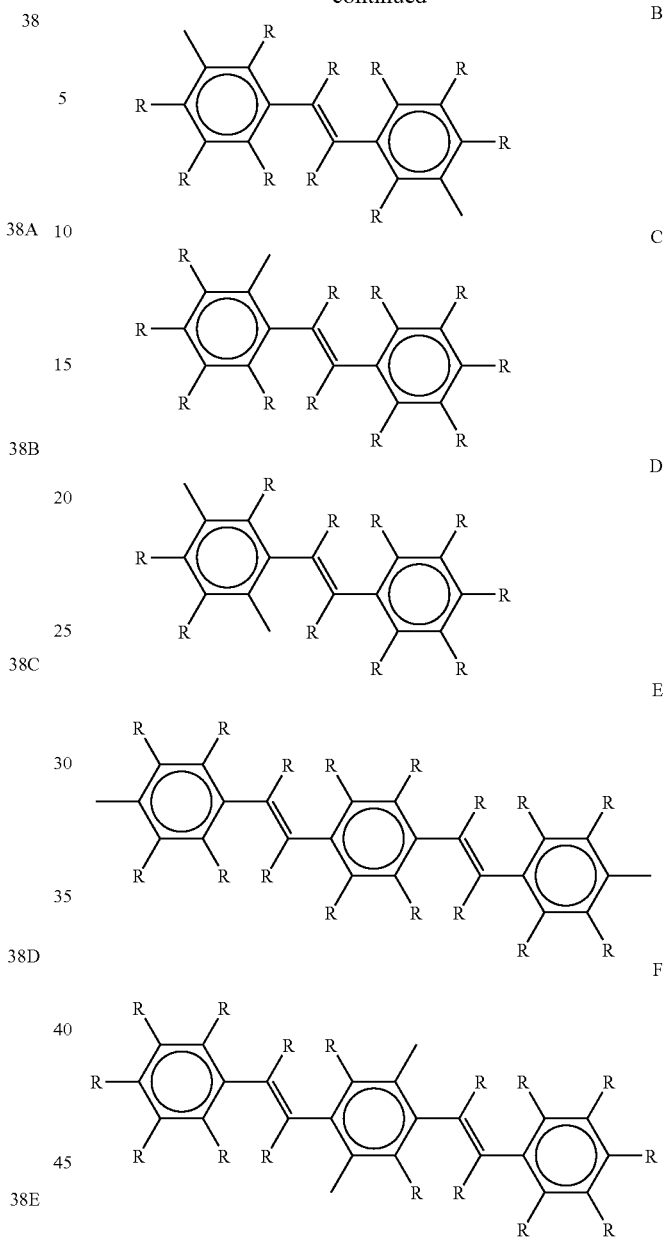

In the present invention, the divalent heterocyclic group means a remaining atomic group obtained by removing two hydrogen atoms from a heterocyclic compound, and may have a substituent. Here, the heterocyclic compound includes organic compounds having a cyclic structure in which elements constituting the ring include not only a carbon atom but also a hetero atom such as oxygen, sulfur, nitrogen, phosphorus, boron, arsenic or the like contained in the ring. The substituent includes alkyl group, alkoxy group, alkylthio group, aryl group, aryloxy group, arylthio group, arylalkyl group, arylalkoxy group, arylalkylthio group, arylalkenyl group, arylalkynyl group, amino group, substituted amino group, silyl group, substituted silyl group, silyloxy group, substituted silyloxy group, halogen atoms, acyl group, acyloxy group, imine residue, amide group, acid imide group, monovalent heterocyclic group, carboxyl group, substituted carboxyl group, cyano group, polymerizable substituents and the like, and preferable are alkyl group, alkoxy group, alkylthio group, aryl group, aryloxy group, arylthio group, substituted amino group, substituted silyl group, substituted silyloxy group and monovalent heterocyclic group. The carbon number of a divalent heterocyclic group excepting substituents is usually about 3 to 60. The total carbon number including substituents of a divalent heterocyclic group is usually about 3 to 100. Of divalent heterocyclic groups, preferable is a divalent aromatic heterocyclic group.

Examples of the divalent heterocyclic group include the following groups.

Divalent heterocyclic group including nitrogen as a hetero atom; pyridine-diyl groups (following formulae 39 to 44), diazaphenylene groups (following formulae 45 to 48), quinoline-diyl groups (following formulae 49 to 63), quinoxaline-diyl groups (following formulae 64 to 68), acridine-diyl groups (following formulae 69 to 72), bipyridyl-diyl groups (following formulae 73 to 75), phenanethroline-diyl groups (following formulae 76 to 78), and the like.

Groups containing oxygen, silicon, nitrogen, sulfur, selenium, boron and the like as a hetero atom and having a fluorene structure (following formulae 79 to 93, G to I).

Groups containing oxygen, silicon, nitrogen, sulfur, selenium, boron and the like as a hetero atom and having an indenofluorene structure (following formulae J to O).

5-membered ring heterocyclic groups containing oxygen, silicon, nitrogen, sulfur, selenium and the like as a hetero atom (following formulae 94 to 98).

5-membered ring condensed heterocyclic groups containing oxygen, silicon, nitrogen, sulfur, selenium and the like as a hetero atom (following formulae 99 to 110).

5-membered ring heterocyclic groups containing oxygen, silicon, nitrogen, sulfur, selenium and the like as a hetero atom and bonding at a-position of its hetero atom to form a dimer or oligomer (following formulae 111 to 112).

5-membered ring heterocyclic groups containing oxygen, silicon, nitrogen, sulfur, selenium and the like as a hetero atom and bonding at a-position of its hetero atom to a phenyl group (following formulae 113 to 119).

5-membered ring condensed heterocyclic groups containing oxygen, nitrogen, sulfur and the like as a hetero atom and substituted by a phenyl group, furyl group or thienyl group (following formulae 120 to 125).

39

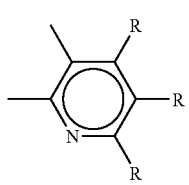

40

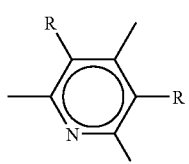

41

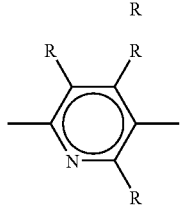

42

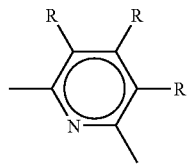

43

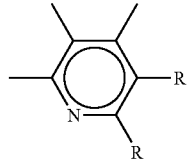

44

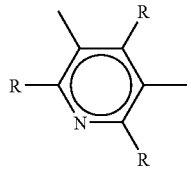

45

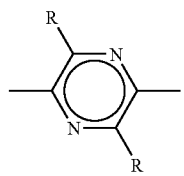

46

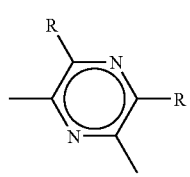

47

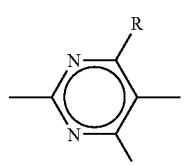

48

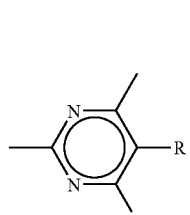

49

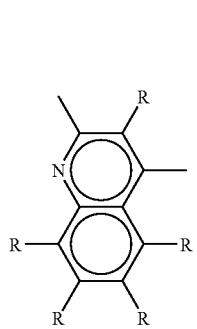

50
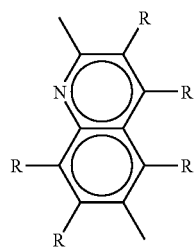
51
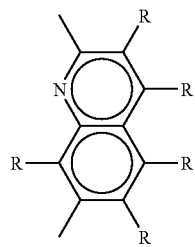
52
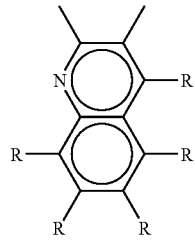
53
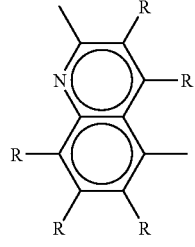
54
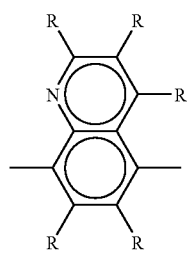
55
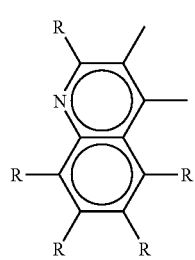
56
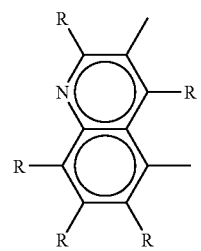
57
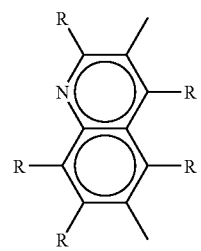
58
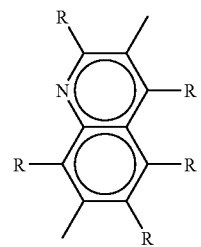
59
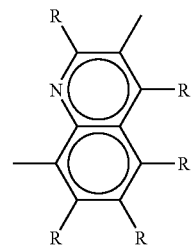
60
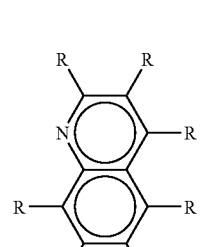
61
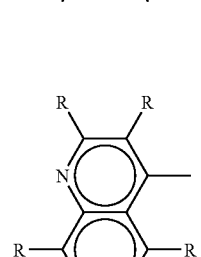

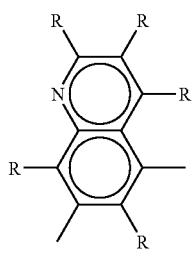
62
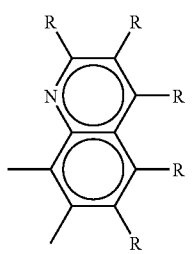
63
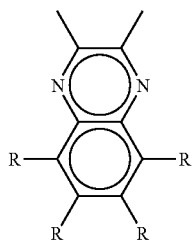
64
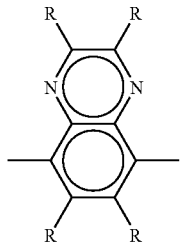
65
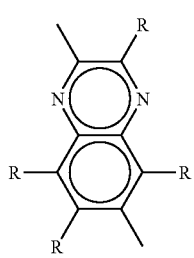
66
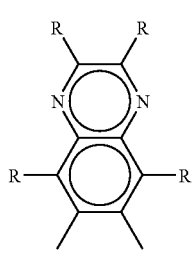
67
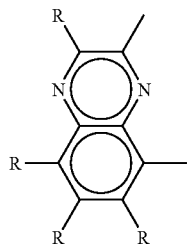
68
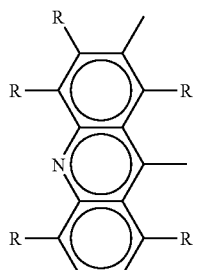
69
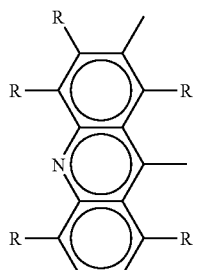
70
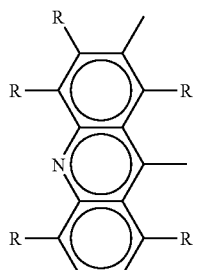
71
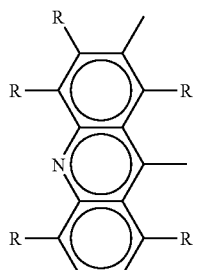
72

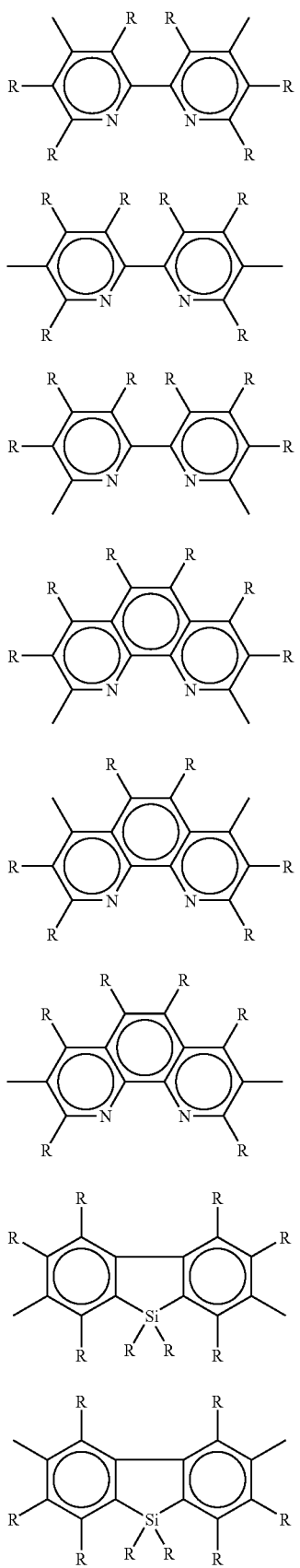

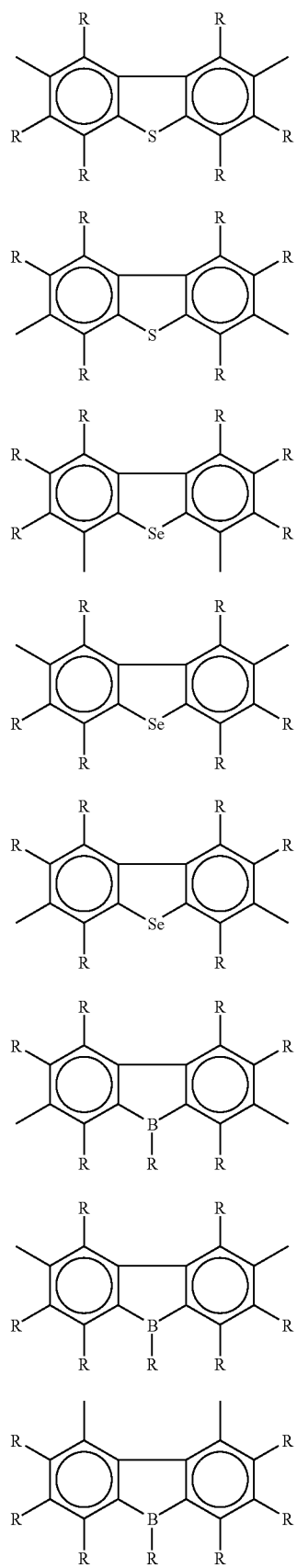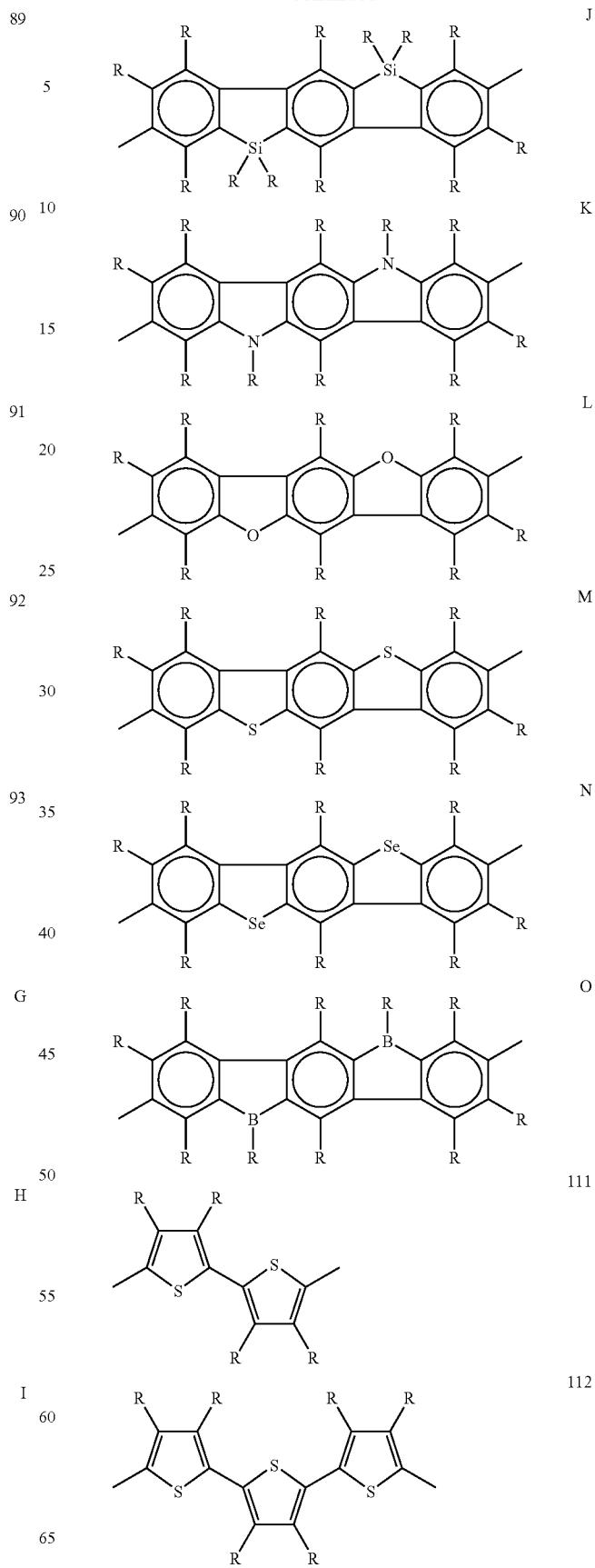

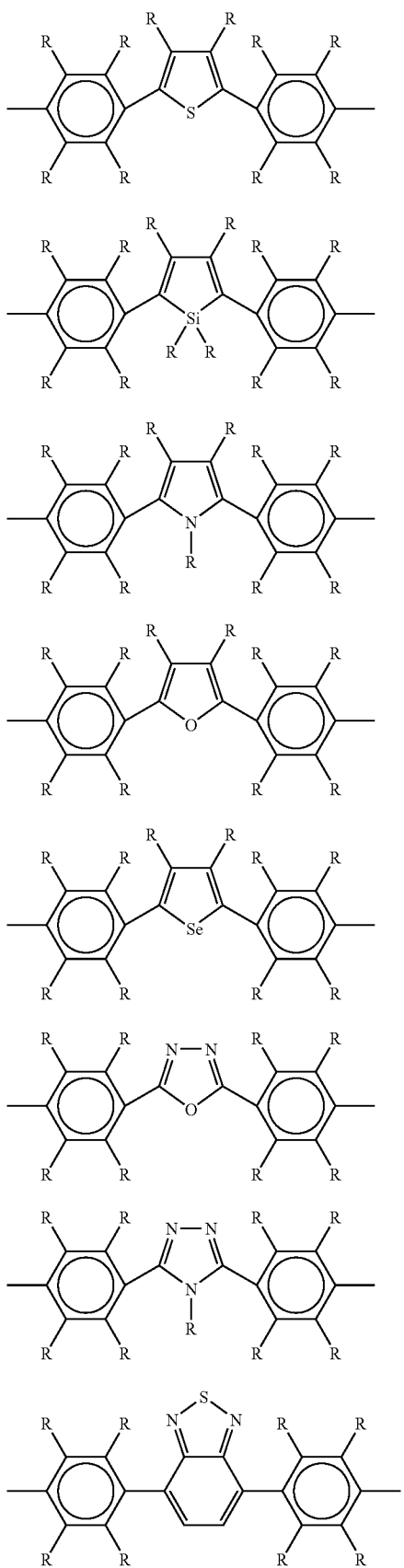
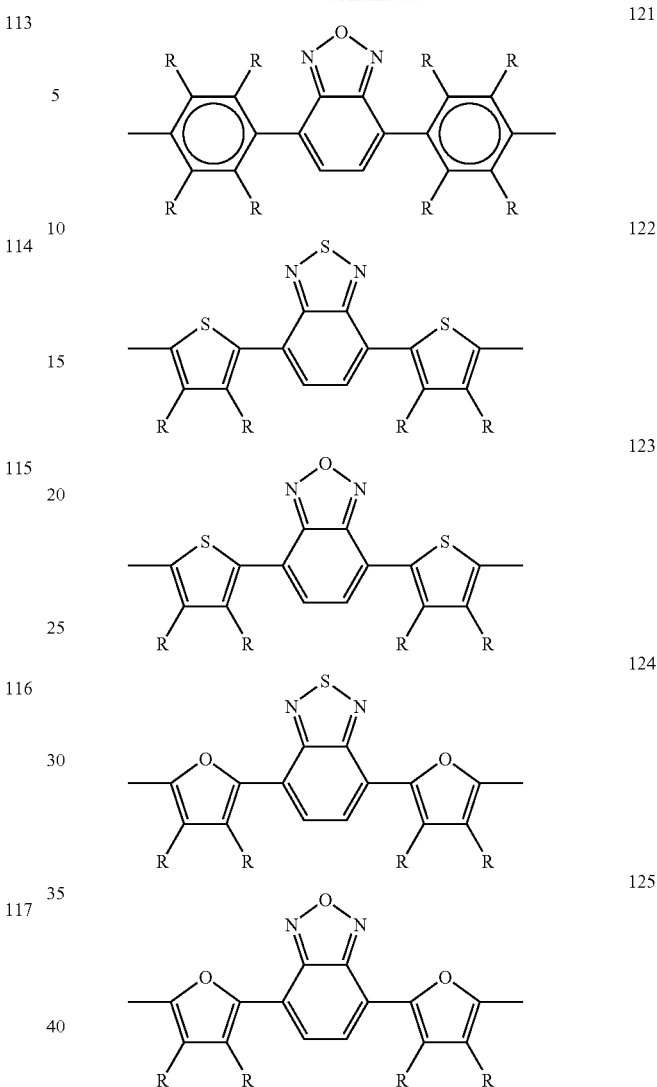

In the above formulae 1 to 125 and G to O, Rs represent each independently a hydrogen atom, alkyl group, alkoxy group, alkylthio group, aryl group, aryloxy group, arylthio group, arylalkyl group, arylalkoxy group, arylalkylthio group, arylalkenyl group, arylalkynyl group, amino group, substituted amino group, silyl group, substituted silyl group, silyloxy group, substituted silyloxy group, halogen atom, acyl group, acyloxy group, imine residue, amide group, substituted imide group, monovalent heterocyclic group, carboxyl group, substituted carboxyl group, polymerizable substituent or cyano group.

In the above examples, a plurality of Rs are present in one structural formula, and these may be the same or different. For improving solubility in a solvent, it is preferable that at least one of a plurality of Rs in one structural formula is a group other than a hydrogen atom, and it is preferable that the form of a repeating unit including substituents shows little symmetry. Further, it is preferable that at least one R in one structural formula is a group containing a cyclic or branched alkyl group. A plurality of Rs may also be connected to form a ring.

When R is a substituent containing an alkyl group in the above formula, this alkyl group may be linear, branched or cyclic, or a combination thereof, and in the case of non-linear, exemplified are an isoamyl group, 2-ethylhexyl group, 3,7-dimethyloctyl group, cyclohexyl group, 4-$C_1$ to $C_{12}$ alkylcyclohexyl group and the like.

Further, a methyl group or methylene group in the group containing an alkyl group may be substituted by a methyl group or methylene group substituted with a hetero atom or one or more fluorine atoms. Exemplified as these hetero atoms are an oxygen atom, sulfur atom, nitrogen atom and the like.

Here, the alkyl group may be linear, branched or cyclic, and usually has about 1 to 20 carbon atoms, and specific examples thereof include a methyl group, ethyl group, propyl group, i-propyl group, butyl group, i-butyl group, t-butyl group, pentyl group, hexyl group, cyclohexyl group, heptyl group, octyl group, 2-ethylhexyl group, nonyl group, decyl group, 3,7-dimethyloctyl group, lauryl group, trifluoromethyl group, pentafluoroethyl group, perfluorobutyl group, perfluorohexyl group, perfluorooctyl group and the like, and preferable are a pentyl group, hexyl group, octyl group, 2-ethylhexyl group, decyl group and 3,7-dimethyloctyl group.

The alkoxy group may be linear, branched or cyclic, and usually has about 1 to 20 carbon atoms, and specific examples thereof include a methoxy group, ethoxy group, propyloxy group, i-propyloxy group, butoxy group, i-butoxy group, t-butoxy group, pentyloxy group, hexyloxy group, cyclohexyloxy group, heptyloxy group, octyloxy group, 2-ethylhexyloxy group, nonyloxy group, decyloxy group, 3,7-dimethyloctyloxy group, lauryloxy group, trifluoromethoxy group, pentafluoroethoxy group, perfluorobutoxy group, perfluorohexyloxy group, perfluorooctyloxy group, methoxymethyloxy group, 2-methoxyethyloxy group and the like, and preferable are a pentyloxy group, hexyloxy group, octyloxy group, 2-ethylhexyloxy group, decyloxy group and 3,7-dimethyloctyloxy group.

The alkylthio group may be linear, branched or cyclic, and usually has about 1 to 20 carbon atoms, and specific examples thereof include a methylthio group, ethylthio group, propylthio group, i-propylthio group, butylthio group, i-butylthio group, t-butylthio group, pentylthio group, hexylthio group, cyclohexylthio group, heptylthio group, octylthio group, 2-ethylhexylthio group, nonylthio group, decylthio group, 3,7-dimethyloctylthio group, laurylthio group, trifluoromethylthio group and the like, and preferable are a pentylthio group, hexylthio group, octylthio group, 2-ethylhexylthio group, decylthio group and 3,7-dimethyloctylthio group.

The aryl group usually has about 6 to 60 carbon atoms, and specific examples thereof include a phenyl group, $C_1$ to $C_{12}$ alkoxyphenyl groups ($C_1$ to $C_{12}$ means 1 to 12 carbon atoms, applicable also in the following descriptions), $C_1$ to $C_{12}$ alkylphenyl groups, 1-naphthyl group, 2-naphthyl group, 1-anthracenyl group, 2-anthracenyl group, 9-anthracenyl group, pentafluorophenyl group and the like, and preferable are $C_1$ to $C_{12}$ alkoxyphenyl groups and $C_1$ to $C_{12}$ alkylphenyl groups. Here, the aryl group is an atomic group obtained by removing one hydrogen atom from an aromatic hydrocarbon. The aromatic hydrocarbon include those having a benzene ring or condensed ring, and those obtained by bonding of two or more independent benzene rings or condensed rings directly or via a vinylene group and the like.

Specific examples of the $C_1$ to $C_{12}$ alkoxy include methoxy, ethoxy, propyloxy, i-propyloxy, butoxy, i-butoxy, t-butoxy, pentyloxy, hexyloxy, cyclohexyloxy, heptyloxy, octyloxy, 2-ethylhexyloxy, nonyloxy, decyloxy, 3,7-dimethyloctyloxy, lauryloxy group and the like.

Specific examples of the $C_1$ to $C_{12}$ alkyl include methyl, ethyl, propyl, i-propyl, butyl, i-butyl, t-butyl, pentyl, hexyl, cyclohexyl, heptyl, octyl, 2-ethylhexyl, nonyl, decyl, 3,7-dimethyloctyl, lauryl and the like.

The aryloxy group usually has about 6 to 60 carbon atoms, and specific examples thereof include a phenoxy group, $C_1$ to $C_{12}$ alkoxyphenoxy groups, $C_1$ to $C_{12}$ alkylphenoxy groups, 1-naphthyloxy group, 2-naphthyloxy group, pentafluorophenyloxy group and the like, and preferable are $C_1$ to $C_{12}$ alkoxyphenoxy groups and $C_1$ to $C_{12}$ alkylphenoxy groups.

The arylthio group usually has about 6 to 60 carbon atoms, and specific examples thereof include a phenylthio group, $C_1$ to $C_{12}$ alkoxyphenylthio groups, $C_1$ to $C_{12}$ alkylphenylthio groups, 1-naphthylthio group, 2-naphthylthio group, pentafluorophenylthio group and the like, and preferable are $C_1$ to $C_{12}$ alkoxyphenylthio groups and $C_1$ to $C_{12}$ alkylphenylthio groups.

The arylalkyl group usually has about 7 to 60 carbon atoms, and specific examples thereof include phenyl-$C_1$ to $C_{12}$ alkyl groups such as a phenylmethyl group, phenylethyl group, phenylbutyl group, phenylpentyl group, phenylhexyl group, phenylheptyl group, phenyloctyl group and the like, $C_1$ to $C_{12}$ alkoxyphenyl-$C_1$ to $C_{12}$ alkyl groups, $C_1$ to $C_{12}$ alkylphenyl-$C_1$ to $C_{12}$ alkyl groups, 1-naphthyl-$C_1$ to $C_{12}$ alkyl groups, 2-naphthyl-$C_1$ to $C_{12}$ alkyl groups and the like, and preferable are $C_1$ to $C_{12}$ alkoxyphenyl-$C_1$ to $C_{12}$ alkyl groups and $C_1$ to $C_{12}$ alkylphenyl-$C_1$ to $C_{12}$ alkyl groups.

The arylalkoxy group usually has about 7 to 60 carbon atoms, and specific examples thereof include phenyl-$C_1$ to $C_{12}$ alkoxy groups such as a phenylmethoxy group, phenylethoxy group, phenylbutoxy group, phenylpentyloxy group, phenylhexyloxy group, phenylheptyloxy group, phenyloctyloxy group and the like, $C_1$ to $C_{12}$ alkoxyphenyl-$C_1$ to $C_{12}$ alkoxy groups, $C_1$ to $C_{12}$ alkylphenyl-$C_1$ to $C_{12}$ alkoxy groups, 1-naphthyl-$C_1$ to $C_{12}$ alkoxy groups, 2-naphthyl-$C_1$ to $C_{12}$ alkoxy groups and the like, and preferable are $C_1$ to $C_{12}$ alkoxyphenyl-$C_1$ to $C_{12}$ alkoxy groups and $C_1$ to $C_{12}$ alkylphenyl-$C_1$ to $C_{12}$ alkoxy groups.

The arylalkylthio group usually has about 7 to 60 carbon atoms, and specific examples thereof include phenyl-$C_1$ to $C_{12}$ alkylthio groups, $C_1$ to $C_{12}$ alkoxyphenyl-$C_1$ to $C_{12}$ alkylthio groups, $C_1$ to $C_{12}$ alkylphenyl-$C_1$ to $C_{12}$ alkylthio groups, 1-naphthyl-$C_1$ to $C_{12}$ alkylthio groups, 2-naphthyl-$C_1$ to $C_{12}$ alkylthio groups and the like, and preferable are $C_1$ to $C_{12}$ alkoxyphenyl-$C_1$ to $C_{12}$ alkylthio groups and $C_1$ to $C_{12}$ alkylphenyl-$C_1$ to $C_{12}$ alkylthio groups.

The arylalkenyl group usually has about 8 to 60 carbon atoms, and specific examples thereof include phenyl-$C_2$ to $C_{12}$ alkenyl groups, $C_1$ to $C_{12}$ alkoxyphenyl-$C_2$ to $C_{12}$ alkenyl groups, $C_1$ to $C_{12}$ alkylphenyl-$C_2$ to $C_{12}$ alkenyl groups, 1-naphthyl-$C_2$ to $C_{12}$ alkenyl groups, 2-naphthyl-$C_2$ to $C_{12}$ alkenyl groups and the like, and preferable are $C_1$ to $C_{12}$ alkoxyphenyl-$C_2$ to $C_{12}$ alkenyl groups and $C_1$ to $C_{12}$ alkylphenyl-$C_2$ to $C_{12}$ alkenyl groups.

The arylalkynyl group usually has about 8 to 60 carbon atoms, and specific examples thereof include phenyl-$C_2$ to $C_{12}$ alkynyl groups, $C_1$ to $C_{12}$ alkoxyphenyl-$C_2$ to $C_{12}$ alkynyl groups, $C_1$ to $C_{12}$ alkylphenyl-$C_2$ to $C_{12}$ alkynyl groups, 1-naphthyl-$C_2$ to $C_{12}$ alkynyl groups, 2-naphthyl-$C_2$ to $C_{12}$ alkynyl groups and the like, and preferable are $C_1$ to $C_{12}$ alkoxyphenyl-$C_2$ to $C_{12}$ alkynyl groups and $C_1$ to $C_{12}$ alkylphenyl-$C_2$ to $C_{12}$ alkynyl groups.

The substituted amino group includes amino groups substituted with one or two groups selected from alkyl groups, aryl groups, arylalkyl groups and monovalent heterocyclic groups. The substituted amino group usually has about 1 to 60 carbon atoms, and specific examples thereof include a methylamino group, dimethylamino group, ethylamino group, diethylamino group, propylamino group, dipropylamino group, i-propylamino group, diisopropylamino group, butylamino group, i-butylamino group, t-butylamino group, pentylamino group, hexylamino group, cyclohexylamino group, heptylamino group, octylamino group, 2-ethylhexylamino group, nonylamino group, decylamino group, 3,7-dimethyloctylamino group, laurylamino group, cyclopentylamino group, dicyclopentylamino group, cyclohexylamino group, dicyclohexylamino group, pyrrolidyl group, piperidyl group, ditrifluoromethylamino group, phenylamino group, diphenylamino group, $C_1$ to $C_{12}$ alkoxyphenylamino groups, di($C_1$ to $C_{12}$ alkoxyphenyl)amino groups, di($C_1$ to $C_{12}$ alkylphenyl)amino groups, 1-naphthylamino group, 2-naphthylamino group, pentafluorophenylamino group, pyridylamino group, pyridazinylamino group, pyrimidylamino group, pyrazylamino group, triazylamino group, phenyl $C_1$ to $C_{12}$ alkylamino groups, $C_1$ to $C_{12}$ alkoxyphenyl-$C_1$ to $C_{12}$ alkylamino groups, $C_1$ to $C_{12}$ alkylphenyl-$C_1$ to $C_{12}$ alkylamino groups, di($C_1$ to $C_{12}$ alkoxyphenyl-$C_1$ to $C_{12}$ alkyl)amino groups, di($C_1$ to $C_{12}$ alkylphenyl-$C_1$ to $C_{12}$ alkyl)amino groups, 1-naphthyl-$C_1$ to $C_{12}$ alkylamino groups, 2-naphthyl-$C_1$ to $C_{12}$ alkylamino groups, carbazoyl group and the like.

The substituted silyl group includes silyl groups substituted with one, two or three groups selected from alkyl groups, aryl groups, arylalkyl groups and monovalent heterocyclic groups. The substituted silyl group usually has about 1 to 60 carbon atoms, and specific examples thereof include a trimethylsilyl group, triethylsilyl group, tripropylsilyl group, tri-i-propylsilyl group, dimethyl-i-propylsilyl group, diethyl-i-propylsilyl group, t-butylsilyldimethylsilyl group, pentyldimethylsilyl group, hexyldimethylsilyl group, heptyldimethylsilyl group, octyldimethylsilyl group, 2-ethylhexyldimethylsilyl group, nonyldimethylsilyl group, decyldimethylsilyl group, 3,7-dimethyloctyl-dimethylsilyl group, lauryldimethylsilyl group, phenyl-$C_1$ to $C_{12}$ alkylsilyl groups, $C_1$ to $C_{12}$ alkoxyphenyl-$C_1$ to $C_{12}$ alkylsilyl groups, $C_1$ to $C_{12}$ alkylphenyl-$C_1$ to $C_{12}$ alkylsilyl groups, 1-naphthyl-$C_1$ to $C_{12}$ alkylsilyl groups, 2-naphthyl-$C_1$ to $C_{12}$ alkylsilyl groups, phenyl-$C_1$ to $C_{12}$ alkyldimethylsilyl groups, triphenylsilyl group, tri-p-xylylsilyl group, tribenzylsilyl group, diphenylmethylsilyl group, t-butyldiphenylsilyl group, dimethylphenylsilyl group, trimethoxysilyl group, triethoxysilyl group, tripropyloxysilyl group, tri-i-propylsilyl group, dimethyl-i-propylsilyl group, methyldimethoxysilyl group, ethyldimethoxysilyl group, and the like.

The substituted silyloxy group includes silyloxy groups substituted with one, two or three groups selected from alkyl groups, aryl groups, arylalkyl groups and monovalent heterocyclic groups. The substituted silyloxy group usually has about 1 to 60 carbon atoms, and specific examples thereof include a trimethylsilyloxy group, triethylsilyloxy group, tripropylsilyloxy group, tri-i-propylsilyloxy group, dimethyl-i-propylsilyloxy group, diethyl-i-propylsilyloxy group, t-butyldimethylsilyloxy group, pentyldimethylsilyloxy group, hexyldimethylsilyloxy group, heptyldimethylsilyloxy group, octyldimethylsilyloxy group, 2-ethylhexyl-dimethylsilyloxy group, nonyldimethylsilyloxy group, decyldimethylsilyloxy group, 3,7-dimethyloctyl-dimethylsilyloxy group, lauryldimethylsilyloxy group, phenyl-$C_1$ to $C_{12}$ alkylsilyloxy groups, $C_1$ to $C_{12}$ alkoxyphenyl-$C_1$ to $C_{12}$ alkylsilyloxy groups, $C_1$ to $C_{12}$ alkylphenyl-$C_1$ to $C_{12}$ alkylsilyloxy groups, 1-naphthyl-$C_1$ to $C_{12}$ alkylsilyloxy groups, 2-naphthyl-$C_1$ to $C_{12}$ alkylsilyloxy groups, phenyl-$C_1$ to $C_{12}$ alkyldimethylsilyloxy groups, triphenylsilyloxy group, tri-p-xylylsilyloxy group, tribenzylsilyloxy group, diphenylmethylsilyloxy group, t-butyldiphenylsilyloxy group, dimethylphenylsilyloxy group, trimethoxysilyloxy group, triethoxysilyloxy group, tripropyloxysilyloxy group, tri-i-propylsilyloxy group, dimethyl-i-propylsilyloxy group, methyldimethoxysilyloxy group, ethyldimethoxysilyloxy group, and the like.

Examples of the halogen atom includes a fluorine atom, chlorine atom, bromine atom and iodine atom.

The acyl group usually has about 2 to 20 carbon atoms, and specific examples thereof include an acetyl group, propionyl group, butylyl group, isobutylyl group, pivaloyl group, benzoyl group, trifluoroacetyl group, pentafluorobenzoyl group and the like.

The acyloxy group usually has about 2 to 20 carbon atoms, and specific examples thereof include an acetoxy group, propionyloxy group, butylyloxy group, isobutylyloxy group, pivaloyloxy group, benzoyloxy group, trifluoroacetyloxy group, pentafluorobenzoyloxy group and the like.

The imine residue includes residues obtained by removing one hydrogen atom from imine compounds (meaning an organic compound having —N=C— in the molecule. Examples thereof include aldimine, ketimine and, compounds obtained by substituting a hydrogen atom on N of these compounds with an alkyl group or the like), and has about 2 to 20 carbon atoms, and specific examples thereof include the following groups and the like.

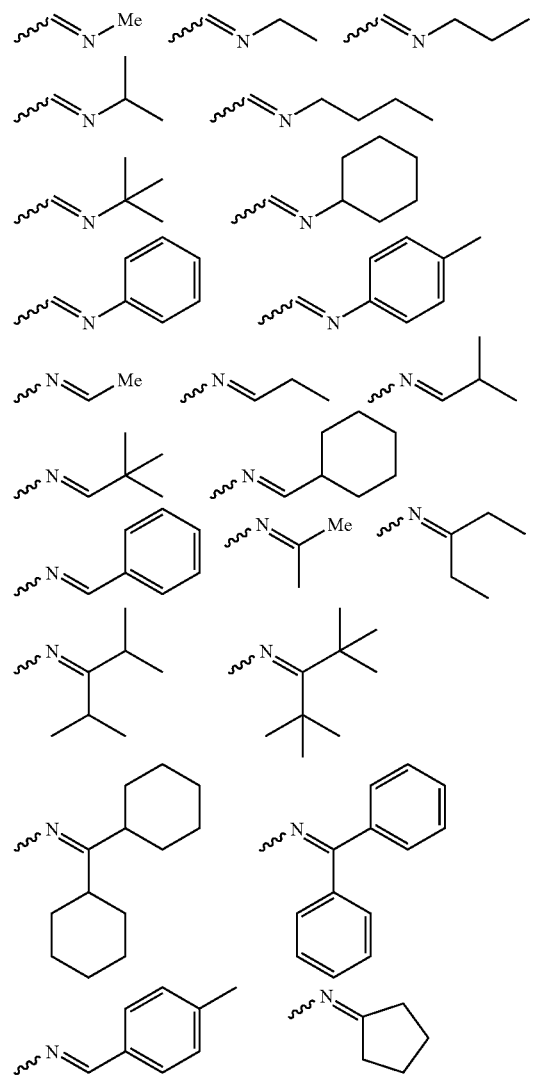

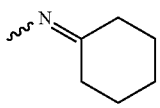

The amide group usually has about 1 to 20 carbon atoms, and specific examples thereof include a formamide group, acetamide group, propioamide group, butyloamide group, benzamide group, trifluoroacetamide group, pentafluorobenzamide group, diformamide group, diacetamide group, dipropioamide group, dibutyloamide group, dibenzamide group, ditrifluoroacetamide group, dipentafluorobenzmide group and the like.

The acid imide group includes residues obtained by removing a hydrogen atom bonded to a nitrogen atom from an acid imide, has about 4 to 20 carbon atoms, and specific examples thereof include the following groups and the like.

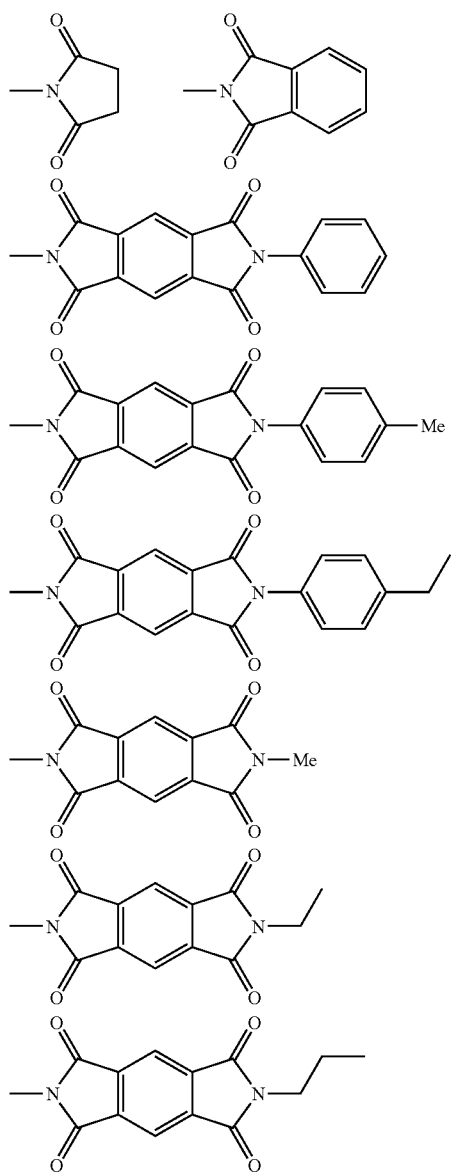

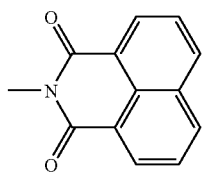
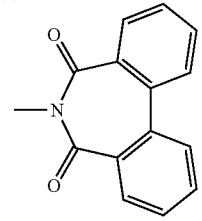

In the above examples, Me represents a methyl group.

The monovalent heterocyclic group means a remaining atomic group obtained by removing one hydrogen atom from a heterocyclic compound, and this group may have a substituent.

The un-substituted monovalent heterocyclic group usually has about 4 to 60 carbon atoms, preferably 4 to 20 carbon atoms.

Examples of the monovalent heterocyclic group include a thienyl group, $C_1$ to $C_{12}$ alkylthienyl groups, pyrrolyl group, furyl group, pyridyl group, $C_1$ to $C_{12}$ alkylpyridyl groups and the like, and preferable are a thienyl group, $C_1$ to $C_{12}$ alkylthienyl groups, pyridyl group and $C_1$ to $C_{12}$ alkylpyridyl groups.

The substituted carboxyl group includes carboxyl groups substituted with an alkyl group, aryl group, arylalkyl group or monovalent heterocyclic group. The substituted carboxyl group usually has about 2 to 60 carbon atoms, and specific examples thereof include a methoxycarbonyl group, ethoxycarbonyl group, propoxycarbonyl group, i-propoxycarbonyl group, butoxycarbonyl group, i-butoxycarbonyl group, t-butoxycarbonyl group, pentyloxy carbonyl group, hexyloxycarbonyl group, cyclohexyloxycarbonyl group, heptyloxycarbonyl group, octyloxycarbonyl group, 2-ethylhexyloxycarbonyl group, nonyloxycarbonyl group, decyloxycarbonyl group, 3,7-dimethyloctyloxycarbonyl group, dodecyloxycarbonyl group, trifluoromethoxycarbonyl group, pentafluoroethoxycarbonyl group, perfluorobutoxycarbonyl group, perfluorohexyloxycarbonyl group, perfluorooctyloxycarbonyl group, phenoxycarbonyl group, naphthoxycarbonyl group, pyridyloxycarbonyl group, and the like.

The polymerizable substituent denotes a substituent capable of causing a polymerization reaction to form a bond between two or more molecules to produce a compound. Such a group includes groups having a carbon-carbon multiple bond (for example, vinyl group, acetylene group, butenyl group, acryl group, acrylate group, acrylamide group, methacryl group, methacrylate group, methacrylamide group, arylene group, allyl group, vinyl ether group, vinylamino group, furyl group, pyrrole group, thiophene group, silole group and the like), groups having a small ring (for example, cyclopropyl group, cyclobutyl group, epoxy group, oxetane group, diketene group, episulfide group and the like), lactone group, lactam group, or groups containing a siloxane derivative, and the like. In addition to the above groups, a combination of groups capable of forming an ester bond or amide bond can also be utilized. For example, a combination of an ester group and an amino group, a combination of an ester group and a hydroxyl group, and other combinations are mentioned.

The polymerizable substituent preferably include the following groups.

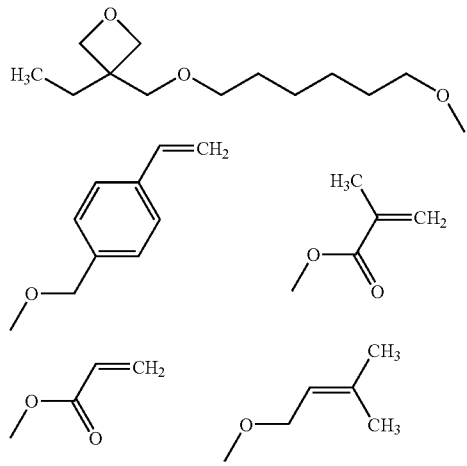

In the above formula (1), $Ar_1$, $Ar_2$, $Ar_3$ and $Ar_4$ preferably represent an arylene group, more preferably represent a substituted or un-substituted phenylene group, substituted or un-substituted biphenyldiyl group, substituted or un-substituted fluorine-diyl group, or substituted or un-substituted stilbene-diyl group as shown below, further preferably an un-substituted phenylene group.

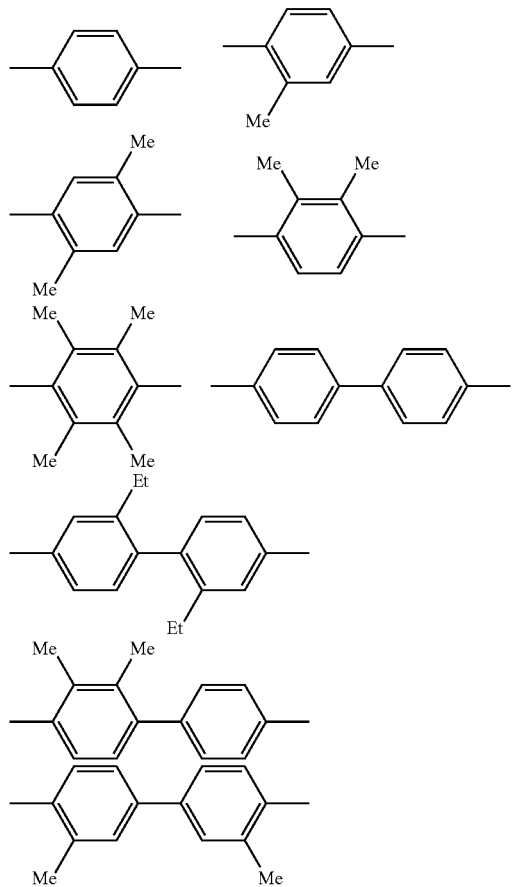

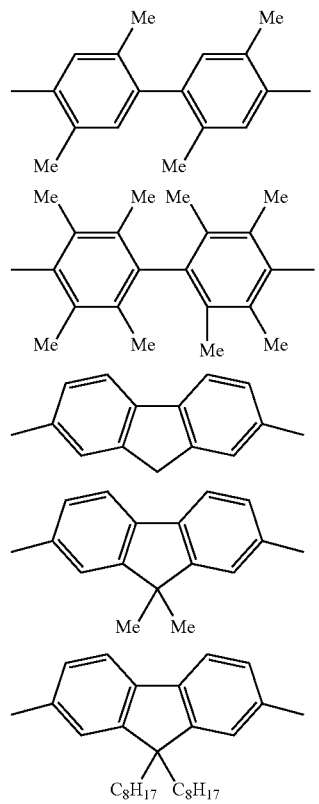

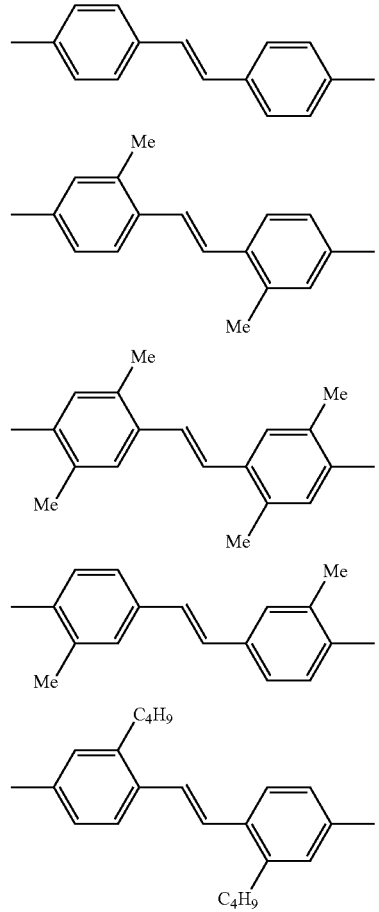

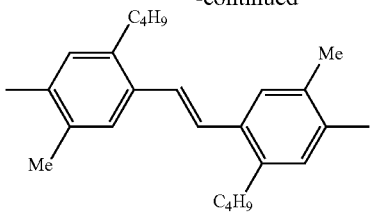

In the above formula (1), $E_1$, $E_2$ and $E_3$ represent each independently the following aryl group (A) or heterocyclic group (B).

Aryl group (A): aryl group having three or more substituents selected from alkyl groups, alkoxy groups, alkylthio groups, aryl groups, aryloxy groups, arylthio groups, arylalkyl groups, arylalkoxy groups, arylalkylthio groups, arylalkenyl groups, arylalkynyl groups, amino group, substituted amino groups, silyl group, substituted silyl groups, silyloxy group, substituted silyloxy groups, monovalent heterocyclic groups and halogen atoms.

Heterocyclic group (B): monovalent heterocyclic group having one or more substituents selected from alkyl groups, alkoxy groups, alkylthio groups, aryl groups, aryloxy groups, arylthio groups, arylalkyl groups, arylalkoxy groups, arylalkylthio groups, arylalkenyl groups, arylalkynyl groups, amino group, substituted amino groups, silyl group, substituted silyl groups, silyloxy group, substituted silyloxy groups, monovalent heterocyclic groups and halogen atoms and in which the sum of the number of the substituents and the number of hetero atoms of the heterocycle is 3 or more.

Here, alkyl groups, alkoxy groups, alkylthio groups, aryl groups, aryloxy groups, arylthio groups, arylalkyl groups, arylalkoxy groups, arylalkylthio groups, arylalkenyl groups, arylalkynyl groups, amino group, substituted amino groups, silyl group, substituted silyl groups, silyloxy group, substituted silyloxy groups and monovalent heterocyclic groups as the substituent in the above aryl group (A) have the same meanings as described above.

Of them, preferable are alkyl groups, alkoxy groups, alkylthio groups, aryl groups, aryloxy groups, arylthio groups, substituted amino groups, substituted silyl groups, substituted silyloxy groups and monovalent heterocyclic groups, more preferable are alkyl groups, alkoxy groups, arylthio groups, substituted silyl groups and substituted silyloxy groups. Further preferable are alkyl groups, alkoxy groups and arylthio groups.

Specific examples of the above aryl group (A) include the following groups.

A1
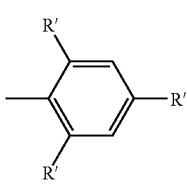

A2
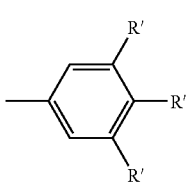

A3
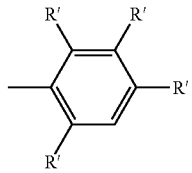

A4
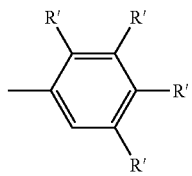

A5
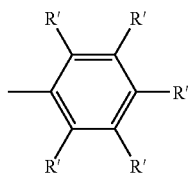

A6
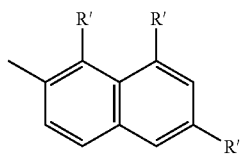

A7
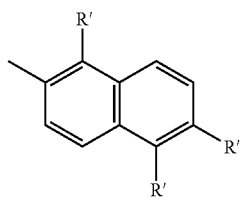

A8
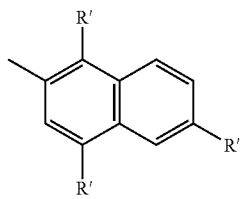

A9
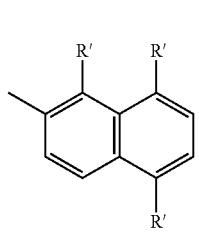

A10
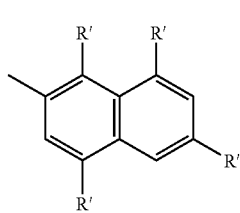

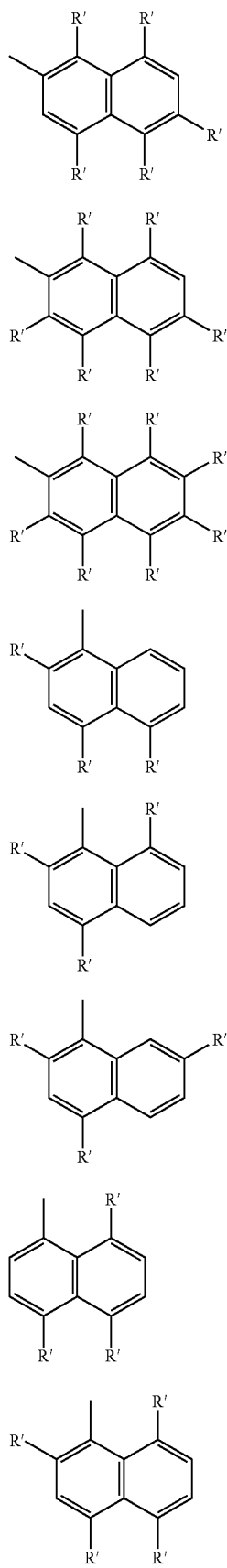
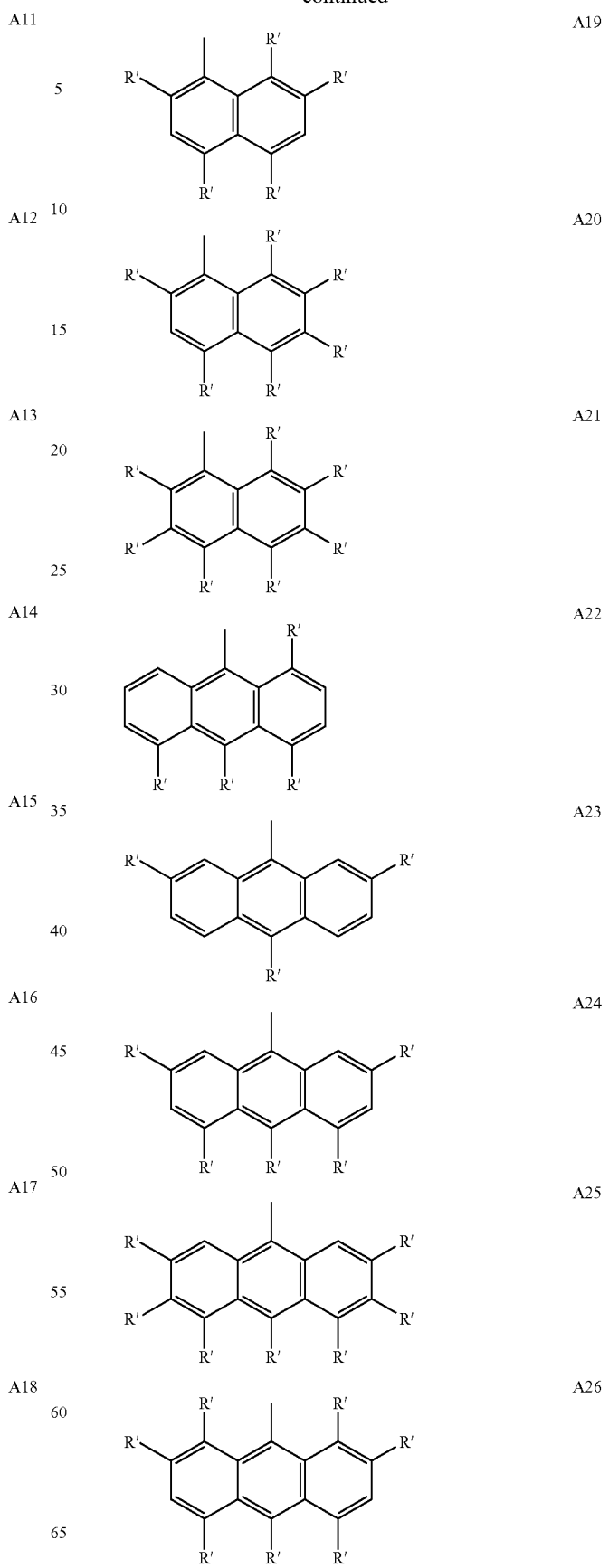

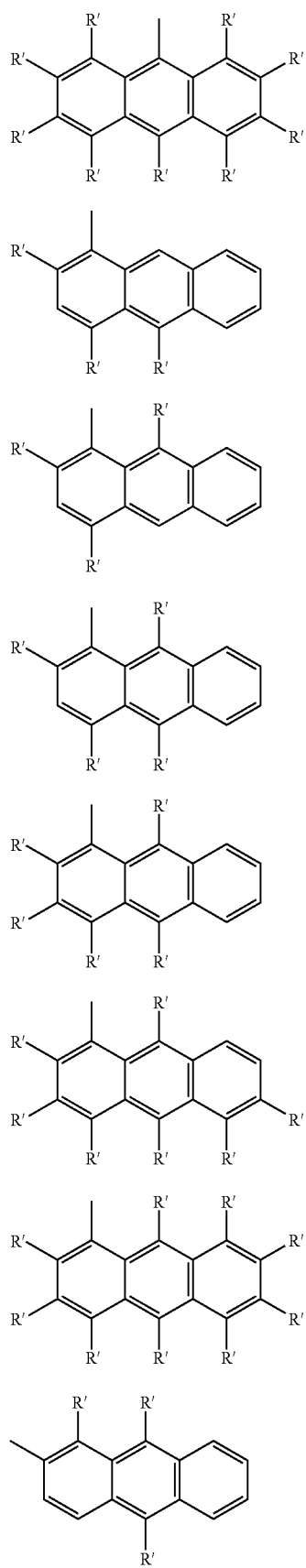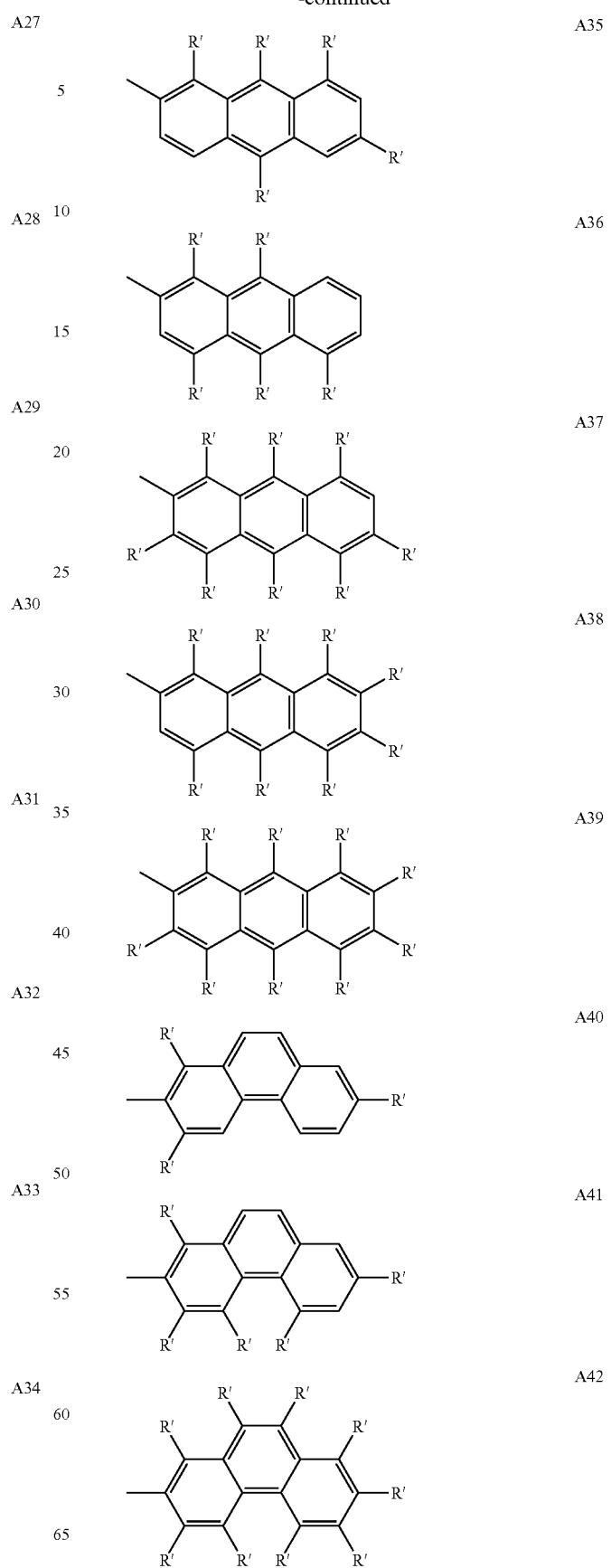

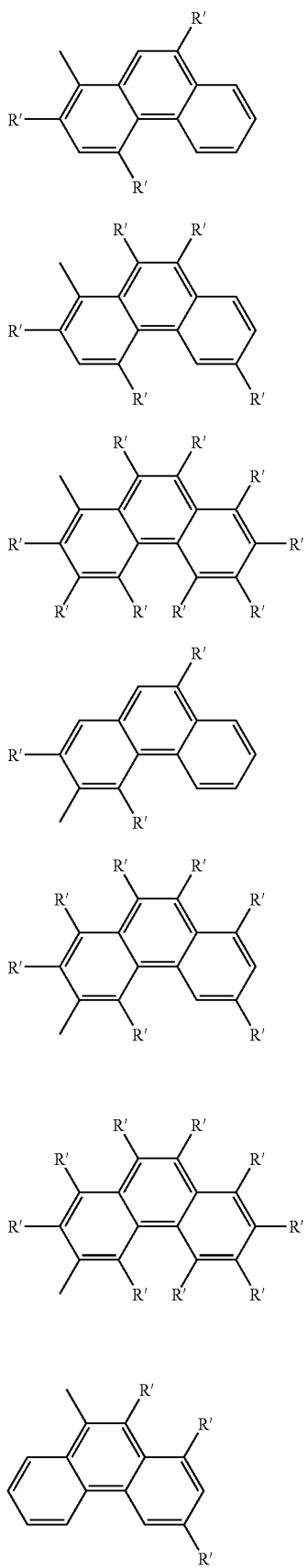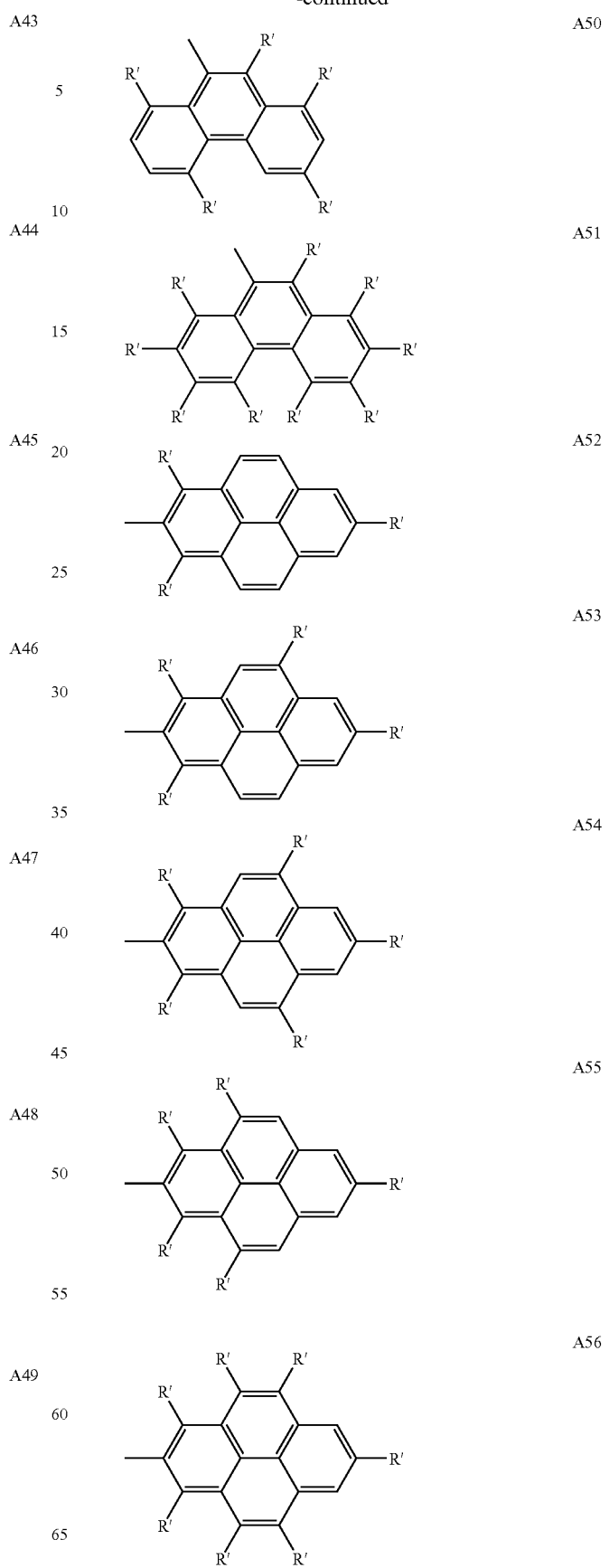

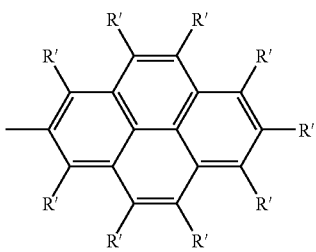
A57

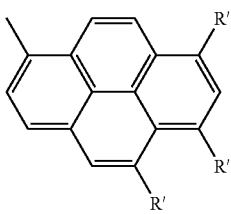
A58

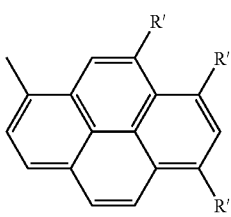
A59

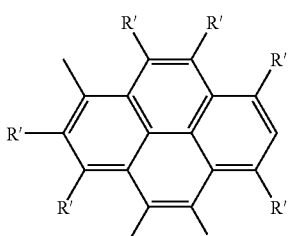
A60

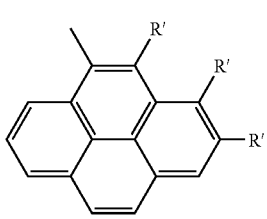
A61

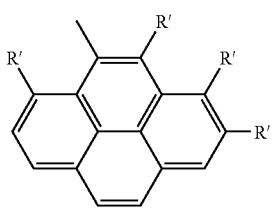
A62

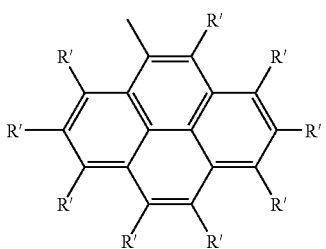
A63

In the formulae, R's represent each independently an alkyl group, alkoxy group, alkylthio group, aryl group, aryloxy group, arylthio group, arylalkyl group, arylalkoxy group, arylalkylthio group, arylalkenyl group, arylalkynyl group, amino group, substituted amino group, silyl group, substituted silyl group, silyloxy group, substituted silyloxy group, monovalent heterocyclic group or halogen atom.

Here, alkyl groups, alkoxy groups, alkylthio groups, aryl groups, aryloxy groups, arylthio groups, arylalkyl groups, arylalkoxy groups, arylalkylthio groups, arylalkenyl groups, arylalkynyl groups, amino group, substituted amino groups, silyl group, substituted silyl groups, silyloxy group, substituted silyloxy groups and monovalent heterocyclic groups as the substituent in the above heterocyclic group (B) have the same meanings as described above.

Of them, preferable are alkyl groups, alkoxy groups, alkylthio groups, aryl groups, aryloxy groups, arylthio groups, substituted amino groups, substituted silyl groups, substituted silyloxy groups and monovalent heterocyclic groups, more preferable are alkyl groups, alkoxy groups, arylthio groups, substituted silyl groups and substituted silyloxy groups. Further preferable are alkyl groups, alkoxy groups and arylthio groups.

Specific examples of the above monovalent heterocyclic group (B) include the following groups.

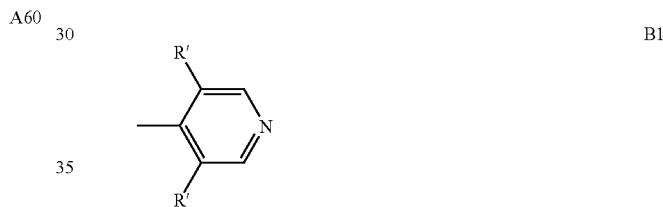
B1

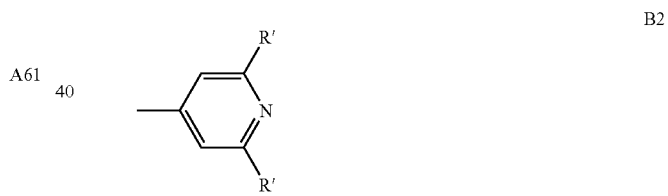
B2

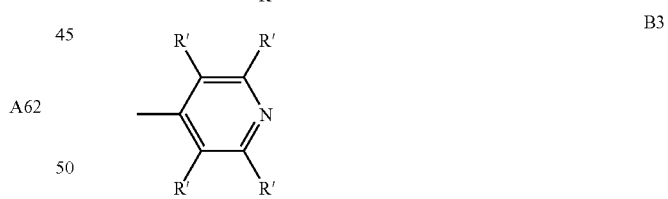
B3

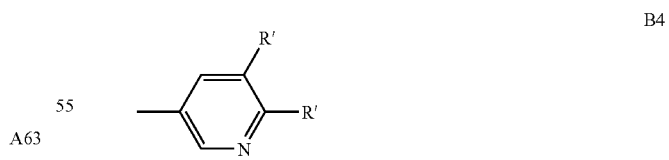
B4

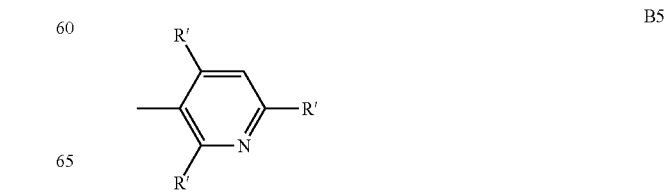
B5

-continued
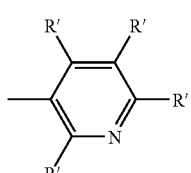 B6
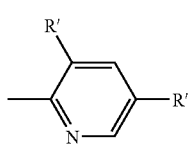 B7
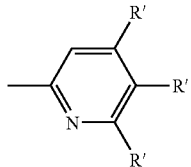 B8
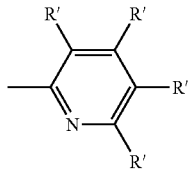 B9
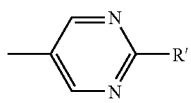 B10
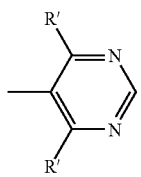 B11
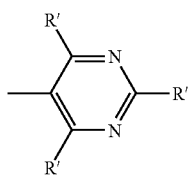 B12
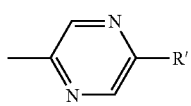 B13
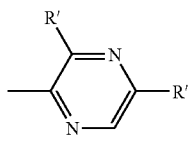 B14
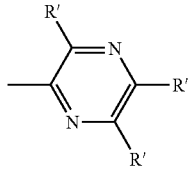 B15
-continued
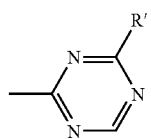 B16
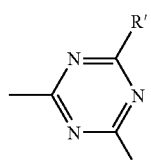 B17
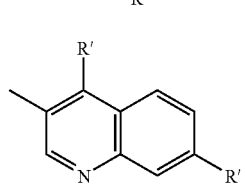 B18
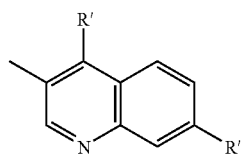 B19
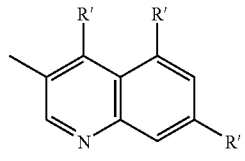 B20
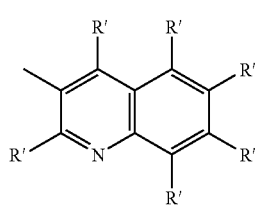 B21
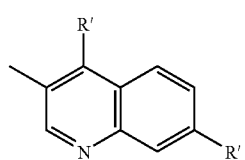 B22
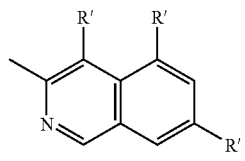 B23
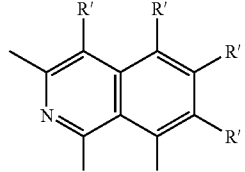 B24
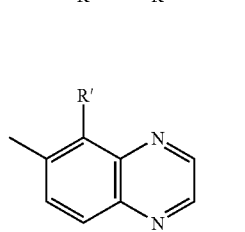

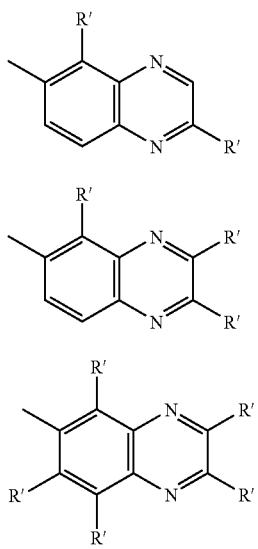

In the formulae, R' represents the same group as described above.

In the above formula (1), $E_1$, $E_2$ and $E_3$ represent preferably a phenyl group having three or more substituents, a naphthyl group having three or more substituents or an anthracenyl group having three or more substituents.

In the above formula (1), $E_1$, $E_2$ and $E_3$ represent particularly preferably a group of the following formula (3).

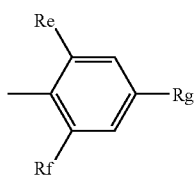

In the formula, Re, Rf and Rg represent each independently an alkyl group, alkoxy group, alkylthio group, aryl group, aryloxy group, arylthio group, arylalkyl group, arylalkoxy group, arylalkylthio group, arylalkenyl group, arylalkynyl group, amino group, substituted amino group, silyl group, substituted silyl group, silyloxy group, substituted silyloxy group, monovalent heterocyclic group or halogen atom.

In the above formula (1), a and b represent each independently 0 or 1, and $0 \leq a+b \leq 1$, preferably $a+b=1$.

As the repeating unit of the above formula (1), preferable are those in which $Ar_1$, $Ar_2$, $Ar_3$ and $Ar_4$ represent each independently an arylene group and $a+b=1$.

Particularly, those in which the arylene group is a phenylene group, biphenyldiyl group, fluorine-diyl group or stilbene-diyl group are preferable, and those in which the arylene group is an un-substituted phenylene group are further preferable.

Specific examples of the repeating unit of the above formula (1) in which $Ar_1$, $Ar_2$, $Ar_3$ and $Ar_4$ represent each independently an un-substituted phenylene group and $a=1$ and $b=0$ include the following groups.

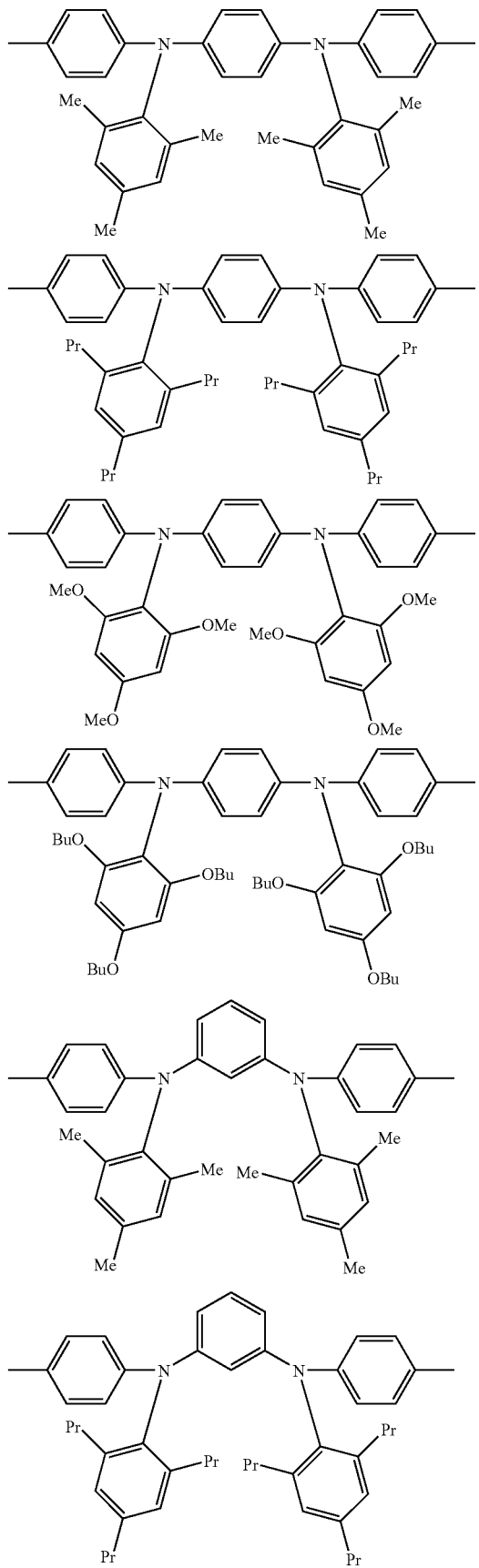

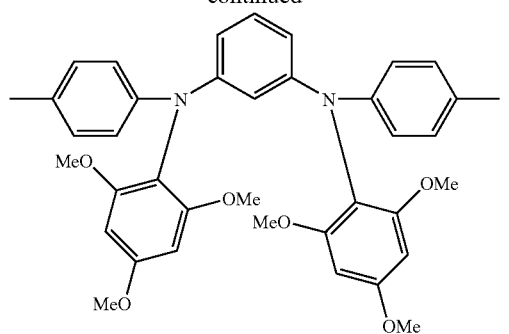
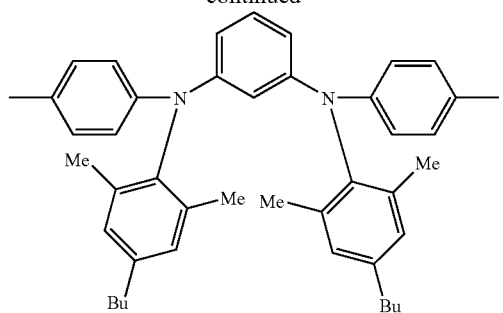
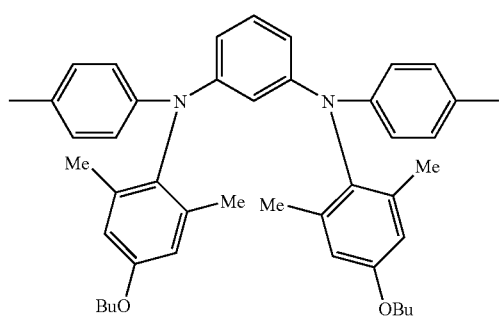
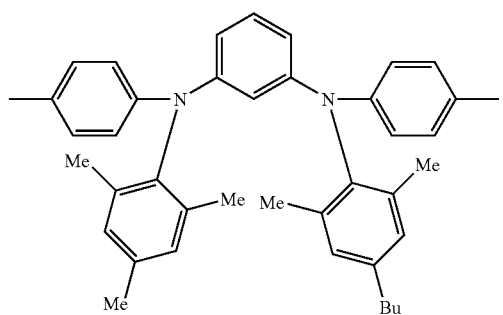
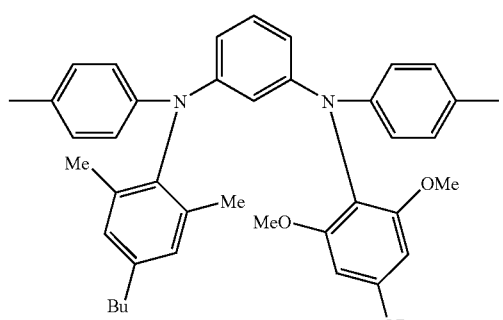
Specific examples of the repeating unit of the above formula (1) in which $Ar_1$, $Ar_2$, $Ar_3$ and $Ar_4$ represent each independently an un-substituted phenylene group and a=0 and b=1 include the following groups.

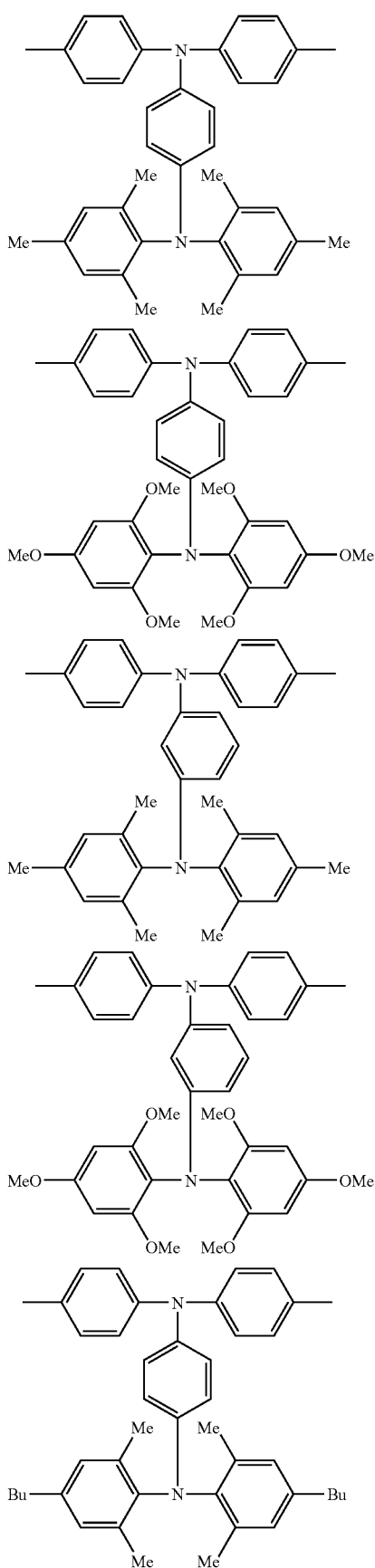
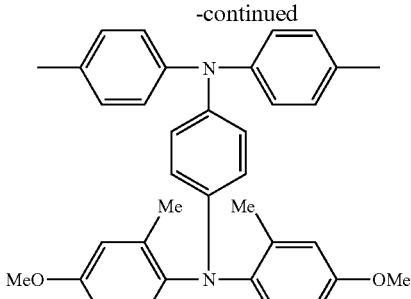
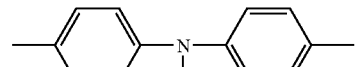
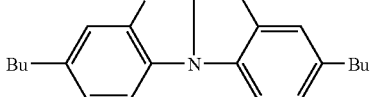
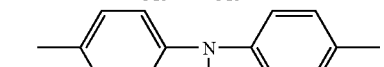
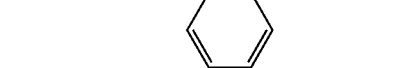
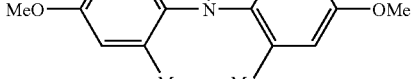

In the above formulae, Me represents a methyl group, Pr represents a propyl group, Bu represents a butyl group, MeO represents a methoxy group and BuO represents a butyloxy group, respectively.

In the above formula (1), when $E_1$, $E_2$ and $E_3$ represent the above formula (3), examples of the formula (3) include preferably those in which Re and Rf represent each independently an alkyl group having 3 or less carbon atoms, an alkoxy group having 3 or less carbon atoms or an alkylthio group having 3 or less carbon atoms and Rg represents an alkyl group having 3 to 20 carbon atoms, an alkoxy group having 3 to 20 carbon atoms or an alkylthio group having 3 to 20 carbon atoms.

In a polymer compound used in the present invention, the amount of the repeating unit of the formula (1) is usually 1 to 100 mol %, preferably 10 to 90 mol % based on all repeating units contained in the polymer compound used in the present invention.

The polymer compound used in the present invention may contain, in addition to the repeating unit of the formula (1), other one or more repeating units, and preferable as the repeating unit other than the repeating unit of the formula (1) which can be contained in the polymer compound used in the present invention are repeating units of the following formula (4), (5), (6) or (7).

$$—Ar_{12}— \quad (4)$$

$$—Ar_{12}—X_1—(Ar_{13}—X_2)_c—Ar_{14}— \quad (5)$$

$$—Ar_{12}—X_2— \quad (6)$$

$$—X_2— \quad (7)$$

In the above formulae, $Ar_{12}$, $Ar_{13}$ and $Ar_{14}$ represent each independently an arylene group, divalent heterocyclic group or divalent group having a metal complex structure. $X_1$ represents $—CR_2=CR_3—$, $—C\equiv C—$ or $—(SiR_5R_6)_d—$. $X_2$ represents $—CR_2=CR_3—$, $—C\equiv C—$, $—N(R_4)—$ or $—(SiR_5R_6)_d—$. $R_2$ and $R_3$ represent each independently a hydrogen atom, alkyl group, aryl group, monovalent heterocyclic group, carboxyl group, substituted carboxyl group or cyano group. $R_4$, $R_5$ and $R_6$ represent each independently a hydrogen atom, alkyl group, aryl group, monovalent heterocyclic group or arylalkyl group. c represents an integer of 0 to 2. d represents an integer of 1 to 12. When a plurality of $Ar_{13}$s, $R_2$s, $R_3$s, $R_5$s and $R_6$s are present, these may be the same or different.

Here, definitions and specific examples of the arylene group and divalent heterocyclic group are the same as the definitions and specific examples in the above formula (1).

The divalent group having a metal complex structure means a remaining divalent group obtained by removing two hydrogen atoms from an organic ligand of a metal complex.

The carbon number of an organic ligand in a metal complex is usually about 4 to 60. Examples of the organic ligand include 8-quinolinol and its derivatives, benzoquinolinol and its derivatives, 2-phenyl-pyridine and its derivatives, 2-phenyl-benzothiazole and its derivatives, 2-phenyl-benzoxazole and its derivatives, porphyrin and its derivatives, and the like.

Examples of the center metal of a metal complex having an organic ligand include aluminum, zinc, beryllium, iridium, platinum, gold, europium, terbium and the like.

The metal complex having an organic ligand includes those known as fluorescent materials and phosphorescent materials of lower molecular weight, so-called, triplet light emitting complexes, and the like.

Examples of the divalent group having a metal complex structure include the following groups (126 to 132).

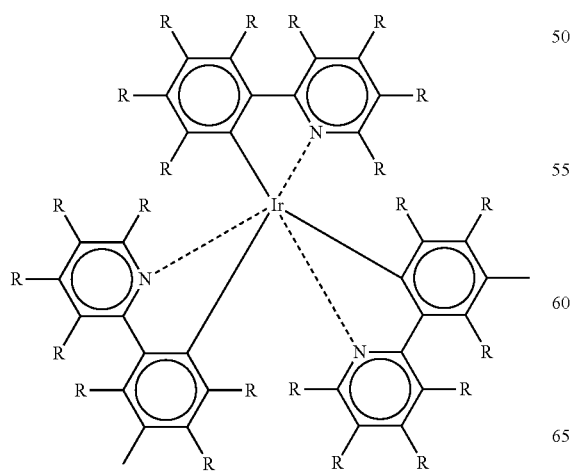
126

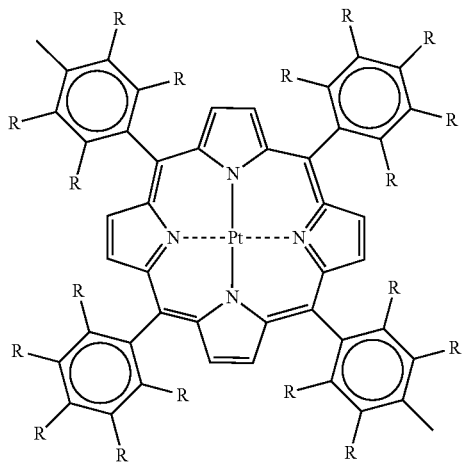
127

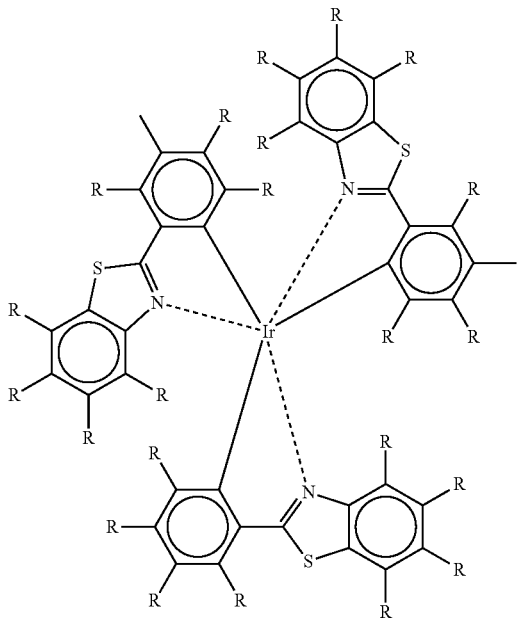
128

129

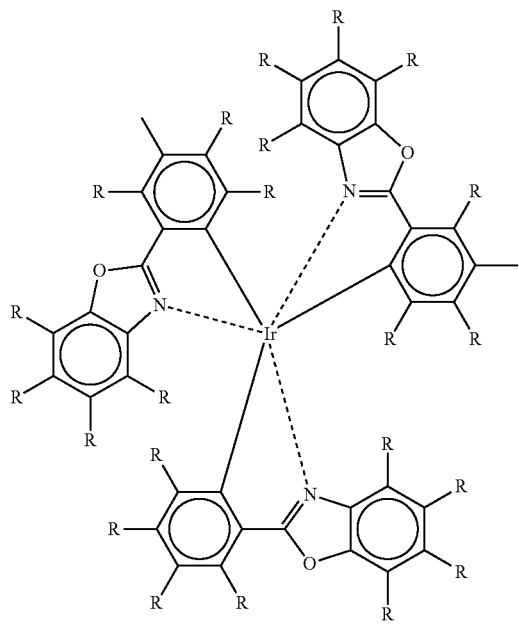

130

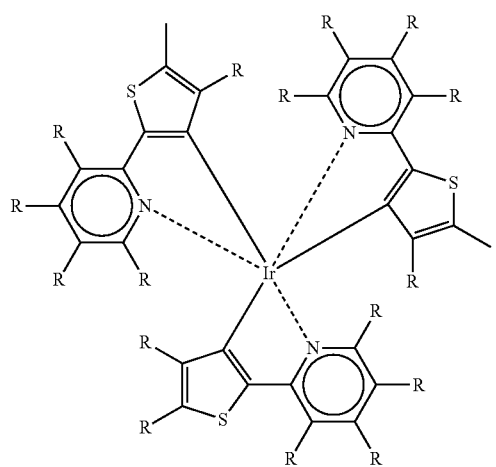

131

132

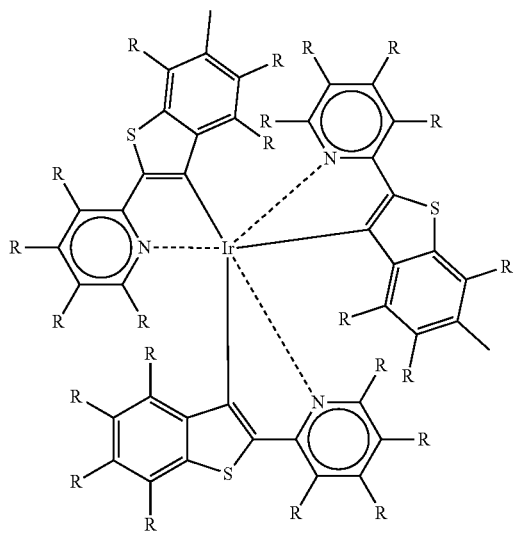

In the formulae, R represents the same meaning as in the above formulae 1 to 125.

Of repeating units other than the repeating unit of the formula (1) which can be contained in the polymer compound used in the present invention, preferable are repeating units of the above formulae (4) and (5).

Specific examples of the repeating unit of the above formula (5) include the following formulae (133 to 140).

133

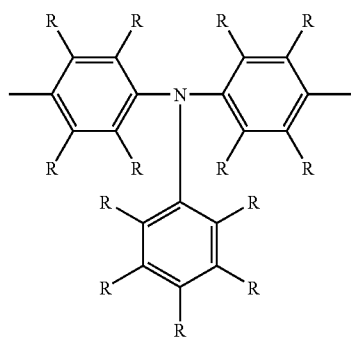

134

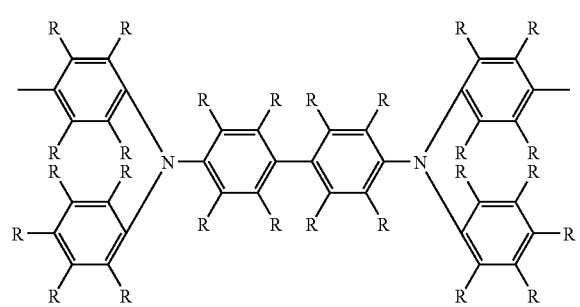

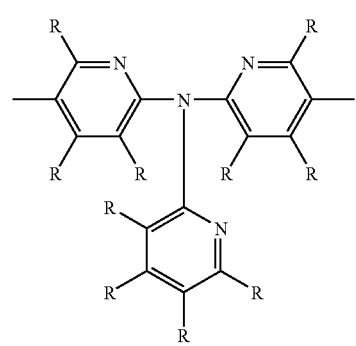

135

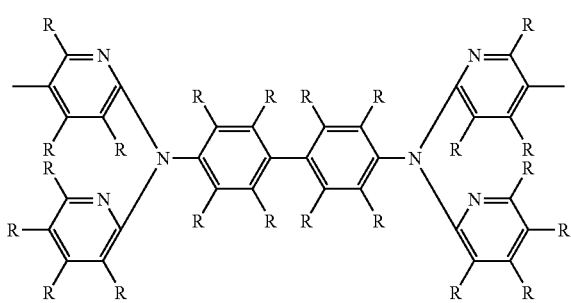

136

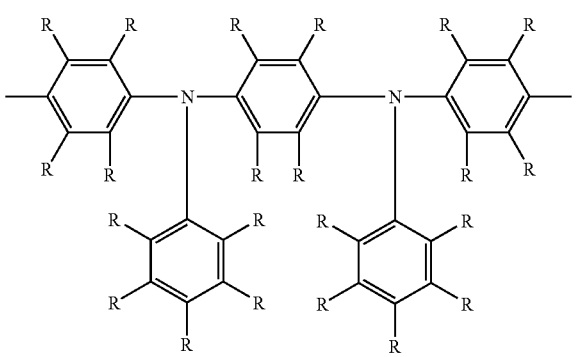

137

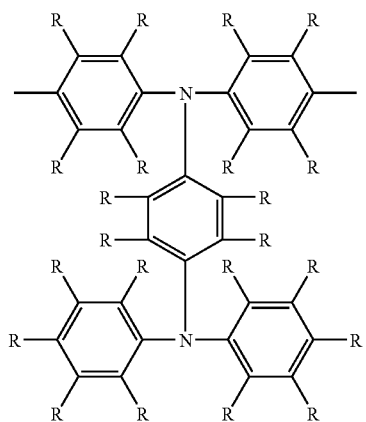

138

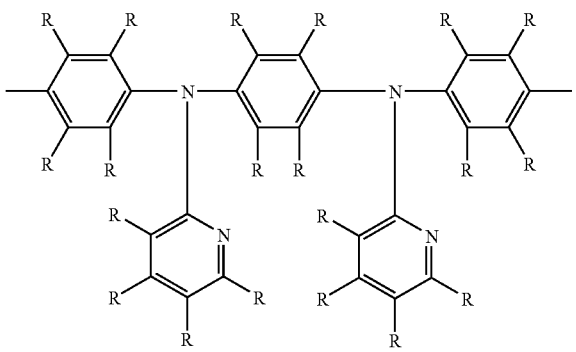

139

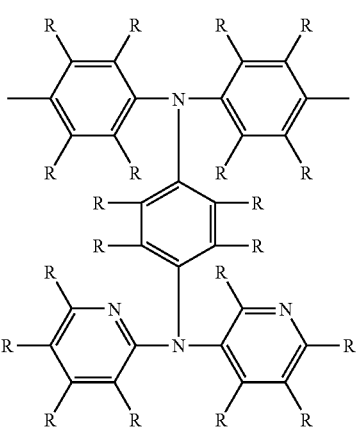

140

In the above formulae, R represents the same meaning as in the above formulae 1 to 132.

The polymer compound used in the present invention may contain a repeating unit other than the repeating unit of the formula (1), (4), (5), (6) or (7) in a range not deteriorating its life and charge transporting property. The repeating unit may be connected by a non-conjugate unit, and the repeating unit may contain its non-conjugate portion. As the non-conjugate unit, exemplified are those shown below and combinations of two or more of them. Here, R represents a group selected from the same substituents as described above, and Ar represents a hydrocarbon group having 6 to 60 carbon atoms.

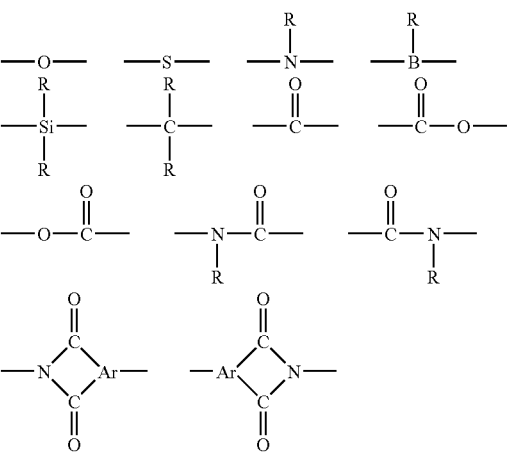

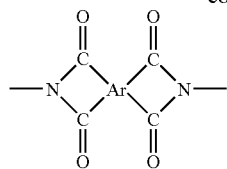

When the polymer compound used in the present invention has a polymerizable substituent, this substituent may have a repeating unit of the formula (1), or may have other repeating units. It is preferable that the number of the polymerizable substituent is one or more per molecule.

The polymer compound used in the present invention may be a homopolymer having a repeating unit of the formula (1), or a copolymer with other repeating unit. The copolymer may be random, block or graft copolymer, or a polymer having an intermediate structure of them, for example, a random copolymer with a block nature. The polymer compound used in the present invention also includes those having branching in the main chain and three or more end parts, and dendrimers.

The end group of the polymer compound used in the present invention may be protected by a stable group since if a substituent participating in a condensation polymerization reaction remains intact, there is a possibility of decrease in a light emitting property and life when the compound is made into a device. Those having a conjugate bond sequential to a conjugate structure of a main chain are preferable, and exemplified are structures containing a bond to an aryl group or heterocyclic group via a carbon-carbon bond. Specifically, substituents described in the formula 10 of Japanese Patent Application Laid-Open (JP-A) No. 9-45478 are exemplified.

The polymer compound used in the present invention has a polystyrene-reduced number-average molecular weight of usually about $10^3$ to $10^8$, preferably, $10^4$ to $10^6$.

Exemplified as good solvents for the polymer compound used in the present invention are chloroform, methylene chloride, dichloroethane, tetrahydrofuran, toluene, xylene, mesitylene, tetralin, decalin, n-butylbenzene and the like. Depending on the structure and molecular weight of the polymer compound, the polymer compound used in the present invention can be dissolved usually in an amount of 0.1 wt % or more in these solvents.

The polymer compound used in the present invention can be produced, for example, by condensation-polymerizing a compound of the following formula (8) as one of raw materials.

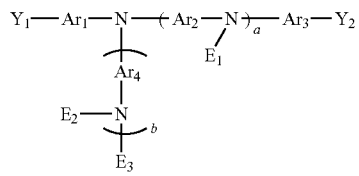

(8)

In the formula, $Ar_1$, $Ar_2$, $Ar_3$, $Ar_4$, $E_1$, $E_2$, $E_3$, a and b have the same meanings as described above. $Y_1$ an $Y_2$ represent each independently a substituent participating in a condensation polymerization reaction.

As the substituent participating in a condensation polymerization reaction, halogen atoms, alkylsulfonate groups, arylsulfonate groups, arylalkylsulfonate groups, borate groups, sulfoniummethyl group, phosphoniummethyl group, phosphonatemethyl group, mono-halogenated methyl group, —B(OH)$_2$, formyl group, cyano group, vinyl group and the like.

Here, as the alkylsulfonate group, a methanesulfonate group, ethanesulfonate group, trifluoromethanesulfonate group and the like are exemplified, as the arylsulfonate group, a benzenesulfonate group, p-toluenesulfonate group and the like exemplified, and as the arylalkylsulfonate group, a benzylsulfonate group and the like are exemplified.

As the borate group, groups of the following formulae are exemplified.

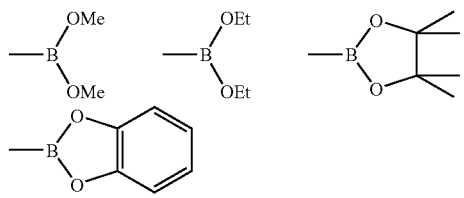

In the formulae, Me represents a methyl group and Et represents an ethyl group.

As the sulfoniummethyl group, groups of the following formulae are exemplified.

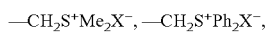

(X represents a halogen atom, and Ph represents a phenyl group.)

As the phosphoniummethyl group, groups of the following formula are exemplified.

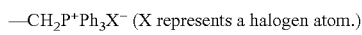

As the phosphonatemethyl group, groups of the following formula are exemplified.

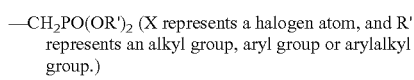

As the mono-halogenated methyl group, methyl fluoride group, methyl chloride group, methyl bromide group, methyl iodide group and the like are exemplified.

Though preferable examples of the substituent participating in a condensation polymerization reaction differ depending on the kind of the polymerization reaction, when a zero-valent nickel complex is used such as, for example, in Yamamoto coupling reaction and the like, mentioned are halogen atoms, alkylsulfonate groups, arylsulfonate groups or arylalkylsulfonate groups. When a nickel catalyst or palladium catalyst is used such as in Suzuki coupling reaction and the like, mentioned are halogen atoms, borate groups, —B(OH)$_2$ and the like.

When the polymer compound used in the present invention has a repeating unit other than the repeating unit of the formula (1), condensation polymerization may be advantageously carried out in the co-existence of a compound having two substituents participating in the condensation polymerization reaction as a repeating unit other than the repeating unit of the formula (1).

As the compound having substituents participating in the condensation polymerization reaction as a repeating unit other than the repeating unit of the formula (1), compounds of the following formulae (10) to (13) are mentioned.

By condensation-polymerizing a compound of any of the following formulae (10) to (13) in addition to a compound of the above formula (8) and/or the formula (9), a polymer compound having at least one repeating unit of the formula (4), (5), (6) or (7) in addition to a repeating unit of the above formula (1) can be produced.

$$Y_5\text{—}Ar_{12}\text{—}Y_6 \quad (10)$$

$$Y_5\text{—}Ar_{12}\text{—}X_1\text{—}(Ar_{13}\text{—}X_2)_c\text{—}Ar_{14}\text{—}Y_6 \quad (11)$$

$$Y_5\text{—}Ar_{12}\text{—}X_2\text{—}Y_6 \quad (12)$$

$$Y_5\text{—}X_2\text{—}Y_6 \quad (13)$$

In the formulae, $Ar_{12}$, $Ar_{13}$, $Ar_{14}$, $Ar_{11}$, c, $X_1$ and $X_2$ have the same meanings as described above. $Y_5$ an $Y_6$ represent each independently a substituent participating in a condensation polymerization reaction.

As the condensation polymerization reaction in the method of producing a polymer compound used in the present invention, known condensation reactions can be used depending on the substituent participating in the condensation polymerization reaction of a compound of the above formulae (10) to (13).

As the method of producing a polymer compound used in the present invention, for example, a method of polymerizing from the corresponding monomer with a nickel catalyst or palladium catalyst such as in Suzuki coupling reaction and the like, a method of polymerizing by Grignard reaction, a method of polymerizing with a zero-valent nickel complex such as in Yamamoto coupling reaction and the like, a method of polymerizing with an oxidizer such as $FeCl_3$ and the like, a method of electrochemically oxidation-polymerizing, a method by decomposition of an intermediate polymer having a suitable releasing group, and the like are exemplified.

When the polymer compound used in the present invention has a vinylene group in a main chain, for example, a method described in JP-A No. 5-202355 is mentioned. Namely, there are exemplified methods of polymerization of a compound having a formyl group and a compound having a phosphoniummethyl group by Wittig reaction, polymerization of compounds having a formyl group and a phosphoniummethyl group by Wittig reaction, polymerization of a compound having a formyl group and a compound having a phosphonatemethyl group by Honer reaction, polymerization of compounds having a formyl group and a phosphonatemethyl group by Honer reaction, polymerization of a compound having a vinyl group and a compound having a halogen atom by Heck reaction, polycondensation of a compound having two or more mono-halogenated methyl groups by a dehydrohalogenation method, polycondensation of a compound having two or more sulfoniummethyl groups by a sulfonium salt decomposition method, polymerization of a compound having a formyl group and a compound having a cyano group by Knoevenagel reaction, and the like, and methods of polymerization of a compound having two or more formyl groups by McMurry reaction, and the like.

When the polymer compound used in the present invention has a triple bond in a main chain, for example, Heck reaction and Sonogashira reaction can be utilized.

Of them, a method of polymerization with a nickel catalyst or palladium catalyst such as Suzuki coupling reaction and the like, a method of polymerization by Grignard reaction, a method of polymerization with a zero-valent nickel complex such as Yamamoto coupling reaction and the like, and methods of polymerization by Wittig reaction, polymerization by Heck reaction, polymerization by Sonogashira reaction and polymerization by Knoevenagel reaction are preferable since structure control is easy in these methods.

The reaction conditions will be described more specifically.

In the case of Wittig reaction, Horner reaction, Knoevengel reaction and the like, the reaction is carried out using an alkali in an amount of not less than equivalent, preferably 1 to 3 equivalents based on functional groups of a compound. The alkali is not particularly restricted, and for example, potassium-t-butoxide, sodium-t-butoxide, metal alcoholates such as sodium ethylate, lithium methylate and the like, hydride reagents such as sodium hydride and the like, amides such as sodiumamide and the like can be used. As the solvent, N,N-dimethylformamide, tetrahydrofuran, dioxane, toluene and the like are used. Usually, the reaction can be progressed at from room temperature to about 150° C. The reaction time is, for example, from 5 minutes to 40 hours, and times for sufficient progress of polymerization may be advantageous, and since there is no necessity for leaving for a long period of time after completion of the reaction, the reaction time is preferably 10 minutes to 24 hours. The concentration in the reaction may be appropriately selected in a range from about 0.01 wt % to maximum soluble concentration since reaction efficiency is poor in the case of too dilute and reaction control is difficult in the case of too high concentration, and usually in a range from 0.1 wt % to 30 wt %. The Wittig reaction is described in Organic Reactions, vol. 14, p. 270 to 490, John Wiley & Sons, Inc., 1965, and the like. The Knoevenagel, Wittig and dehydrohalogenation reactions are described in Makromol. Chem., Macromol. Symp., vol. 12, p. 229 (1987).

In the case of Heck reaction, monomers are reacted in the presence of a base such as triethylamine and the like using a palladium catalyst. A solvent having relatively high boiling point such as N,N-dimethylformamide, N-methylpyrrolidone and the like is used, the reaction temperature is about 80 to 160° C., and the reaction time is from about 1 hour to 100 hours. The Heck reaction is described, for example, in Polymer, vol. 39, p. 5241-5244 (1988).

In the case of Sonogashira reaction, monomers are reacted, in general, using N,N-dimethylformamide, amine-based solvent or ether-based solvent and the like in the presence of a base such as triethylamine and the like using a palladium catalyst and cuprous iodide. Depending on reaction conditions and reactivity of a substituent participating in a condensation polymerization reaction of a monomer, it is usual that the reaction temperature is about −50 to 120° C. and the reaction time is about 1 to 100 hours. The Sonogashira reaction is descried, for example, in Tetrahedron Letters, vol. 40, p. 3347 to 3350 (1999) and Tetrahedron Letters, vol. 16, p. 4467 to 4470 (1975).

In the case of Suzuki reaction, for example, palladium [tetrakis(triphenylphosphine)], palladium acetates and the like are used as a catalyst, and an inorganic base such as potassium carbonate, sodium carbonate, barium hydroxide and the like, an organic base such as triethylamine and the like, and an inorganic salt such as cesium fluoride and the like are added in an amount of not less than equivalent, preferably 1 to 10 equivalents based on monomers and reacted. An inorganic salt may be reacted in the form of aqueous solution in a two-phase system. As the solvent, N,N-dimethylformamide, toluene, dimethoxyethane, tetrahydrofuran and the like are exemplified. Depending on the solvent, temperatures of about 50 to 160° C. are suitably used. The temperature may be raised near the boiling point of the solvent and refluxed. The reaction time is about 1 hour to 200 hours.

The Suzuki reaction is described, for example, in Chem. Rev., vol. 95, p. 2457 (1995).

A case of use of a zero-valent nickel complex will be described. There are a method of using a zero-valent nickel complex, and a method of reacting a nickel salt in the presence of a reducing agent to produce zero-valent nickel in the system.

As the zero-valent nickel complex, bis(1,5-cyclooctadiene)nickel (0), (ethylene)bis(triphenylphosphine)nickel (0), tetrakis(triphenylphosphine)nickel and the like are exemplified, and of them, bis(1,5-cyclooctadiene)nickel (0) is preferable from the standpoint of versatility and cheapness.

Addition of a neutral ligand is preferable from the standpoint of improvement in yield.

Here, the neutral ligand is a ligand not having anion or cation, and exemplified are nitrogen-containing ligands such as 2,2'-bipyridyl, 1,10-phenanthroline, methylenebisoxazoline, N,N'-tetramethylethylenediamine and the like; tertiary phosphine ligands such as triphenylphosphine, tritolylphosphine, tributylphosphine, triphenoxyphosphine and the like, and nitrogen-containing ligands are preferable from the standpoint of versatility and cheapness, and 2,2'-bipyridyl is particularly preferable from the standpoint of high reactivity and high yield. Particularly, preferable is a system obtained by adding 2,2'-bipyridyl as a neutral ligand to a system containing bis(1,5-cyclooctadiene)nickel (0), from the standpoint of improvement in yield of a polymer. In a method of producing a zero-valent nickel complex in a system, nickel chloride, nickel acetate and the like are mentioned as a nickel salt. As a reducing agent, zinc, sodium hydride, hydrazine and derivatives thereof, lithium aluminum hydride and the like are mentioned, and if necessary, ammonium iodide, lithium iodide, potassium iodide and the like are used as an additive.

Particularly, a production method is preferable in which $Y_1$, $Y_2$, $Y_3$, $Y_4$, $Y_5$ and $Y_6$ represent each independently a halogen atom, alkylsulfonate group, arylsulfonate group or arylalkylsulfonate group and condensation polymerization is carried out in the presence of a zero-valent nickel complex. In this case, mentioned as raw material compounds are dihalogenated compounds, bis(alkylsulfonate) compounds, bis(arylsulfonate) compounds, bis(arylalkylsulfonate) compounds or halogen-alkylsulfonate compounds, halogen-arylsulfonate compounds, halogen-arylalkylsulfonate compounds, alkylsulfonate-arylsulfonate compounds, alkylsulfonate-arylalkylsulfonate compounds and arylsulfonate-arylalkylsulfonate compounds.

Particularly, a production method is preferable in which $Y_1$, $Y_2$, $Y_3$, $Y_4$, $Y_5$ and $Y_6$ represent each independently a halogen atom, alkylsulfonate group, arylsulfonate group, arylalkylsulfonate group, —$B(OH)_2$ or borate group, the ratio of the sum (J) of the mol number of a halogen atom, alkylsulfonate group, arylsulfonate group and arylalkylsulfonate group to the sum (K) of the mol number of —$B(OH)_2$ and borate group is substantially 1 (usually, K/J is in a range of 0.7 to 1.2) and condensation polymerization is carried out using a nickel catalyst or palladium catalyst.

In this case, mentioned as specific combination of raw material compounds are dihalogenated compounds, bis(alkylsulfonate) compounds, bis(arylsulfonate) compounds and bis(arylalkylsulfonate) compounds with diboric acid compounds and diborate compounds. Alternatively, mentioned are halogen-boric acid compounds, halogen-borate compounds, alkylsulfonate-boric acid compounds, alkylsulfonate-borate compounds, arylsulfonate-boric acid compounds, arylsulfonate-borate compounds, arylalkylsulfonate-boric acid compounds, arylalkylsulfonate-borate acid compounds and arylalkylsulfonate-borate compounds.

It is in general preferable that the organic solvent used for producing a polymer compound used in the present invention is subjected to sufficient deoxygenation treatment and the reaction is progressed under an inert atmosphere for suppressing side reactions though varying depending on compounds to be used and the reaction. Similarly, dehydration treatment is preferably carried out. However, a case of reaction with water in a two-phase system such as Suzuki coupling reaction is not included in this occasion.

For progressing a polymerization reaction, an alkali or a suitable catalyst are added appropriately. These may be selected depending on the reaction to be used. Alkalis and catalysts which are sufficiently dissolved in a solvent used for the reaction are preferable. As a method of mixing an alkali or catalyst, a method in which a solution of an alkali or catalyst is added slowly while stirring the reaction solution under an inert atmosphere of argon, nitrogen and the like, or, in reverse, the reaction solution is added slowly to a solution of an alkali or catalyst is exemplified.

The polymerization time is usually about 5 minutes to 200 hours depending on the kind of polymerization and preferably within 10 hours from the standpoint of production cost.

The polymerization temperature is usually about −50 to 160° C. depending on the kind of polymerization and preferably 20 to 100° C. from the standpoint of high yield and low heating cost.

When the polymer compound used in the present invention is used in an organic EL device, its purity affects performances of the device such as a light emitting property and the like, therefore, it is preferable that monomers before polymerization are purified by distillation, sublimation purification, re-crystallization, column chromatography or the like before polymerization. Further, it is preferable that, after polymerization, purification treatment is carried out by conventional separation operations such as acid washing, alkali washing, neutralization, water washing, organic solvent washing, re-precipitation, centrifugal separation, extraction, column chromatography, dialysis and the like, or purification operations, drying and other operations.

The organic EL device of the present invention is characterized in that a light emitting layer exists between electrodes composed of an anode and a cathode, a layer (L) containing a polymer compound exists between the light emitting layer and the anode and the polymer compound contains a repeating unit of the above formula (1). The optimum value of the film thickness of the layer (L) varies depending on a material to be used, and the film thickness may be advantageously selected so as to give suitable driving voltage and light emission efficiency, and, for example, 1 nm to 1 μm, preferably 2 nm to 500 nm, further preferably 5 nm to 200 nm.

The layer (L) containing a polymer compound may be a hole injection and transportation layer, and the layer (L) containing a polymer compound may be adjacent to a hole injection and transportation layer.

Here, the hole injection layer denotes a layer receiving injection of holes from an anode and transporting holes, and the hole transportation layer denotes a layer transporting holes and injecting holes into a light emitting layer. When there is only one layer between an anode and a light emitting layer, this layer may be called by any name of a hole injection layer, a hole transportation layer, or a hole injection-transportation layer.

As the method of forming the layer (L), for example, a method of film formation from a solution is exemplified. As the method of film formation from a solution, there can be used application methods such as a spin coat method, casting method, micro gravure coat method, gravure coat method, bar coat method, role coat method, wire bar coat method, dip coat method, spray coat method, screen printing method, flexo printing method, offset printing method, inkjet printing method and the like. Printing methods such as a screen printing method, flexo printing method, offset printing method, inkjet printing method and the like are preferable since pattern formation and multi-color painting are easy.

Regarding the ink composition used in a printing method and the like, it is advantageous that at least one polymer compound according to the present invention is contained, and additives such as a hole transportation material, light emitting material, solvent, stabilizer and the like may be contained in addition to the polymer compound of the present invention.

The proportion of the polymer compound of the present invention in the ink composition is 20 wt % to 100 wt %, preferably 40 wt % to 100 wt % based on the total weight of the composition excluding a solvent.

When the ink composition contains a solvent, the proportion of the solvent is 1 wt % to 99.9 wt %, preferably 60 wt % to 99.5 wt %, further preferably 80 wt % to 99.0 wt % based on the total weight of the composition.

Though the viscosity of the ink composition varies depending on a printing method, when an ink composition passes through a discharge apparatus such as in an inkjet printing method and the like, it is preferable that the viscosity at 25° C. is in a range of 1 to 20 mPa·s for preventing clogging in discharging and bending in flying.

The solvent used in the ink composition is not particularly restricted, and those capable of dissolving or uniformly dispersing a material other than the solvent constituting the ink composition are preferable. When the material constituting the ink composition is soluble in a non-polar solvent, exemplified as the solvent are chlorine-based solvents such as chloroform, methylene chloride, dichloroethane and the like, ether-based solvents such as tetrahydrofuran and the like, aromatic hydrocarbon-based solvents such as toluene, xylene and the like, ketone-based solvents such as acetone, methyl ethyl ketone and the like, and ester-based solvents such as ethyl acetate, butyl acetate, ethyl cellosolve acetate and the like.

In the organic EL device of the present invention, the optimum value of the film thickness of a light emitting layer (layer having a function of light emission) varies depending on a material to be used, and the film thickness may be advantageously selected so as to give suitable driving voltage and light emission efficiency, and, for example, 1 nm to 1 μm, preferably 2 nm to 500 nm, further preferably 5 nm to 200 nm.

The light emitting layer is a layer in which a hole injected from an anode and an electron injected from a cathode rebond and a light emitting material composed of conjugated molecules of an organic substance shows light emission by re-bond energy. The light emitting material means a material used in a light emitting layer (material showing fluorescence and/or phosphorescence). The light emitting material may be a low molecular weight light emitting material or high molecular weight light emitting material. A mixture of a high molecular weight light emitting material and a low molecular weight light emitting material may be used. In the case of low molecular weight light emitting material, a light emitting layer is formed in general by a vapor deposition process.

The high molecular weight light emitting material is preferable since it can form a light emitting layer by a solution process like the layer (L).

The high molecular weight light emitting material may be a p conjugated polymer of non-conjugated polymer, or a homopolymer or copolymer, and examples of the p conjugated polymer include polyarylene-based polymers such as polyfluorene (for example, Jpn. J. Appl. Phys.), vol. 30, p. L1941 (1991)), poly-p-phenylene (for example, Adv. Mater., vol. 4, p. 36 (1992)), polypyrrole, polypyridine, polyaniline, polythiophene and the like;

polyarylenevinylene-based polymers such as poly-p-phenylenevinylene, polythienylenevinylene and the like (for example, WO98/27136);

polyphenylene sulfide, polycarbazole and the like.

Also, light emitting conjugated dendrimers are mentioned (for example, Denshi Zairyo, p. 40 to 44, December, 2003).

The non-conjugated polymer compound is obtained by increasing the molecular weight of a material of low molecular weight coloring matter, and for example, polyvinylcarbazole is mentioned.

The low molecular weight light emitting material includes two materials: a material (host material) having itself low light emitting ability, but having high film formability, and mixing other material of high light emitting ability in use, and a material (guest material) having itself high light emitting ability, but manifesting no film formability in single use, as shown in "Yuki EL no subete" (edited by Shiroto Junji, Nippon Jitsugyo Shuppansha, published on Feb. 20, 2003, first edition), p. 167 to 174. The host material includes typically an aluminum complex (Alq3), distilarylene derivatives and the like. As the host material, the above polymer material may be used. The guest material is referred to as a dopant coloring matter since the guest material is mixed in trace amount in the host. The dopant coloring material is required to have high light emitting quantum yield, and fluorescent materials and phosphorescent materials are mentioned. The light emitting mechanism in the case of a combination of host/dopant includes two mechanisms: "energy moving mechanism" in which re-bond of an electron and a hole occurs on a host molecule, and first, the host is excited, excitation energy moves to a dopant molecule and the dopant molecule is excited and emits light, and "direct re-bond excitation" in which an electron and a hole re-bond on a dopant molecule, and the dopant is directly excited and emits light. In any cases, excitation energy level of a host molecule is required to be higher than energy level of a dopant molecule. When a host emits light even without guest, a guest is not necessarily required.

As the low molecular weight fluorescent material, for example, naphthalene derivatives, anthracene or its derivatives, perylene or its derivatives, and polymethine, xanthene, coumarine and cyanine-based coloring matters, metal complexes of 8-hydroxyquinoline or its derivatives, aromatic amines, tetraphenylcyclopentadiene or its derivatives, tetraphenylbutadiene or its derivatives, and the like can be used.

Specifically, known materials such as those described, for example, in JP-A Nos. 57-51781 and 59-194393, and the like can be used.

Examples of the low molecular weight phosphorescent material include triplet light emitting complexes such as Ir(ppy)3 and Btp$_2$Ir(acac) containing iridium as a center metal, PtOEP containing platinum as a center metal, Eu(TTA)3phen containing europium as a center metal, and the like.

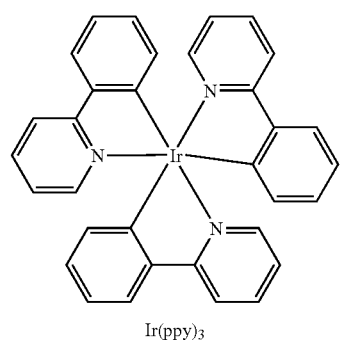

Ir(ppy)$_3$

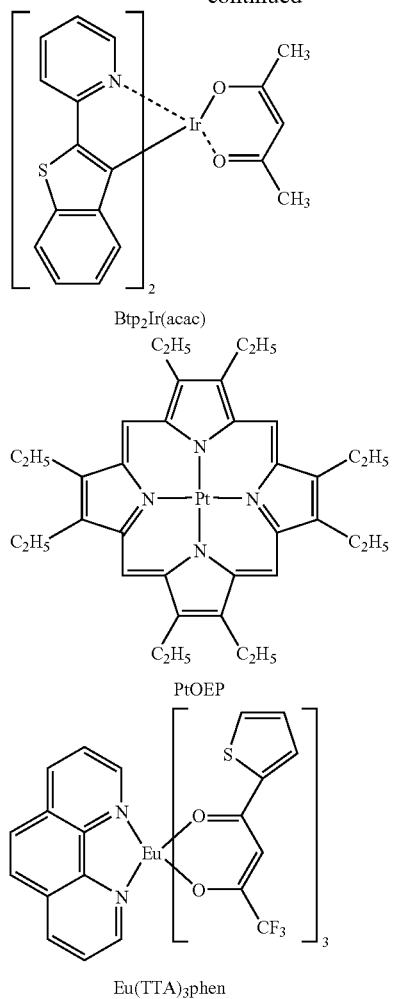

Btp₂Ir(acac)

PtOEP

Eu(TTA)₃phen

Triplet light emitting complexes are specifically described in, for example, Nature, (1998), 395, 151, Appl. Phys. Lett. (1999), 75(1), 4, Proc. SPIE-Int. Soc. Opt. Eng. (2001), 4105 (Organic light-Emitting Materials and Devices IV), 119, J. Am. Chem. Soc., (2001), 123, 4304, Appl. Phys. Lett., (1997), 71(18), 2596, Syn. Met., (1998), 94(1), 103, Syn. Met., (1999), 99(2), 1361, Adv. Mater., (1999), 11(10), 852, Jpn. J. Appl. Phys., 34, 1883 (1995) and the like.

The light emitting layer may further contain a hole transportation material and electron transportation material.

When a high molecular weight light emitting material and a hole transportation material are mixed in the light emitting layer, the mixing proportion of the hole transportation material is 1 wt % to 80 wt %, preferably 5 wt % to 60 wt %, based on the total weight of the mixture. When a high molecular weight light emitting material and an electron transportation material are mixed, the mixing proportion of the electron transportation material is 1 wt % to 80 wt %, preferably 5 wt % to 60 wt %, based on the total weight of the mixture.

As the hole transportation material or electron transportation material to be mixed, known low molecular weight compounds and high molecular weight compounds can be used, and high molecular weight compounds are preferably used. As the hole transportation material, electron transportation material and light emitting material of a high molecular weight compound, exemplified are polyfluorene, its derivatives and copolymers, polyarylene, its derivatives and copolymers, polyarylenevinylene, its derivatives and copolymers, and (co)polymers of aromatic amines and its derivatives disclosed in WO99/13692, WO99/48160, GB2340304A, WO00/53656, WO01/19834, WO00/55927, GB2348316, WO00/46321, WO00/06665, WO99/54943, WO99/54385, U.S. Pat. No. 5,777,070, WO98/06773, WO97/05184, WO00/35987, WO00/53655, WO01/34722, WO99/24526, WO00/22027, WO00/22026, WO98/27136, U.S. Pat. No. 573,636, WO98/21262, U.S. Pat. No. 5,741,921, WO97/09394, WO96/29356, WO96/10617, EP070720, WO95/07955, JP-A No. 2001-181618, JP-A No. 2001-123156, JP-A No. 2001-3045, JP-A No. 2000-351967, JP-A No. 2000-303066, JP-A No. 2000-299189, JP-A No. 2000-252065, JP-A No. 2000-136379, JP-A No. 2000-104057, JP-A No. 2000-80167, JP-A No. 10-324870, JP-A No. 10-114891, JP-A No. 9-111233, JP-A No. 9-45478 and the like.

The light emitting layer may contain a polymer compound having a repeating unit of the above formula (1) to be used in the layer (L) of the present invention.

When the layer (L) is provided adjacent to a light emitting layer and particularly when both layers are formed by an application method, there is a case in which materials of two layers are mixed to exert an undesirable influence on properties of a device and the like.

When the layer (L) is formed by an application method before formation of a light emitting layer by an application method, mentioned as a method of suppressing mixing of materials of two layers is a method in which a layer (L) is formed by an application method, then, the layer (L) is heated to render the layer insoluble in an organic solvent used for formation of a light emitting layer, then, the light emitting layer is formed. The heating temperature is usually about 150° C. to 300° C., and the heating time is usually about 1 minute to 1 hour.

In this case, for removing components not rendered insoluble in a solvent by heating, the layer (L) can be removed by rinsing with an organic solvent used in a light emitting layer after heating and before formation of a light emitting layer. When insolubilization in a solvent by heating is performed sufficiently, rinsing with an organic solvent can be omitted. For sufficiently performing insolubilization in a solvent by heating, it is preferable to use those containing at least one polymerizable group in the molecule as a polymer compound having a repeating unit of the formula (1). Further, it is preferable that the number of the polymerizable group is 5% or more based on the number of repeating units in the molecule.

The organic EL device of the present invention is characterized in that a light emitting layer exists between electrodes composed of an anode and a cathode, and a layer (L) containing a polymer compound containing a repeating unit of the above formula (1) exists between the light emitting layer and the anode, and usually, at least one of the anode and cathode is transparent or semi-transparent. It is preferable that the anode is transparent or semi-transparent. As the material of the anode, electrically conductive metal oxide films, semi-transparent metal films and the like are used. Specifically, films (NESA and the like) formed using an electrically conductive glass composed of indium oxide, zinc oxide, tin oxide, and their composites indium.tin.oxide (ITO), indium.zinc.oxide and the like, and gold, platinum, silver, copper and the like are used, and preferable are ITO, indium.zinc.oxide and tin oxide. As the production method, a vacuum vapor deposition method, sputtering method, ion plating method, plating method and the like are mentioned. As the anode, organic transparent conductive films of polyaniline or its derivatives, polythiophene or its derivatives, and the like may be used.

The thickness of an anode can be appropriately selected in view of light transmission and electric conductivity, and for example, 10 nm to 10 μm, preferably 20 nm to 1 μm, further preferably 50 nm to 500 nm.

For making charge injection easy, a layer composed of a phthalocyanine derivative, electrically conductive polymer, carbon and the like, or a layer having an average thickness of 2 nm or less composed of a metal oxide, metal fluoride, organic insulation material or the like may be provided on an anode.

As the material of a cathode used in an organic EL device of the present invention, materials of small work function are preferable. For examples, metals such as lithium, sodium, potassium, rubidium, cesium, beryllium, magnesium, calcium, strontium, barium, aluminum, scandium, vanadium, zinc, yttrium, indium, cerium, samarium, europium, terbium, ytterbium and the like, alloys composed of two or more of then, or alloys composed of at least one of them and at least one of gold, silver, platinum, copper, manganese, titanium, cobalt, nickel, tungsten and tin, and graphite or graphite intercalation compounds, and the like are used. As examples of the alloy, magnesium-silver alloy, magnesium-indium alloy, magnesium-aluminum alloy, indium-silver alloy, lithium-aluminum alloy, lithium-magnesium alloy, lithium-indium alloy, calcium-aluminum alloy, and the like. The cathode may have a lamination structure composed of two or more layers.

The thickness of the cathode can be appropriately selected in view of electric conductivity and durability, and for example, 10 nm to 10 μm, preferably 20 nm to 1 μm, further preferably 50 nm to 500 nm.

As the method of producing a cathode, a vacuum vapor deposition method, sputtering method, lamination method of thermally press-bonding a metal film, and the like are used. Between an anode and an organic substance layer, a layer composed of an electrically conductive polymer, or a layer having an average thickness of 2 nm or less composed of a metal oxide, metal fluoride, organic insulation material or the like may be provided. After producing a cathode, a protective layer may be installed for protecting the organic EL device. For using the organic EL device stably for a long period of time, it is preferable to install a protective layer and/or protective cover for protecting the device from outer environments.

As the protective layer, polymer compounds, metal oxides, metal fluorides, metal borides and the like can be used. As the protective cover, a glass plate, a plastic plate having a surface subjected to treatment for lowering water permeability, and the like can be used, and a method of sealing by pasting the cover to a device substrate with a thermo-setting resin or photo-curing resin is suitably used. When a space is maintained using a spacer, prevention of scaring of a device is easy. When the space is filled with an inert gas such as nitrogen and argon, oxidation of a cathode can be prevented. Further, by placing a drier such as barium oxide and the like in the space, imparting damage to a device by moisture adsorbed in the production process is suppressed easily. Of them, any one or more means are preferably adopted.

Mentioned as the organic EL device of the present invention are a device having an electron transportation layer provided between a cathode and a light emitting layer, an organic EL element having a hole transportation layer (layer having a function of transporting holes) provided between an anode and a layer (L), an organic EL element having an electron transportation layer (layer having a function of transporting electrons) provided between a cathode and a light emitting layer and a hole transportation layer provided between an anode and a layer (L), and the like.

As the organic EL element of the present invention, the following structures a) to d) are specifically exemplified.
 a) anode/layer (L)/light emitting layer/cathode
 b) anode/hole transportation layer/layer (L)/light emitting layer/cathode
 c) anode/layer (L)/light emitting layer/electron transportation layer/cathode
 d) anode/hole transportation layer/layer (L)/light emitting layer/electron transportation layer/cathode
 (wherein, / denotes adjacent lamination of layers, applicable also in the following descriptions)

When the organic EL element of the present invention has a hole transportation layer, exemplified as the hole transportation material to be used are polyvinylcarbazole or its derivatives, polysilane or its derivatives, polysiloxane derivatives having an aromatic amine in a side chain or main chain, pyrazoline derivatives, arylamine derivatives, stilbene derivatives, triphenyldiamine derivatives, polyaniline or its derivatives, polythiophene or its derivatives, polypyrrole or its derivatives, poly(p-phenylenevinylene) or its derivatives, poly(2,5-thienylenevinylene) or its derivatives, and the like.

Specifically, exemplified as the hole transportation material are those described in JP-A Nos. 63-70257 and 63-175860, JP-A Nos. 2-135359, 2-135361, 2-209988, 3-37992 and 3-152184, and the like.

Of them, preferable as the hole transportation material used in a hole transportation layer are high molecular weight hole transportation materials such as polyvinylcarbazole or its derivatives, polysilane or its derivatives, polysiloxane derivatives having an aromatic amine in a side chain or main chain, polyaniline or its derivatives, polythiophene or its derivatives, poly(p-phenylenevinylene) or its derivatives, poly(2,5-thienylenevinylene) or its derivatives, and the like are preferable, and further preferable are polyvinylcarbazole or its derivatives, polysilane or its derivatives and polysiloxane derivatives having an aromatic amine in a side chain or main chain.

As the hole transportation material of a low molecular weight compound, exemplified are pyrazoline derivatives, arylamine derivatives, stilbene derivatives and triphenyldiamine derivatives. In the case of a low molecular weight hole transportation material, it is preferably dispersed in a polymer binder in used.

As the polymer binder to be mixed, those not extremely disturbing charge transportation are preferable and those showing no strong absorption for visible ray are suitably used. As the polymer binder, exemplified are poly(N-vinylcarbazole), polyaniline or its derivatives, polythiophene or its derivatives, poly(p-phenylenevinylene) or its derivatives, poly(2,5-thienylenevinylene) or its derivatives, polycarbonate, polyacrylate, polymethyl acrylate, polymethyl methacrylate, polystyrene, polyvinyl chloride, polysiloxane and the like.

Polyvinylcarbazole or its derivatives are obtained, for example, from vinyl monomers by cation polymerization or radical polymerization.

As polysilane or its derivatives, compounds described in Chem. Rev., vol. 89, p. 1359 (1989), GB Patent No. 2300196 and the like are exemplified. Also as the synthesis method, methods described in these publications can be used, and particularly, Kipping method is suitably used.

As polysiloxane or its derivatives, those having a structure of the above low molecular weight hole transportation material in it side chain or main chain are suitable since the siloxane skeleton structure has scarce hole transporting property.

Particularly, those having a hole transporting aromatic amine in a side chain or main chain are exemplified.

Though the method of forming a hole transportation layer is not particularly restricted, a method of film formation from a mixed solution with a polymer binder is exemplified in the case of a low molecular weight hole transportation material.

The solvent used for film formation from a solution is not particularly restricted providing it can dissolved a hole transportation material. Exemplified as the solvent are chlorine-based solvents such as chloroform, methylene chloride, dichloroethane and the like, ether-based solvents such as tetrahydrofuran and the like, aromatic hydrocarbon-based solvents such as toluene, xylene and the like, ketone-based solvents such as acetone, methyl ethyl ketone and the like, and ester-based solvents such as ethyl acetate, butyl acetate, ethyl cellosolve acetate and the like.

As the method of film formation from a solution, there can be used application methods such as a spin coat method, casting method, micro gravure coat method, gravure coat method, bar coat method, role coat method, wire bar coat method, dip coat method, spray coat method, screen printing method, flexo printing method, offset printing method, inkjet printing method and the like from a solution.

The optimum value of the thickness of a hole transportation layer varies depending on a material to be used, and the thickness may be advantageously selected so as to give suitable driving voltage and light emission efficiency, and at least thickness not causing generation of pin holes is necessary, and when too thick, the driving voltage of a device increases undesirably. Thus, the thickness of the hole transportation layer is, for example, 1 nm to 1 µm, preferably 2 nm to 500 nm, further preferably 5 nm to 200 nm.

When the organic EL device of the present invention has an electron transportation layer, known materials can be used as an electron transportation material to be used, and exemplified are oxadiazole derivatives, anthraquinodimethane or its derivatives, benzoquinone or its derivatives, naphthoquinone or its derivatives, anthraquinone or its derivatives, tetracyanoanthraquinodimethane or its derivatives, fluorenone derivatives, diphenyldicyanoethylene or its derivatives, diphenoquinone derivatives, or metal complexes of 8-hydroxyquinoline or its derivatives, polyquinoline or its derivatives, polyquinoxaline or its derivatives, polyfluorene or its derivatives, and the like.

Specifically, those described in JP-A Nos. 63-70257 and 63-175860, JP-A Nos. 2-135359, 2-135361, 2-209988, 3-37992 and 3-152184, and the like are exemplified.

Of them, oxadiazole derivatives, benzoquinone or its derivatives, anthraquinone or its derivatives, or metal complexes of 8-hydroxyquinoline or its derivatives, polyquinoline or its derivatives, polyquinoxaline or its derivatives, polyfluorene or its derivatives are preferable, and 2-(4-biphenylyl)-5-(4-t-butylphenyl)-1,3,4-oxadiazole, benzoquinone, anthraquinone, tris(8-quinolinol)aluminum and polyquinoline are further preferable.

The method of forming an electron transportation layer is not particularly restricted, and in the case of a low molecular weight electron transportation material, a vacuum vapor deposition method from a powder, or a film formation method from solution or melted condition is exemplified, and in the case of a high molecular weight electron transportation material, a film formation method from solution or melted condition is exemplified, respectively. In film formation from solution or melted condition, the above polymer binder may be used.

The solvent used for film formation from a solution is not particularly restricted providing it can dissolve an electron transportation material and/or polymer binder. Exemplified as the solvent are chlorine-based solvents such as chloroform, methylene chloride, dichloroethane and the like, ether-based solvents such as tetrahydrofuran and the like, aromatic hydrocarbon-based solvents such as toluene, xylene and the like, ketone-based solvents such as acetone, methyl ethyl ketone and the like, and ester-based solvents such as ethyl acetate, butyl acetate, ethyl cellosolve acetate and the like.

As the method of film formation from solution or melted condition, there can be used application methods such as a spin coat method, casting method, micro gravure coat method, gravure coat method, bar coat method, role coat method, wire bar coat method, dip coat method, spray coat method, screen printing method, flexo printing method, offset printing method, inkjet printing method and the like.

The optimum value of the thickness of an electron transportation layer varies depending on a material to be used, and the thickness may be advantageously selected so as to give suitable driving voltage and light emission efficiency, and at least thickness not causing generation of pin holes is necessary, and when too thick, the driving voltage of a device increases undesirably. Thus, the thickness of the electron transportation layer is, for example, 1 nm to 1 µm, preferably 2 nm to 500 nm, further preferably 5 nm to 200 nm.

Charge transportation layers provided adjacent to an electrode having a function of improving charge injection efficiency from an electrode and having an effect of lowering the driving voltage of a device are, in particular, referred to as charge injection layer (hole injection layer, electron injection layer) in general.

Further, for improving close adherence with an electrode and improving charge injection from an electrode, the above charge injection layer or an insulation layer having a thickness of 2 nm or less may be provided adjacent to an electrode, and for improving close adherence of an interface and preventing mixing thereof, a thin buffer layer may be inserted into an interface of a charge transportation layer or light emitting layer.

The order and number of layers to be laminated, and the thickness of each layer can be appropriately selected in view of light emitting efficiency and life of a device.

The organic EL device of the present invention may have a charge injection layer (electron injection layer, hole injection layer) and examples thereof include those having a charge injection layer provided adjacent to a cathode and those having a charge injection layer provided adjacent to an anode.

For example, the following structures e) to p) are specifically mentioned.

e) anode/charge injection layer/layer (L)/light emitting layer/cathode f) anode/layer (L)/light emitting layer/charge injection layer/cathode g) anode/charge injection layer/layer (L)/light emitting layer/charge injection layer/cathode h) anode/charge injection layer/hole transportation layer/layer (L)/light emitting layer/cathode i) anode/hole transportation layer/layer (L)/light emitting layer/charge injection layer/cathode j) anode/charge injection layer/hole transportation layer/layer (L)/light emitting layer/charge injection layer/cathode k) anode/charge injection layer/layer (L)/light emitting layer/electron transportation layer/cathode l) anode/layer (L)/light emitting layer/electron transportation layer/charge injection layer/cathode m) anode/charge injection layer/layer (L)/light emitting layer/electron transportation layer/charge injection layer/cathode n) anode/charge injection layer/hole transportation layer/layer (L)/light emitting layer/electron transportation layer/cathode o) anode/hole transportation layer/layer (L)/light emitting layer/electron transportation layer/charge injection layer/cathode p) anode/charge injection layer/hole transportation layer/layer (L)/light emitting layer/electron transportation layer/charge injection layer/cathode As specific examples of the charge injection layer, there are exemplified a layer containing an electrically conductive polymer, a layer provided between an anode and a hole transportation layer and containing a material having ionization potential of an intermediate value between that of an anode material and that of a hole transportation material contained in the hole transportation layer, a layer provided between a cathode and an electron transportation layer and containing a material having electron affinity of an intermediate value between that of a cathode material and that of an electron transportation material contained in the electron transportation layer, and the like.

When the above charge injection layer contains an electrically conductive polymer, the electric conductivity of the electrically conductive polymer is preferably $10^{-5}$ S/cm or more and $10^3$ or less, and for decreasing leak current between light emitting picture elements, more preferably $10^{-5}$ S/cm or more and $10^2$ or less, further preferably $10^{-5}$ S/cm or more and $10^1$ or less.

Usually, for setting the electric conductivity of the electrically conductive polymer at $10^{-5}$ S/cm or more and 103 or less, the electrically conductive polymer is doped with suitable amount of ions.

Regarding the kind of an ion to be doped, an anion is used in a hole injection layer and a cation is used in an charge injection layer. Examples of the anion include a polystyrenesulfonate ion, alkylbenzenesulfonate ion, camphorsulfonate ion and the like, and examples of the cation include a lithium ion, sodium ion, potassium ion, tetrabutylammonium ion and the like.

The thickness of a charge injection layer is, for example, 1 nm to 100 nm, preferably 2 nm to 50 nm.

The material used in a charge injection layer may be advantageously selected appropriately in relation to a material and electrode or adjacent layer, and exemplified are polyaniline and its derivatives, polythiophene and its derivatives, polypyrrole and its derivatives, polyphenylenevinylene and its derivatives, polythienylenevinylene and its derivatives, polyquinoline and its derivatives, polyquinoxaline and its derivatives, electrically conductive polymers such as a polymer containing an aromatic amine structure in a main chain or side chain, metal phthalocyanine (copper phthalocyanine and the like), carbon and the like.

The organic EL device of the present invention may have an insulation layer having a thickness of 2 nm or less.

The insulation layer having a thickness of 2 nm or less has a function of making charge injection easy. As the material of the above insulation layer, metal fluorides, metal oxides, organic insulation materials and the like are mentioned. As the organic EL device provided with an insulation layer having a thickness of 2 nm or less, there are mentioned a device having an insulation layer having a thickness of 2 nm or less provided adjacent to a cathode and a device having an insulation layer having a thickness of 2 nm or less provided adjacent to an anode.

Specifically, the following structures q) to ab) are listed.

q) anode/insulation layer having a thickness of 2 nm or less/layer (L)/light emitting layer/cathode r) anode/layer (L)/light emitting layer/insulation layer having a thickness of 2 nm or less/cathode s) anode/insulation layer having a thickness of 2 nm or less/layer (L)/light emitting layer/insulation layer having a thickness of 2 nm or less/cathode t) anode/insulation layer having a thickness of 2 nm or less/hole transportation layer/layer (L)/light emitting layer/cathode u) anode/hole transportation layer/layer (L)/light emitting layer/insulation layer having a thickness of 2 nm or less/cathode v) anode/insulation layer having a thickness of 2 nm or less/hole transportation layer/layer (L)/light emitting layer/insulation layer having a thickness of 2 nm or less/cathode w) anode/insulation layer having a thickness of 2 nm or less/layer (L)/light emitting layer/electron transportation layer/cathode x) anode/electron blocking layer/light emitting layer/electron transportation layer/insulation layer having a thickness of 2 nm or less/cathode y) anode/insulation layer having a thickness of 2 nm or less/layer (L)/light emitting layer/electron transportation layer/insulation layer having a thickness of 2 nm or less/cathode z) anode/insulation layer having a thickness of 2 nm or less/hole transportation layer/layer (L)/light emitting layer/electron transportation layer/cathode aa) anode/hole transportation layer/layer (L)/light emitting layer/electron transportation layer/insulation layer having a thickness of 2 nm or less/cathode ab) anode/insulation layer having a thickness of 2 nm or less/hole transportation layer/layer (L)/light emitting layer/electron transportation layer/insulation layer having a thickness of 2 nm or less/cathode Though examples in which a light emitting layer and a layer (L) are adjacent are shown in the above a) to ab), examples of the present invention include also devices having other layer between a light emitting layer and a layer (L) in a) to ab).

Specifically, the following structure ac) is mentioned.

ac) anode/layer (L)/hole transportation layer/light emitting layer/cathode

The substrate forming an organic EL device of the present invention may advantageously be a substrate which forms an electrode and does not vary in forming a layer of an organic substance, and examples thereof include glass, plastic, polymer films, silicon substrates and the like. In the case of an opaque substrate, it is preferable that the opposite electrode is transparent or semi-transparent.

The organic EL device of the present invention can be used as back light of a sheet light source, segment display, dot matrix display and liquid crystal display.

For obtaining light emission in the form of sheet using an organic EL device of the present invention, a sheet anode and a sheet cathode may be advantageously placed so as to overlap. For obtaining light emission in the form of pattern, there are a method in which a mask equipped with windows in the form of pattern is placed on the surface of the above light emitting device in the form of sheet, a method in which an organic substance layer at a non-light emitting part is formed with extremely large thickness to establish substantially no-light emission, a method in which either an anode or a cathode, or both electrodes are formed in the form of pattern. By forming a pattern by any of these methods and placing several electrodes so that on/off can be switched independently, a display device of segment type capable of displaying numbers and letters, and simple marks and the like is obtained. Further, for obtaining a dot matrix device, it may be advantageous that both of an anode and a cathode are formed in the form of stripe and placed so as to cross. By a method of separately painting a plurality of light emitting materials of different emitting colors or a method of using a color filter or fluorescence exchange filter, it becomes possible to attain partial color display or multi-color display. The dot matrix device may be passively driven or actively driven in combination with TFT and the like. These displays can be used as a display of computers, televisions, portable terminals, portable telephones, car navigations, video camera view finders and the like.

The above light emitting device in the form of sheet is of self emitting thin type, and can be suitably used as a sheet light source for back light of a liquid crystal display, or a sheet light source for illumination. If a flexible substrate is used, it can also be used as a light source or display in the form of curved surface.

The present invention will be illustrated further in detail by the following examples, but the present invention is not limited to these examples.

The polystyrene-reduced number-average molecular weight was measured by SEC.

Column: TOSOH TSKgel SuperHM-H (two)+TSKgel SuperH2000 (4.6 mm I.d.×15 cm), detector: RI (SHIMADZU RID-10A) was used. Chloroform or tetrahydrofuran (THF) was used as a moving bed.

Synthesis Example 1

Synthesis of Compound A

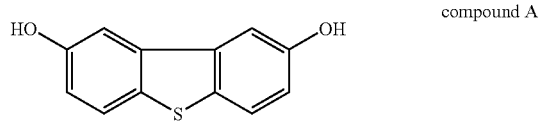 [SMILES: Oc1ccc2sc3ccc(O)cc3c2c1]

compound A

Into a 1 L four-necked flask was charged 7 g of 2,8-dibromodibenzothiophene and 280 ml of THF under an inert atmosphere, the mixture was stirred at room temperature for dissolution thereof, then, cooled down to −78° C. 29 ml of n-butyllithium (1.6 mol hexane solution) was dropped. After completion of dropping, the solution was stirred for 2 hours while keeping the temperature, and 13 g of trimethoxyboronic acid was dropped. After completion of dropping, the temperature was returned slowly to room temperature. After stirring at room temperature for 3 hours, disappearance of raw materials was confirmed by TLC. 100 ml of 5% sulfuric acid was added to stop the reaction and the solution was stirred for 12 hours at room temperature. The solution was washed with water added, and an organic layer was separated. The solvent was substituted with ethyl acetate, then, 5 ml of 30% hydrogen peroxide water was added, and the mixture was stirred at 40° C. for 5 hours. Thereafter, the organic layer was separated, and washed with a 10% ammonium sulfate iron (II) aqueous solution, then, dried and the solvent was distilled off, obtaining 4.43 g of brown solid. LC-MS measurement confirmed that by-products such as a dimer and the like were produced and the purity of compound A was 77% (LC percentage).

MS (APCI (−)): (M−H)⁻ 215

Synthesis Example 2

Synthesis of Compound B

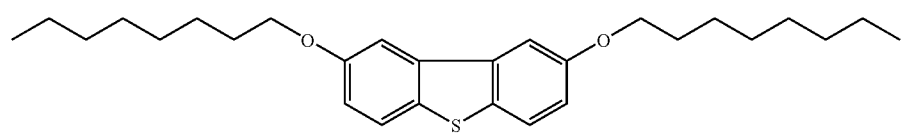

compound B

Into a 200 ml three-necked flask was charged 4.43 g of compound A, 25.1 g of n-octyl bromide and 12.5 g (23.5 mmol) of potassium carbonate under an inert atmosphere, 50 ml of methyl isobutyl ketone was added as a solvent and the mixture was refluxed while heating at 125° C. for 6 hours. After completion of the reaction, the solvent was distilled off, chloroform and water were added, an organic layer was separated, and further washed twice with water. After drying over anhydrous sodium sulfate, purification was performed by a silica gel column (developing solvent: toluene/cyclohexane=1/10), obtaining 8.49 g (LC percentage 97%, yield 94%) of compound B.

$^1$H-NMR (300 MNz/CDCl$_3$):
d 0.91 (t, 6H), 1.31~1.90 (m, 24H), 4.08 (t, 4H), 7.07 (dd, 2H), 7.55 (d, 2H), 7.68 (d, 2H)

Synthesis Example 3

Synthesis of Compound C

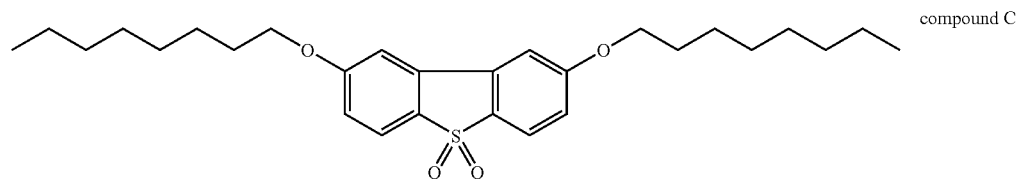 [SMILES: CCCCCCCCOc1ccc2c(c1)-c1cc(OCCCCCCCC)ccc1S2(=O)=O]

compound C

Into a 100 ml three-necked flask was added 6.67 g of compound B and 40 ml of acetic acid, and heated in an oil bath up to a bath temperature of 140° C. Subsequently, 13 ml of 30% hydrogen peroxide water was added from a cooling tube, the mixture was stirrer vigorously for 1 hour, then, the reaction was stopped by pouring into 180 ml of cold water. Extraction with chloroform, drying, then, distilling off of the solvent, gave 6.96 g (LC percentage 90%, yield 97%) of compound C.

$^1$H-NMR (300 MNz/CDCl$_3$):
d 0.90 (t, 6H), 1.26~1.87 (m, 24H), 4.06 (t, 4H), 7.19 (dd, 2H), 7.69 (d, 2H), 7.84 (d, 2H)

MS (APCI (+)): (M+H)⁺

Synthesis Example 4

Synthesis of Compound D

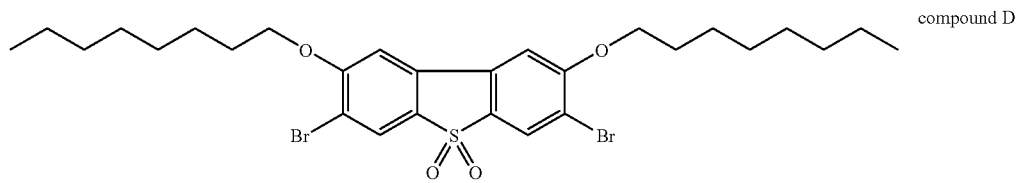 [SMILES: CCCCCCCCOc1cc2c(cc1Br)S(=O)(=O)c1cc(Br)c(OCCCCCCCC)cc1-2]
compound D

Into a 200 ml four-necked flask was added 3.96 g of compound C and 15 ml of acetic acid/chloroform=1:1 mixed liquid under an inert atmosphere, and the mixture was stirred at 70° C. to attain dissolution. Subsequently, 6.02 g of bromine was dissolved in 3 ml of the above solvent and added to the solution, and the resulting solution was stirred for 3 hours. A sodium thiosulfate aqueous solution was added to remove unreacted bromine, chloroform and water were added and an organic layer was separated and dried. The solvent was distilled off, and purification was performed by a silica gel column (developing solvent: chloroform/hexane=1/4), obtaining 4.46 g (LC percentage 98%, yield 84%) of compound D.

$^1$H-NMR (300 MNz/CDCl$_3$):
d 0.95 (t, 6H), 1.30~1.99 (m, 24H), 4.19 (t, 4H), 7.04 (s, 2H), 7.89 (s, 2H)
MS (FD$^+$) M$^+$ 630

Synthesis Example 5

Synthesis of Compound E

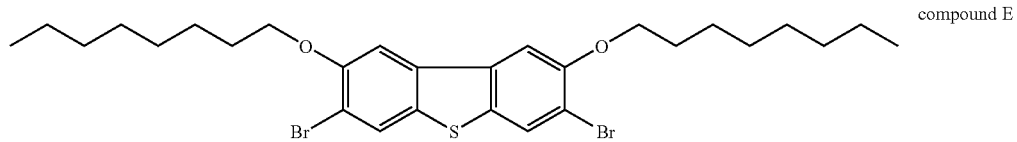 [SMILES: CCCCCCCCOc1cc2c(cc1Br)sc1cc(Br)c(OCCCCCCCC)cc12]
compound E

Into a 200 ml three-necked flask was added 3.9 g of compound D and 50 ml of diethyl ether under an inert atmosphere, and the mixture was heated up to 40° C. and stirred. 1.17 g of lithium aluminum hydride was added portion-wise, and reacted for 5 hours. By adding water portion-wise, excess lithium aluminum hydride was decomposed, and washed with 5.7 ml of 36% hydrochloric acid. Chloroform and water were added and an organic layer was separated and dried. Purification was performed by a silica gel column (developing solvent: chloroform/hexane=1/5), obtaining 1.8 g (LC percentage 99%, yield 49%) of compound E.

$^1$H-NMR (300 MNz/CDCl$_3$):
d 0.90 (t, 6H), 1.26~1.97 (m, 24H), 4.15 (t, 4H), 7.45 (s, 2H), 7.94 (s, 2H)
MS (FD$^+$) M$^+$ 598

According to MS (APCI (+)) method, peaks were detected at 615 and 598.

Synthesis Example 6

Synthesis of Polymer Compound 1

2,7-dibromo-9,9-dioctylfluorene (26 g, 0.047 mol), 2,7-dibromo-9,9-diisopentylfluorene (5.6 g, 0.012 mol) and 2,2'-bipyridyl (22 g, 0.141 mol) were dissolved in 1600 mL of dehydrated tetrahydrofuran, then, an atmosphere in the system was purged with nitrogen by bubbling of nitrogen. Under a nitrogen atmosphere, to this solution was added bis(1,5-cyclooctadiene)nickel(0){(Ni(COD)$_2$} (40 g, 0.15 mol) and the mixture was heated up to 60° C., and reacted for 8 hours. After reaction, this reaction solution was cooled down to room temperature (about 25° C.), dropped into 25% ammonia water 20 mL/methanol 1200 mL/ion exchanged water 1200 mL mixed solution and the mixture was stirred for 30 minutes, then, the deposited precipitate was filtrated and air-dried. Then, the dried precipitate was dissolved in 1100 mL of toluene and filtrated, and the filtrate was dropped into 3300 mL of methanol and stirred for 30 minutes. The deposited precipitate was filtrated, and washed with 1000 mL of methanol, then, dried under reduced pressure for 5 hours. The yield of the resulting copolymer was 20 g (hereinafter, referred to as polymer compound 1). Polymer compound 1 had a polystyrene-reduced average molecular weight and weight-average molecular weight of Mn=9.9×10$^4$ and Mw=2.0×10$^5$, respectively (moving bed: chloroform).

Synthesis Example 7

Synthesis of 4-t-butyl-2,6-dimethylbromobenzene

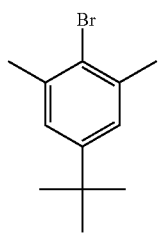

Under an inert atmosphere, 225 g of acetic acid was charged into a 500 ml three-necked flask, and 24.3 g of 5-t-butyl-m-xylene was added. Subsequently, 31.2 g of bromine was added, then, the mixture was reacted at 15 to 20° C. for 3 hours.

The reaction solution was added to 500 ml of water and the deposited precipitate was filtrated. The precipitate was washed with 250 ml of water twice, to obtain 34.2 g of white solid.

$^1$H-NMR (300 MNz/CDCl$_3$):

d (ppm)=1.3 [s, 9H]m 2.4 [s, 6H], 7.1 [s, 2H]

MS (FD$^+$) M$^+$ 241

Synthesis Example 8

Synthesis of N,N'-diphenyl-N,N'-bis(4-t-butyl-2,6-dimethylphenyl)-1,4-phenylenediamine

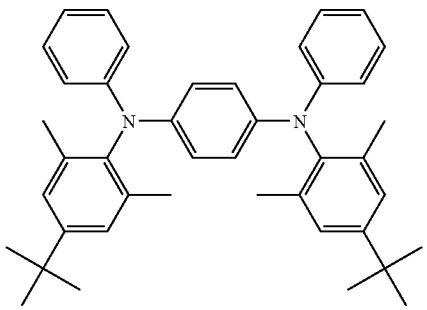 [SMILES: Cc1cc(C(C)(C)C)cc(C)c1N(c1ccccc1)c1ccc(N(c2ccccc2)c2c(C)cc(C(C)(C)C)cc2C)cc1]

Under an inert atmosphere, 36 ml of deaerated dehydrated toluene was charged into a 100 ml three-necked flask, and 0.63 g of tri(t-butyl)phosphine was added. Subsequently, 0.41 g of tris(dibenzylideneacetone)dipalladium, 9.6 g of the above 4-t-butyl-2,6-dimethylbromobenzene, 5.2 g of t-butoxysodium and 4.7 g of N,N'-diphenyl-1,4-phenylenediamine were added, then, reacted at 100° C. for 3 hours.

The reaction solution was added to 300 ml of saturated saline, and extracted with 300 ml of chloroform warmed at about 50° C. The solvent was distilled off, then, 100 ml of toluene was added, the mixture was heated until dissolution of solid, and allowed to cool, then, the precipitate was filtrated, to obtain 9.9 g of white solid.

Synthesis Example 9

Synthesis of N,N'-bis(4-bromophenyl)-N,N'-bis(4-t-butyl-2,6-dimethylphenyl)-1,4-phenylenediamine Under an inert atmosphere, 350 ml of N,N-dimethylformamide was charged into a 1000 ml of three-necked flask, and 5.2 g of the above N,N'-diphenyl-N,N'-bis(4-t-butyl-2,6-dimethylphenyl)-1,4-phenylenediamine was dissolved, then, N-bromosuccinimide 3.5 g/N,N-dimethylformamide solution was dropped while cooling in an ice bath, and reacted over night and day.

To the reaction solution was added 150 ml of water, the deposited precipitate was filtrated, and washed with 50 ml of methanol twice, to obtain 4.4 g of white solid.

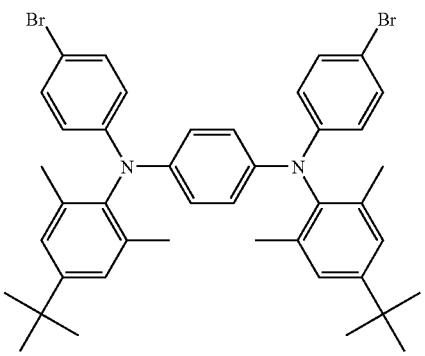 [SMILES: Cc1cc(C(C)(C)C)cc(C)c1N(c1ccc(Br)cc1)c1ccc(N(c2ccc(Br)cc2)c2c(C)cc(C(C)(C)C)cc2C)cc1]

$^1$H-NMR (300 MNz/THF-d$_8$):

d (ppm)=1.3 [s, 18H], 2.0 [s, 12H], 6.6~6.7 [d, 4H], 6.8~6.9 [br, 4H], 7.1 [s, 4H], 7.2~7.3 [d, 4H]

MS (FD$^+$) M$^+$738

Synthesis Example 10

Synthesis of Polymer Compound 2

The above compound E (5.4 g, 9 mmol), the above N,N'-bis(4-bromophenyl)-N,N'-bis(4-t-butyl-2,6-dimethylphenyl)-1,4-phenylenediamine (4.5 g, 6 mmol) and 2,2'-bipyridyl (5.1 g, 33 mmol) were dissolved in 420 ml of dehydrated tetrahydrofuran, then, an atmosphere in the system was purged with nitrogen by bubbling of nitrogen. Under a nitrogen atmosphere, to this solution was added bis(1,5-cyclooctadiene)nickel(0){Ni(COD)$_2$} (9.0 g, 33 mmol) and the mixture was heated up to 60° C., and reacted for 3 hours while stirring. After reaction, this reaction solution was cooled down to room temperature (about 25° C.), dropped into 25% ammonia water 150 mL/methanol 1500 mL/ion exchanged water 600 mL mixed solution and the mixture was stirred for 1 hour, then, the deposited precipitate was filtrated and dried under reduced pressure for 2 hours, and dissolved in 450 mL of toluene. Then, 450 mL of 1 N hydrochloric acid was added and the mixture was stirred for 1 hour, an aqueous layer was removed, 450 mL of 4% ammonia water was added to an organic layer, and the mixture was stirred for 1 hour, then, an aqueous layer was removed. An organic layer was dropped into 1350 mL of methanol and stirred for 1 hour, the deposited precipitate was filtrated and dried under reduced pressure for 2 hours, and dissolved in 400 mL of toluene. Thereafter, purification was performed through an alumina column (alumina amount: 100 g), and the recovered toluene solution was dropped into 1350 mL of methanol and stirred for 1 hour, and the deposited precipitate was filtrated and dried under reduced pressure for 2 hours. The resulting copolymer (hereinafter, referred to as polymer compound 2) showed a yield of 5.5 g. The polystyrene-reduced average molecular weight and

Synthesis Example 11

Synthesis of Compound F

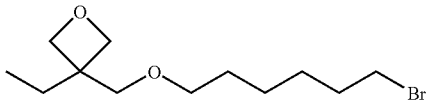
Compound F

Into an argon-purged 1 L three-necked flask was charged 163 ml of ion exchanged water, and 85.2 g (2.13 mol) of sodium hydroxide was added portion-wise and stirred to attain dissolution. Subsequently, 12.5 g (0.04 mol) of tetrabutylammonium bromide was added, and 15 g (0.13 mol) of 3-ethyl-3-oxetanemethanol, 94.5 g (0.39 mol) of 1,6-dibromohexane and 128 mol of hexane were added and reacted at room temperature for 9 hours, then, heated up to 80° C. and reacted for 1 hour. After cooling to room temperature, an organic layer was extracted with hexane, dried over sodium sulfate, then, the solvent was distilled off. Purification by distillation under reduced pressure gave 32.4 g of a colorless transparent oil.

$^1$H-NMR (300 MNz/CDCl$_3$):

d0.89 (t, 3H), 1.35~1.92 (m, 10H), 3.42 (m, 4H), 4.38 (d, 2H), 4.45 (d, 2H)

GC-MS: 279

Synthesis Example 12

Synthesis of Compound G

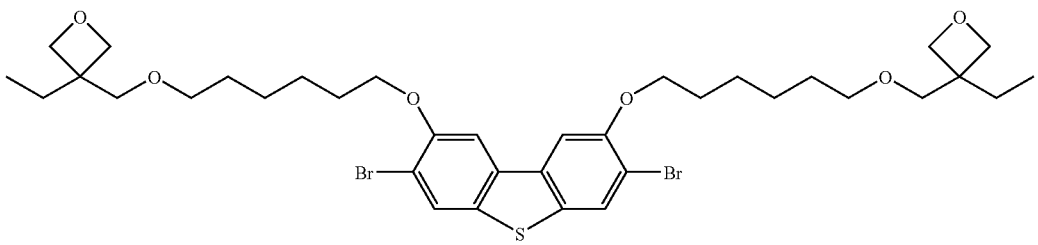
Compound G

Into an argon-purged 500 ml three-necked flask was charged 7.7 g (20.6 mmol) of 2,8-dihydroxy-3,7-dibromothiophene, 7.40 g (53.5 mmol) of potassium carbonate and 160 ml of N,N-dimethylformamide, and argon was bubbled at room temperature for 20 minutes. Subsequently, 16.1 g (57.6 mmol) of compound F was added, further, argon was bubbled at room temperature for 10 minutes. The temperature was raised up to 100° C., the solution was stirred for 3 hours, then, stirred at 165° C. for 4 hours. An organic layer was extracted with ethyl acetate, dried over sodium sulfate, then, purification by a silica gel column (toluene:ethyl acetate=5:1) was performed, and purification by a silica gel column (toluene:ethyl acetate=10:1) was performed again, to obtain 4.09 g of a yellow oil.

$^1$H-NMR (300 MNz/CDCl$_3$):

d0.88 (t, 6H), 1.44~1.98 (m, 20H), 3.49 (m, 4H), 4.16 (t, 4H), 4.38 (d, 2H), 4.45 (d, 2H), 7.45 (s, 2H), 7.94 (s, 2H)

As a result of measurement of MS spectrum, a mass number of 809 corresponding to [M+K] by ESI method was detected.

Synthesis Example 13

Synthesis of Polymer Compound 3

116 mg of compound G, 1027 mg of N,N'-bis(4-bromophenyl)-N,N'-bis(4-t-butyl-2,6-dimethylphenyl)-1,4-phenylenediamine and 575 mg of 2,2'-bipyridyl were charged into a reaction vessel, then, an atmosphere in the reaction system was purged with a nitrogen gas. To this was added 30.8 g of tetrahydrofuran (dehydration solvent) deaerated previously by bubbling with an argon gas. Next, to this mixed solution was added 1007 mg of bis(1,5-cyclooctadiene)nickel (0), and reacted at 60° C. for 3.3 hours. The reaction was conducted in a nitrogen gas atmosphere. After reaction, this solution was cooled, then, poured into 25% ammonia water 9.0 g/methanol 94.8 g/ion exchanged water 50.0 g mixed solution, and stirred for about 1 hour. Then, the produced precipitate was recovered by filtration, and dried under reduced pressure for 2 hours at 55° C. Then, this precipitate was dissolved in 26.0 g of toluene, unnecessary substances were removed by filter paper, and the filtrate was passed through an alumina column (alumina amount: 10 g). To a toluene solution was added 30 g of 4% ammonia water, the mixture as stirred for 1 hour, then, an aqueous layer was removed, 30 g of ion exchanged water was added and the mixture was further stirred for 1 hour, and an aqueous layer was removed. An organic layer was dropped into 220 mL of methanol and stirred for 30 minutes, and the deposited precipitate was filtrated and dried under reduced pressure for 2 hours, and dissolved in 20 g of toluene. Thereafter, purification was performed through an alumina column (alumna amount: 15 g), further, purification was performed again through an alumina column (alumna amount: 30 g), and the recovered toluene solution was dropped into 200 mL of methanol and stirred for 1 hour, and the deposited precipitate was filtrated and dried under reduced pressure for 2 hours. The resulting copolymer showed a yield of 189 mg. In the copolymer, the ratio of repeating units corresponding to compound F and N,N'-bis(4-bromophenyl)-N,N'-bis(4-t-butyl-2,6-dimethylphenyl)-1,4-phenylenediamine was 10:90. This copolymer is referred to as polymer compound 3.

Polymer compound 3 had a polystyrene-reduced number-average molecular weight of 2.7×4 and a weight-average molecular weight of 1.5×10$^5$.

Synthesis Example 14

Synthesis of Polymer Compound 4

N,N'-bis(4-bromophenyl)-N,N'-bis(4-n-butylphenyl)-1,4-phenylenediamine (3.3 g, 4.8 mmol) and 2,2'-bipyridyl (1.9 g, 12 mmol) were dissolved in 132 mL of dehydrated tetrahydrofuran, then, an atmosphere in the system was purged with nitrogen by bubbling of nitrogen. Under a nitrogen atmosphere, to this solution was added bis(1,5-cyclooctadiene)nickel(0){Ni(COD)$_2$} (3.3 g, 12 mmol) and the mixture was heated up to 60° C., and reacted for 3.5 hours while stirring. After reaction, this reaction solution was cooled down to room temperature (about 25° C.), dropped into 25% ammonia water 30 mL/methanol 480 mL/ion exchanged water 160 mL mixed solution and the mixture was stirred for 1 hour, then, the deposited precipitate was filtrated and dried under reduced pressure for 2 hours, and dissolved in 150 mL of toluene. Then, 120 g of 1 N hydrochloric acid was added and the mixture was stirred for 3 hours, an aqueous layer was removed, 140 mL of 25% ammonia water was added to an organic layer, and the mixture was stirred for 3 hours, then, an aqueous layer was removed. An organic layer was washed with 600 ml of water twice. The organic layer was divided into two fractions which were dropped into 600 mL of methanol and stirred for 1 hour, the deposited precipitates were filtrated and dried under reduced pressure for 2 hours. The resulted polymer (hereinafter, referred to as polymer compound 4) showed a yield of 3.26 g. The polystyrene-reduced average molecular weight and weight-average molecular weight were Mn=1.6×10$^4$ and Mw=1.2×10$^5$, respectively (moving bed: THF).

Synthesis Example 15

Synthesis of Polymer Compound 5

11.1 g of N,N'-bis(4-bromophenyl)-N,N'-bis(4-t-butyl-2,6-dimethylphenyl)-1,4-phenylenediamine and 5.6 g of 2,2'-bipyridyl were dissolved in a reaction vessel, then, an atmosphere in the system was purged with a nitrogen gas. To this was added 400 g of tetrahydrofuran (dehydration solvent) deaerated previously by bubbling with an argon gas. Next, to this mixed solution was added 10.0 g mg of bis(1,5-cyclooctadiene)nickel(0), and stirred at room temperature for 10 minutes, then, reacted at 60° C. for 3 hours. The reaction was conducted in a nitrogen gas atmosphere.

After reaction, this solution was cooled, then, 25% ammonia water 50 ml/methanol 200 ml/ion exchanged water 200 ml mixed solution was poured into this solution, and stirred for about 1 hour. Then, the produced precipitate was filtrated and recovered. This precipitate was dried under reduced pressure, then, dissolved in toluene. This toluene solution was filtrated to remove unnecessary substances, then, this toluene solution was purified by passing through a column filled with alumina. Next, this toluene solution was washed with about 1 N hydrochloric acid water, allowed to stand still and separated, then, a toluene solution was recovered, then, this toluene solution was washed with about 3% ammonia water, allowed to stand still and separated, then, a toluene solution was recovered, then, this toluene solution was washed with ion exchanged water, allowed to stand still and separated, then, a toluene solution was recovered. Next, this toluene solution was poured into methanol, producing again a precipitate.

Next, the produced precipitate was recovered, this precipitate was dried under reduced pressure to obtain 4.7 g of a polymer. This polymer is referred to as polymer compound 5. The polystyrene-reduced number-average molecular weight and weight-average molecular weight were Mn=6.7×10$^3$ and Mw=4.5×10$^4$, respectively (moving bed: tetrahydrofuran).

Synthesis Example 16

Synthesis of Compound H

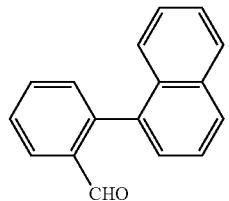

Compound H

Into a 300 ml three-necked flask was charged 5.00 g (29 mmol) of 1-naphthaleneboronic acid, 6.46 g (35 mmol) of 2-bromobenzaldehyde, 10.0 g (73 mmol) of potassium carbonate, 36 ml of toluene and 36 ml of ion exchanged water under an inert atmosphere, and argon was bubbled for 20 minutes while stirring at room temperature. Subsequently, 16.8 g (0.15 mmol) of tetrakis(triphenylphosphine)palladium was added, further, argon was bubbled for 10 minutes while stirring at room temperature. The mixture was heated up to 100° C., and reacted for 25 hours. After cooling to room temperature, an organic layer was extracted with toluene, dried over sodium sulfate, then, the solvent was distilled off. Purification by a silica gel column using toluene:cyclohexane=1:2 mixed solvent as a developing solvent gave 5.18 g of compound H as while crystal (yield: 86%).

$^1$H-NMR (300 MNz/CDCl$_3$):
d7.39~7.62 (m, 5H), 7.70 (m, 2H), 7.94 (d, 2H), 8.12 (dd, 2H), 9.63 (s, 1H)
MS (APCI (+)): (M+H)$^+$ 233

Synthesis Example 17

Synthesis of Compound I

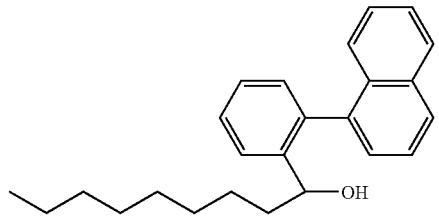

Compound I

Into a 300 ml three-necked flask was charged 8.00 g (34.4 mmol) of compound H and 46 ml of dehydrated THF under an inert atmosphere, and the mixture was cooled down to −78° C. Subsequently, 52 ml of n-octylmagnesium bromide (1.0 mol/l THF solution) was dropped over 30 minutes. After completion of dropping, the mixture was heated up to 0° C., stirred for 1 hour, then, heated up to room temperature and stirred for 45 minutes. In an ice bath, 20 ml of 1 N hydrochloric acid was added to complete the reaction, an organic layer was extracted with ethyl acetate and dried over sodium sulfate. The solvent was distilled off, then, purification was performed by a silica gel column using toluene:hexane=10:1 mixed solvent as a developing solvent to obtain 7.64 g (yield: 64%) of compound I as pale yellow oil. In HPLC measurement, two peaks were observed, while in LC-MS measurement, the same mass number was observed, thus, the product was judged to be a mixture of isomers.

Synthesis Example 18

Synthesis of Compound J

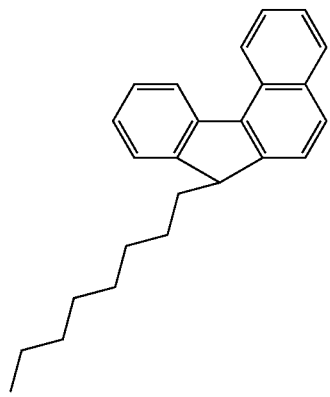

Compound J

Into a 500 ml three-necked flask was charged 5.00 g (14.4 mmol) of compound I and 74 ml of dehydrated dichloromethane under an inert atmosphere, and the mixture was stirred to attain dissolution. Subsequently, an etherate complex of boron trifluoride was dropped at room temperature over 1 hour, and after completion of dropping, the mixture was stirred at room temperature for 4 hours. 125 ml of ethanol was added slowly while stirring, and when heat generation was completed, an organic layer was extracted with chloroform, and washed with water twice, and dried over magnesium sulfate. The solvent was distilled off, then, purification by a silica gel column using hexane as a developing solvent gave 3.22 g (yield: 68%) of compound J as colorless oil.

$^1$H-NMR (300 MNz/CDCl$_3$):
d0.90 (t, 3H), 1.03~1.26 (m, 14H), 2.13 (m, 2H), 4.05 (t, 1H), 7.35 (dd, 1H), 7.46~7.50 (m, 2H), 7.59~7.65 (m, 3H), 7.82 (d, 1H), 7.94 (d, 1H), 8.35 (d, 1H), 8.75 (d, 1H)
MS (APCI (+)): (M+H)$^+$ 329

Synthesis Example 19

Synthesis of Compound K

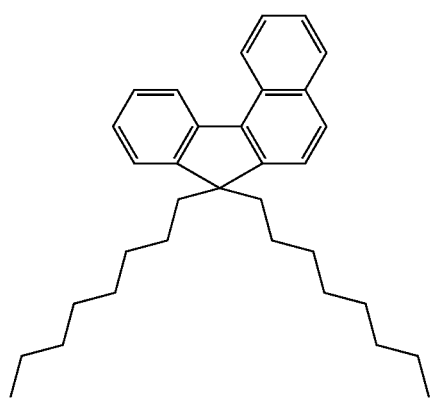

Compound K

Into a 200 ml three-necked flask was charged 20 ml of ion exchanged water under an inert atmosphere, and 18.9 g (0.47 mol) of sodium hydroxide was added portion-wise while stirring, and dissolved. After cooling the aqueous solution down to room temperature, 20 ml of toluene, 5.17 g (15.7 mmol) of compound J and 1.52 g (4.72 mmol) of tributylammonium bromide were added, and the mixture was heated up to 50° C. n-octyl bromide was dropped, and after completion of dropping, the mixture was reacted at 50° C. for 9 hours. After completion of the reaction, an organic layer was extracted with toluene, washed with water twice, and dried over sodium sulfate. Purification by a silica gel column using hexane as a developing solvent gave 5.13 g of compound K as yellow oil (yield: 74%).

$^1$H-NMR (300 MNz/CDCl$_3$):
d0.52 (m, 2H), 0.79 (t, 6H), 1.00~1.20 (m, 22H), 2.05 (t, 4H), 7.34 (d, 1H), 7.40~7.53 (m, 2H), 7.63 (m, 3H), 7.83 (d, 1H), 7.94 (d, 1H), 8.31 (d, 1H), 8.75 (d, 1H)
MS (APCI (+)): (M+H)$^+$ 441

Synthesis Example 20

Synthesis of Compound L

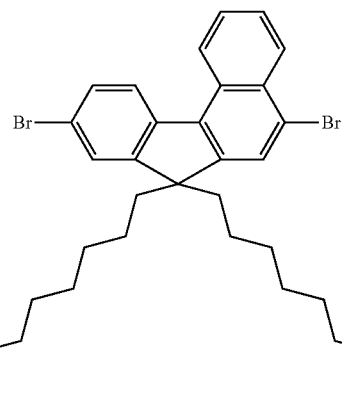

Compound L

Into a 50 ml three-necked flask was charged 4.00 g (9.08 mmol) of compound K and 57 ml of acetic acid:dichloromethane=1:1 mixed solvent under an air atmosphere, and the mixture was stirred at room temperature to attain dissolution. Subsequently, 7.79 g (20.0 mmol) of benzyltrimethylammonium tribromide was added and, zinc chloride was added until complete dissolution of benzyltrimethylammonium tribromide while stirring. The mixture was stirred at room temperature for 20 hours, then, 10 ml of a 5% sodium hydrogen sulfite aqueous solution was added to stop the reaction, an organic layer was extracted with chloroform, washed with a potassium carbonate aqueous solution twice, and dried over sodium sulfate. Purification by a flush column using hexane as a developing solvent was carried out twice, then, re-crystallization was performed with ethanol:hexane=1:1, subsequently, 10:1 mixed solvent, obtaining 4.13 g of compound L as white crystal (yield: 76%).

$^1$H-NMR (300 MNz/CDCl$_3$):
d0.60 (m, 2H), 0.91 (t, 6H), 1.01~1.38 (m, 22H), 2.09 (t, 4H), 7.62~7.75 (m, 3H), 7.89 (s, 1H), 8.20 (d, 1H), 8.47 (d, 1H), 8.72 (d, 1H)
MS (APCI (+)): (M+H)$^+$ 598

Synthesis Example 21

Synthesis of N,N'-diphenyl-N,N'-bis(4-t-butyl-2,6-dimethylphenyl)-benzidine

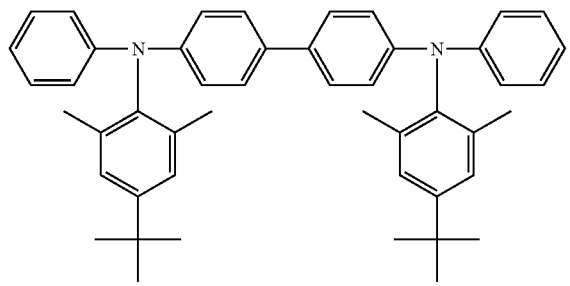 [SMILES: Cc1cc(C(C)(C)C)cc(C)c1N(c1ccccc1)c1ccc(-c2ccc(N(c3ccccc3)c3c(C)cc(C(C)(C)C)cc3C)cc2)cc1]

Under an inert atmosphere, 1660 ml of deaerated dehydrated toluene was charged into a 300 ml three-necked flask, and 275.0 g of N,N'-diphenylbenzidine and 449.0 g of 4-t-butyl-2,6-dimethylbromobenzene were added. Subsequently, 7.48 g of tris(dibenzylideneacetone)dipalladium and 196.4 g of t-butoxysodium were added, then, 5.0 g of tri(t-butyl) phosphine was added. Thereafter, the mixture was reacted at 105° C. for 7 hours.

To the reaction solution was added 2000 ml of toluene, and the mixture was filtrated through celite and the filtrate was washed with 1000 ml of water three times, then, concentrated until 700 ml. To this was added 1600 ml of toluene/methanol (1:1) solution, the deposited crystal was filtrated and washed with methanol. 479.4 g of white solid was obtained.

Synthesis Example 22

Synthesis of N,N'-bis(4-bromophenyl)-N,N'-bis(4-t-butyl-2,6-dimethylphenyl)-benzidine

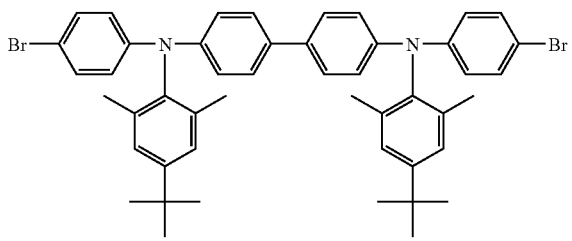 [SMILES: Cc1cc(C(C)(C)C)cc(C)c1N(c1ccc(Br)cc1)c1ccc(-c2ccc(N(c3ccc(Br)cc3)c3c(C)cc(C(C)(C)C)cc3C)cc2)cc1]

Under an inert atmosphere, 472.8 g of the above N,N'-diphenyl-N,N'-bis(4-t-butyl-2,6-dimethylphenyl)-benzidine was dissolved in 4730 g of chloroform, then, 281.8 g of N-bromosuccinimide was divided into 12 fractions and charged over 1 hour under shading in an ice bath, and reacted for 3 hours.

1439 ml of chloroform was added to the reaction solution and filtrated, and a chloroform solution of the filtrate was washed with 2159 ml of 5% sodium thiosulfate, and toluene was distilled off to obtain a white crystal. The resulting white crystal was re-crystallized from toluene/ethanol, obtaining 678.7 g of white crystal.

Synthesis Example 23

Synthesis of Polymer Light Emitting Body 6

Compound L (8.0 g) and 2,2'-bipyridyl (5.9 g) were dissolved in 300 mL of dehydrated tetrahydrofuran, then, an atmosphere in the system was purged with nitrogen by bubbling of nitrogen. Under a nitrogen atmosphere, this solution was heated up to 60° C., and bis(1,5-cyclooctadiene)nickel (0){Ni(COD)$_2$} (10.4 g, 0.038 mol) was added and reacted for 5 hours. After reaction, this reaction solution was cooled down to room temperature (about 25° C.), dropped into 25% ammonia water 40 mL/methanol 300 mL/ion exchanged water 300 mL mixed solution and the mixture was stirred for 30 minutes, then, the deposited precipitate was filtrated and air-dried. Thereafter, the dried precipitate was dissolved in 400 mL of toluene and filtrated, and the filtrate was purified by passing through an alumina column, and about 300 mL of 1 N hydrochloric acid was added and the mixture was stirred for 3 hours, an aqueous layer was removed, about 300 mL of 4% ammonia water was added to an organic layer, the mixture was stirred for 2 hours, then, an aqueous layer was removed. About 300 mL of ion exchanged water was added to an organic layer and the mixture was stirred for 1 hour, then, an aqueous layer was removed. About 100 mL of methanol was dropped into an organic layer and the mixture was stirred for 1 hour, subsequently, allowed to stand still, then, the supernatant was removed by decantation. The resulting precipitate was dissolved in 100 mL of toluene, and the solution was dropped into about 200 mL of methanol and the mixture was stirred for 1 hour, filtrated and dried under reduced pressure for 2 hours. The resulting copolymer showed a yield of 4.1 g (hereinafter, referred to as polymer compound 6). Polymer compound 6 had a polystyrene-reduced average molecular weight and weight-average molecular weight of Mn=1.5×10$^5$ and Mw=2.7×10$^5$, respectively (moving bed: tetrahydrofuran).

Synthesis Example 23

Synthesis of Polymer Compound 7

Compound L (5.25 g), N,N'-bis(4-bromophenyl)-N,N'-bis(4-t-butyl-2,6-dimethylphenyl)-benzidine (3.06 g) and 2,2'-bipyridyl (5.3 g) were dissolved in 226 mL of dehydrated tetrahydrofuran, then, an atmosphere in the system was purged with nitrogen by bubbling of nitrogen. Under a nitrogen atmosphere, to this solution was added bis(1,5-cyclooctadiene)nickel(0){Ni(COD)$_2$} (9.30 g), the mixture was heated up to 60° C. and reacted for 3 hours while stirring. After reaction, this reaction solution was cooled down to room temperature (about 25° C.), dropped into 25% ammonia water 45 mL/methanol about 230 mL/ion exchanged water about 230 mL mixed solution and the mixture was stirred for 1 hour, then, the deposited precipitate was filtrated and dried under reduced pressure for 2 hours, then, dissolved in 400 mL of toluene, then, filtrated, and the filtrate was purified by passing through an alumina column, about 400 ml of 5.2% hydrochloric acid was added, the mixture was stirred for 3 hours, then, an aqueous layer was removed. Then, about 400 mL of 4% ammonia water was added and the mixture was stirred for 2 hours, then, an aqueous layer was removed. Further, about 400 mL of ion exchanged water was added to an organic layer and the mixture was stirred for 1 hour, then, an aqueous layer was removed. 80 ml of toluene was added to an organic layer, the deposited precipitate was collected by decantation, and dissolved in 200 ml of toluene, then, this was dropped into about 600 mL of methanol, and the deposited precipitate was filtrated and dried under reduced pressure for 2 hours. The resulting copolymer showed a yield of 4.25 g (hereinafter, referred to as polymer compound 7). The polystyrene-reduced number-average molecular weight and weight-average molecular weight were Mn=2.5×10⁴ and Mw=8.0×10⁵, respectively (moving bed: tetrahydrofuran).

Example 1

On a glass substrate carrying an ITO film having a thickness of 150 nm formed by a sputtering method, a film was formed by spin coat with a thickness of 70 nm using a solution of poly(ethylenedioxythiophene)/polystyrenesulfonic acid (Beyer, BaytronP), and dried on a hot plate at 200° C. for 10 minutes. Next, a film was formed by spin coat at a revolution of 1400 rpm using a toluene solution so prepared that the concentration of polymer compound 2 was 1.5 wt %. Further, this was heated at 200° C. for 10 minutes under a nitrogen atmosphere, then, soluble components were rinsed with toluene to obtain a layer (L) having a thickness of about 10 nm. Next, a film was formed by spin coat at a revolution of 1400 rpm using a toluene solution so prepared that the concentration of a 25:75 (weight ratio) mixture of polymer compound 2 and polymer compound 1 was 1.5 wt %, forming a light emitting layer. Further, this was dried at 90° C. under reduced pressure for 1 hour, then, lithium fluoride was vapor-deposited at a thickness of about 1 nm to give a cathode, and calcium was vapor-deposited at a thickness of about 5 nm, then, aluminum was vapor-deposited at a thickness of about 100 nm, producing an EL device. After the degree of vacuum reached $1 \times 10^{-4}$ Pa or less, vapor-deposition of a metal was initiated.

By applying voltage on the resulting device, EL light emission having a peak at 460 nm was obtained. In driving at a constant current of 1 mA, the initial luminance was 504 cd/m², and attenuation of luminance was measured to find that luminance decreased to a half value 177 hours after initiation of the test.
(half life converted at an initial luminance of 100 cd/m² according to the following formula: 892 hours)

$$\text{Half life} \propto (\text{initial luminance})^{-1}$$

(Organic EL material and display, published by CMC (2001) p. 107)

Example 2

On a glass substrate carrying an ITO film having a thickness of 150 nm formed by a sputtering method, a film was formed by spin coat with a thickness of 70 nm using a solution of poly(ethylenedioxythiophene)/polystyrenesulfonic acid (Beyer, BaytronP), and dried on a hot plate at 200° C. for 10 minutes. Next, a film was formed by spin coat at a revolution of 1400 rpm using a toluene solution so prepared that the concentration of polymer compound 3 was 0.175 wt %. Further, this was heated at 200° C. for 10 minutes under a nitrogen atmosphere, then, a layer (L) having a thickness of about 70 nm was obtained. Next, a film was formed by spin coat at a revolution of 500 rpm using a toluene solution so prepared that the concentration of a 25:75 (weight ratio) mixture of polymer compound 2 and polymer compound 1 was 0.75 wt %, forming a light emitting layer. Further, this was dried at 90° C. under reduced pressure for 1 hour, then, lithium fluoride was vapor-deposited at a thickness of about 1 nm to give a cathode, and calcium was vapor-deposited at a thickness of about 5 nm, then, aluminum was vapor-deposited at a thickness of about 100 nm, producing an EL device. After the degree of vacuum reached $1 \times 10^{-4}$ Pa or less, vapor-deposition of a metal was initiated.

By applying voltage on the resulting device, EL light emission having a peak at 460 nm was obtained. In driving at a constant current of 1 mA, the initial luminance was 565 cd/m², and attenuation of luminance was measured to find that luminance decreased to a half value 75 hours after initiation of the test.
(half life converted at an initial luminance of 100 cd/m²: 424 hours)

Example 3

On a glass substrate carrying an ITO film having a thickness of 150 nm formed by a sputtering method, a film was formed by spin coat at a revolution of 500 rpm using a toluene solution so prepared that the concentration of polymer compound 5 was 1.0 wt %. Further, this was heated at 200° C. for 10 minutes under a nitrogen atmosphere, then, a layer (L) having a thickness of about 40 nm was obtained. Next, a film was formed by spin coat at a revolution of 700 rpm using a toluene solution so prepared that the concentration of a 50:50 (weight ratio) mixture of polymer compound 6 and polymer compound 7 was 1.0 wt %, forming a light emitting layer. Further, this was dried at 90° C. under reduced pressure for 1 hour, then, lithium fluoride was vapor-deposited at a thickness of about 1 nm to give a cathode, and calcium was vapor-deposited at a thickness of about 5 nm, then, aluminum was vapor-deposited at a thickness of about 100 nm, producing an EL device. After the degree of vacuum reached $1 \times 10^{-4}$ Pa or less, vapor-deposition of a metal was initiated.

By applying voltage on the resulting device, EL light emission having a peak at 465 nm was obtained. In driving at a constant current of 10 mA, the initial luminance was 3810 cd/m², and attenuation of luminance was measured to find that luminance decreased to a half value 1.65 hours after initiation of the test.
(half life converted at an initial luminance of 1000 cd/m²: 6.3 hours)

Comparative Example 1

On a glass substrate carrying an ITO film having a thickness of 150 nm formed by a sputtering method, a film was formed by spin coat with a thickness of 70 nm using a solution of poly(ethylenedioxythiophene)/polystyrenesulfonic acid (Beyer, BaytronP), and dried on a hot plate at 200° C. for 10 minutes. Next, a film was formed by spin coat at a revolution of 1400 rpm using a toluene solution so prepared that the concentration of a 25:75 (weight ratio) mixture of polymer compound 2 and polymer compound 1 was 1.5 wt %, forming a light emitting layer. Further, this was dried at 90° C. under reduced pressure for 1 hour, then, lithium fluoride was vapor-deposited at a thickness of about 1 nm to give a cathode, and calcium was vapor-deposited at a thickness of about 5 nm, then, aluminum was vapor-deposited at a thickness of about 100 nm, producing an EL device. After the degree of vacuum reached $1 \times 10^{-4}$ Pa or less, vapor-deposition of a metal was initiated. By applying voltage on the resulting device, EL light emission having a peak at 460 nm was obtained. In driving at a constant current of 1 mA, the initial luminance was 422 cd/m², and attenuation of luminance was measured to find that luminance decreased to a half value 86 hours after initiation of the test.
(half life converted at an initial luminance of 100 cd/m²: 363 hours)

Comparative Example 2

On a glass substrate carrying an ITO film having a thickness of 150 nm formed by a sputtering method, a film was formed by spin coat with a thickness of 70 nm using a solution of poly(ethylenedioxythiophene)/polystyrenesulfonic acid (Beyer, BaytronP), and dried on a hot plate at 200° C. for 10 minutes. Next, a film was formed by spin coat at a revolution of 1400 rpm using a toluene solution so prepared that the concentration of polymer compound 4 was 1.5 wt %. Further, this was dried at 200° C. under a nitrogen atmosphere for 10 minutes, then, soluble components were rinsed with toluene, to obtain a layer having a thickness of about 10 nm. Next, a film was formed by spin coat at a revolution of 1400 rpm using a toluene solution so prepared that the concentration of a 25:75 (weight ratio) mixture of polymer compound 2 and polymer compound 1 was 1.5 wt %, forming a light emitting layer. Further, this was dried at 90° C. under reduced pressure for 1 hour, then, lithium fluoride was vapor-deposited at a thickness of about 1 nm to give a cathode, and calcium was vapor-deposited at a thickness of about 5 nm, then, aluminum was vapor-deposited at a thickness of about 100 nm, producing an EL device. After the degree of vacuum reached $1 \times 10^{-4}$ Pa or less, vapor-deposition of a metal was initiated. By applying voltage on the resulting device, EL light emission having a peak at 460 nm was obtained. In driving at a constant current of 1 mA, the initial luminance was 507 cd/m², and attenuation of luminance was measured to find that luminance decreased to a half value 40 hours after initiation of the test.
(half life converted at an initial luminance of 100 cd/m²: 203 hours)

Comparative Example 3

On a glass substrate carrying an ITO film having a thickness of 150 nm formed by a sputtering method, a film was formed by spin coat at a revolution of 700 rpm using a toluene solution so prepared that the concentration of a 50:50 (weight ratio) mixture of polymer compound 6 and polymer compound 7 was 1.0 wt %, forming a light emitting layer. Further, this was dried at 90° C. under reduced pressure for 1 hour, then, lithium fluoride was vapor-deposited at a thickness of about 1 nm to give a cathode, and calcium was vapor-deposited at a thickness of about 5 nm, then, aluminum was vapor-deposited at a thickness of about 100 nm, producing an EL device. After the degree of vacuum reached $1 \times 10^{-4}$ Pa or less, vapor-deposition of a metal was initiated.

By applying voltage on the resulting device, EL light emission having a peak at 465 nm was obtained. In driving at a constant current of 10 mA, the initial luminance was 876 cd/m², By applying voltage on the resulting device, EL light emission having a peak at 465 nm was obtained. In driving at a constant current of 10 mA, the initial luminance was 876 cd/m², and attenuation of luminance was measured to find that luminance decreased to a half value 0.035 hours after initiation of the test.
(half life converted at an initial luminance of 1000 cd/m²: 0.03 hours)

The devices in Examples 1 to 3 have longer converted half lives converted at an initial luminance of 100 cd/m² or 1000 cd/m² as compared with the devices in Comparative Examples 1 to 3.

INDUSTRIAL APPLICABILITY

The organic EL device of the present invention is excellent in device performances. Therefore, the organic EL device can be preferably used for apparatuses such as light sources in the form of curved surface or sheet for illumination or backlight of a liquid crystal display, display devices of segment type, dot matrix flat panel displays and the like.

The invention claimed is:
1. An organic electroluminescence device wherein a light emitting layer exists between electrodes composed of an anode and a cathode,
    a layer (L) comprising a polymer compound exists between the light emitting layer and the anode and the polymer compound comprises a repeating unit of the following formula (1):

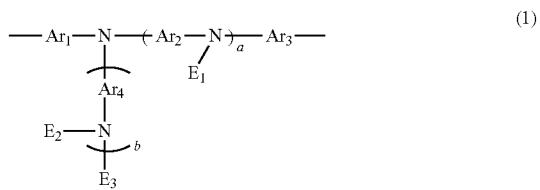

wherein, $Ar_1$, $Ar_2$, $Ar_3$ and $Ar_4$ represent each independently an arylene group or divalent heterocyclic group, $E_1$, $E_2$ and $E_3$ represent each independently the following aryl group (A) or heterocyclic group (B), a and b represent each independently 0 or 1, and $0 \leq a+b \leq 1$,
    aryl group (A): aryl group having three or more substituents selected from alkyl groups, alkoxy groups, alkylthio groups, aryl groups, aryloxy groups, arylthio groups, arylalkyl groups, arylalkoxy groups, arylalkylthio groups, arylalkenyl groups, arylalkynyl groups, amino group, substituted amino groups, silyl group, substituted silyl groups, silyloxy group, substituted silyloxy groups, monovalent heterocyclic groups and halogen atoms,
    heterocyclic group (B): monovalent heterocyclic group having one or more substituents selected from alkyl groups, alkoxy groups, alkylthio groups, aryl groups, aryloxy groups, arylthio groups, arylalkyl groups, arylalkoxy groups, arylalkylthio groups, arylalkenyl groups, arylalkynyl groups, amino group, substituted amino groups, silyl group, substituted silyl groups, silyloxy group, substituted silyloxy groups, monovalent heterocyclic groups and halogen atoms in which the sum of the number of the substituents and the number of hetero atoms of the heterocycle is 3 or more,
    wherein the polymer compound comprises at least one polymerizable substituent selected from the group consisting of vinyl group, acetylene group, butenyl group, acryl group, acrylate group, acrylamide group, methacryl group, methacrylate group, methacrylamide group, allyl group, vinyl ether group, vinylamino group, groups having a 3-4 membered ring, lactone group, and lactam group,
    and wherein the polymer compound comprises a repeating unit of the following formula (4), (5), (6) or (7) in addition to a repeating unit of the formula (1):

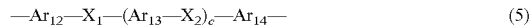

wherein, $Ar_{12}$, $Ar_{13}$ and $Ar_{14}$ represent each independently an arylene group, divalent heterocyclic group or divalent group having a metal complex structure, $X_1$ represents —CR$_2$=CR$_3$—, —C≡C— or —(SiR$_5$R$_6$)$_d$—, $X_2$ represents —CR$_2$=CR$_3$—, —C≡C—, —N(R$_4$)— or —(SiR$_5$R$_6$)$_d$—, $R_2$ and $R_3$ represent each independently a hydrogen atom, alkyl group, aryl group, monovalent heterocyclic group, carboxyl group, substituted carboxyl group or cyano group, $R_4$, $R_5$ and $R_6$ represent each independently a hydrogen atom, alkyl group, aryl group, monovalent heterocyclic group or arylalkyl group, c represents an integer of 0 to 2, d represents an integer of 1 to 12, and when a plurality of $Ar_{13}$s, $R_2$s, $R_3$s, $R_5$s and $R_6$s are present, these may be the same or different.
2. The organic electroluminescence device according to claim 1 wherein the layer (L) comprising a polymer compound is adjacent to the light emitting layer.

3. The organic electroluminescence device according to claim 1 or 2 wherein the layer (L) comprising a polymer compound is a hole injection and transportation layer.

4. The organic electroluminescence device according to claim 1 or 2 wherein the layer (L) comprising a polymer compound is adjacent to a hole injection and transportation layer.

5. The organic electroluminescence device according to claim 1 or 2 wherein the aryl group (A) is a phenyl group having three or more substituents, a naphthyl group having three or more substituents or an anthracenyl group having three or more substituents.

6. The organic electroluminescence device according to claim 1 or 2 wherein the aryl group (A) is a group of the following formula (3):

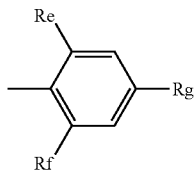

(3)

wherein, Re, Rf and Rg represent each independently an alkyl group, alkoxy group, alkylthio group, aryl group, aryloxy group, arylthio group, arylalkyl group, arylalkoxy group, arylalkylthio group, arylalkenyl group, arylalkynyl group, amino group, substituted amino group, silyl group, substituted silyl group, silyloxy group, substituted silyloxy group, monovalent heterocyclic group or halogen atom.

7. The organic electroluminescence device according to claim 6 wherein, in the formula (3), Re and Rf represent each independently an alkyl group having 3 or less carbon atoms, alkoxy group having 3 or less carbon atoms or alkylthio group having 3 or less carbon atoms and Rg represents an alkyl group having 3 to 20 carbon atoms, alkoxy group having 3 to 20 carbon atoms or alkylthio group having 3 to 20 carbon atoms.

8. A sheet light source comprising the organic electroluminescence device according to claim 1 or 2.

9. A segment display comprising the organic electroluminescence device according to claim 1 or 2.

10. A dot matrix display using the organic electroluminescence device according to claim 1 or 2 as back light.

11. A liquid crystal display using the organic electroluminescence device according to claim 1 or 2 as back light.

* * * * *